(12) United States Patent
Johnson et al.

(10) Patent No.: US 11,034,788 B2
(45) Date of Patent: Jun. 15, 2021

(54) POLYMERS AND USES THEREOF

(71) Applicant: Massachusetts Institute of Technology, Cambridge, MA (US)

(72) Inventors: Jeremiah A. Johnson, Boston, MA (US); Mao Chen, Boston, MA (US); Wenxu Zhang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 112 days.

(21) Appl. No.: 15/875,907

(22) Filed: Jan. 19, 2018

(65) Prior Publication Data
US 2018/0208699 A1 Jul. 26, 2018

Related U.S. Application Data

(60) Provisional application No. 62/448,475, filed on Jan. 20, 2017.

(51) Int. Cl.
| | | |
|---|---|---|
| C08F 293/00 | (2006.01) | |
| C08F 297/06 | (2006.01) | |
| C08F 4/06 | (2006.01) | |
| C08F 216/08 | (2006.01) | |
| C08F 212/08 | (2006.01) | |
| C08F 212/12 | (2006.01) | |
| C08F 220/18 | (2006.01) | |
| C08F 8/04 | (2006.01) | |
| C08F 2/38 | (2006.01) | |

(52) U.S. Cl.
CPC ............ *C08F 293/005* (2013.01); *C08F 2/38* (2013.01); *C08F 4/06* (2013.01); *C08F 8/04* (2013.01); *C08F 212/08* (2013.01); *C08F 212/12* (2013.01); *C08F 220/18* (2013.01); *C08F 297/06* (2013.01); *C08F 216/08* (2013.01); *C08F 2438/01* (2013.01); *C08F 2438/03* (2013.01)

(58) Field of Classification Search
CPC .................................................. C08F 216/08
See application file for complete search history.

(56) References Cited

U.S. PATENT DOCUMENTS

| | | | |
|---|---|---|---|
| 5,811,515 | A | 9/1998 | Grubbs et al. |
| 6,063,522 | A | 5/2000 | Hamrock et al. |
| 9,381,253 | B2 | 7/2016 | Johnson et al. |
| 2008/0286626 | A1 | 11/2008 | Olmeijer et al. |
| 2011/0218255 | A1 | 9/2011 | Teasley |
| 2016/0190641 | A1 | 6/2016 | Lee et al. |
| 2018/0208712 | A1 | 7/2018 | Johnson et al. |

FOREIGN PATENT DOCUMENTS

WO   WO 2013/169739 A1   11/2013

OTHER PUBLICATIONS

Xu et al (Polymer encapsulated upconversion nanoparticle/iron oxide nanocomposites for multimodal imaging and magnetic targeted drug delivery, Biomaterials 32 (2011) 9364-9373) (Year: 2011).*
O'Malley et al, Synthesis of mesoporous aluminophosphates-based materials using various copolymers as templates, Microporous and Mesoporous Materials (2014), 191, 48-58 (Year: 2014).*
Fuchs et al, Induction of Amphiphilicity in Polymer@Silica Particles: Ceramic Surfactants, Langmuir (2013), 29(9), 2835-2842 (Year: 2013).*
Hu et al, Nanocomposites with Spatially Separated Functionalities for Combined Imaging and Magnetolytic Therapy, Journal of the American Chemical Society (2010), 132(21), 7234-7237 (Year: 2010).*
Ozkan et al, Mesoporous sol-gel WO3 thin films via poly(styrene-co-allyl-alcohol) copolymer templates, Solid State Ionics (2003), 165(1-4), 65-72 (Year: 2003).*
Almdal et al., Gaussian- to stretched-coil transition in block copolymer melts. Phys. Rev. Lett. 1990;65:1112.
Anderson et al., Surface morphology of PS-PDMS diblock copolymer films. J Electron Spectrosc Relat PH. 2001;121:93-110. 10.1016/S0368-2048(01)00329-2.
Bates et al., Block Copolymer Lithography. Macromolecules, 2014, 47 (1), pp. 2-12. DOI: 10.1021/ma401762n.
Bates et al., Block Copolymer Thermodynamics: Theory and Experiment. Annual Review of Physical Chemistry 1990;41(1):525-557.
Bates et al., Block Copolymers—Designer Soft Materials. Physics Today 1999;52(2):32 https://doi.org/10.1063/1.882522.
Berthier et al., Microscopic investigation of ionic conductivity in alkali metal salts-poly(ethylene oxide) adducts. Solid State Ionics, Sep. 1983;11(1):91-95.
Bouchet et al., Single-ion BAB triblock copolymers as highly efficient electrolytes for lithium-metal batteries. Nat Mater. May 2013;12(5):452-7. doi: 10.1038/nmat3602. Epub Mar. 31, 2013.
Chen et al., Thiocarbonylthio end group removal from RAFT-synthesized polymers by a radical-induced process . . . J. Polym. Sci. A Polym. Chem., 2009;47:6704-6714. doi:10.1002/pola.23711.
Cushen et al., Thin Film Self-Assembly of Poly(trimethylsilylstyrene-b-d,l-lactide) with Sub-10 nm Domains. Macromolecules, 2012;45(21):8722-8728. DOI: 10.1021/ma301238j.
Epps et al., Phase Behavior of Lithium Perchlorate-Doped Poly(styrene-b-isoprene-b-ethylene oxide) Triblock Copolymers. Chem. Mater., 2002;14(4):1706-1714. DOI: 10.1021/cm010971t.
Furstner et al., Alkyne Metathesis: Development of a Novel Molybdenum-Based Catalyst System and Its Application to the Total Synthesis of Epothilone A and C. Chem. Eur. J. 2001;7:5299.

(Continued)

*Primary Examiner* — Wenwen Cai
(74) *Attorney, Agent, or Firm* — Wolf, Greenfield & Sacks, P.C.

(57) ABSTRACT

The present invention provides polymers and methods of preparing the same. In certain embodiments, the polymers comprise acrylate repeating units that have been derivatized (e.g., reduced and/or substituted) to form new polymeric structures. In certain embodiments, the polymers described herein self-assemble to form well-defined nanostructures. In some instances, the nanostructures exhibit relatively small d-spacing (e.g., a d-spacing value of 10 nm or less). Due to their properties, the polymers described herein are useful in a variety of applications including functional materials and biomedical applications.

19 Claims, 23 Drawing Sheets

(56) References Cited

OTHER PUBLICATIONS

Furstner et al., Mo[N(t-Bu)(Ar)]3 Complexes As Catalyst Precursors: In Situ Activation and Application to Metathesis Reactions of Alkynes and Diynes. J. Am. Chem. Soc., 1999;121(40):9453-9454. DOI: 10.1021/ja991340r.

Gallivan et al., A neutral, water-soluble olefin metathesis catalyst based on an N-heterocyclic carbene ligand. Tetrahedron Letters 2005;46(15):2577-2580.

Grubbs et al., Ring-Closing Metathesis and Related Processes in Organic Synthesis. Acc. Chem. Res., 1995, 28 (11), pp. 446-452. DOI: 10.1021/ar00059a002.

Hashimoto et al., Domain-Boundary Structure of Styrene-Isoprene Block Copolymer Films Cast from Solution. 4. Molecular-Weight Dependence of Lamellar Microdomains. Macromolecules, 1980, 13 (5), pp. 1237-1247. DOI: 10.1021/ma60077a040.

Isono et al., Sub-10 nm Nano-Organization in AB2- and AB3-Type Miktoarm Star Copolymers Consisting of Maltoheptaose and Polycaprolactone. Macromolecules, 2013;46(4):1461-1469. DOI: 10.1021/ma3026578.

Jackson et al., Nanoporous membranes derived from block copolymers: from drug delivery to water filtration. ACS Nano. Jul. 27, 2010;4(7):3548-53. doi: 10.1021/nn1014006.

Jeong et al., Realizing 5.4 nm Full Pitch Lamellar Microdomains by a Solid-State Transformation. Macromolecules, 2017;50(18):7148-7154. DOI: 10.1021/acs.macromol.7b01443.

Kennemur et al., Sub-5 nm Domains in Ordered Poly(cyclohexylethylene)-block-poly(methyl methacrylate) Block Polymers for Lithography. Macromolecules, 2014;47(4):1411-1418. DOI: 10.1021/ma4020164.

Kim et al., Mussel-inspired block copolymer lithography for low surface energy materials of teflon, graphene, and gold. Adv Mater. Dec. 15, 2011;23(47):5618-22. doi: 10.1002/adma.201103650. Epub Oct. 21, 2011.

Kim et al., Salt Complexation in Block Copolymer Thin Films. Macromolecules, 2006;39(24):8473-8479. DOI: 10.1021/ma061170k.

Koo et al., Directed self-assembly of block copolymers in the extreme: guiding microdomains from the small to the large. Soft Matter, 2013;9:9059-9071. DOI: 10.1039/C3SM51083B.

Kwak et al., Fabrication of Sub-3 nm Feature Size Based on Block Copolymer Self-Assembly for Next-Generation Nanolithography. Macromolecules, 2017;50(17):6813-6818. DOI: 10.1021/acs.macromol.7b00945.

Leibler et al., Theory of Microphase Separation in Block Copolymers. Macromolecules, 1980;13(6):602-1617. DOI: 10.1021/ma60078a047.

Liu et al., "Brush-First" Method for the Parallel Synthesis of Photocleavable, Nitroxide-Labeled Poly(ethylene glycol) Star Polymers. J. Am. Chem. Soc., 2012, 134 (39), pp. 16337-16344. DOI: 10.1021/ja3067176.

Liu et al., Particles without a box: brush-first synthesis of photodegradable PEG star polymers under ambient conditions. J Vis Exp. Oct. 10, 2013;(80). doi: 10.3791/50874.

Lo et al., Silicon-Containing Block Copolymers for Lithographic Applications. 2017. 10.1016/j.progpolymsci.2017.10.002.

Luo et al., Poly(dimethylsiloxane-b-methyl methacrylate): A Promising Candidate for Sub-10 nm Patterning. Macromolecules, 2015;48(11):3422-3430. DOI: 10.1021/acs.macromol.5b00518.

Ma et al., Single Lithium-Ion Conducting Polymer Electrolytes Based on a Super-Delocalized Polyanion. Angew Chem Int Ed Engl. Feb. 12, 2016;55(7):2521-5. doi: 10.1002/anie.201509299. Epub Jan. 14, 2016.

Minier et al., Thermal analysis and NMR study of a poly(ethylene oxide) complex electrolyte : PEO(LiCF3SO3)x. J. Phys. France 1984;45:739-744. DOI: 10.1051/jphys:01984004504073900.

Olvera De La Cruz et al., Theory of microphase separation in graft and star copolymers. Macromolecules, 1986;19(10):2501-2508. DOI: 10.1021/ma00164a008.

Papadakis et al., Identification of an intermediate-segregation regime in a diblock copolymer system. Europhys. Lett., 1996;36(4):289-294.

Park et al., Macroscopic 10-terabit-per-square-inch arrays from block copolymers with lateral order. Science. Feb. 20, 2009;323(5917):1030-3. doi: 10.1126/science.1168108.

Peinemann et al., Asymmetric superstructure formed in a block copolymer via phase separation. Nat Mater. Dec. 2007;6(12):992-6. Epub Nov. 4, 2007.

Poelma et al., Cyclic Block Copolymers for Controlling Feature Sizes in Block Copolymer Lithography. ACS Nano, 2012;6(12):10845-10854. DOI: 10.1021/nn304217y.

Rodwogin et al., Polylactide-poly(dimethylsiloxane)-polylactide triblock copolymers as multifunctional materials for nanolithographic applications. ACS Nano. Feb. 23, 2010;4(2):725-32. doi: 10.1021/nn901190a.

Ruiz et al., Density multiplication and improved lithography by directed block copolymer assembly. Science. Aug. 15, 2008;321(5891):936-9. doi: 10.1126/science.1157626.

Russeell et al., Temperature dependence of the interaction parameter of polystyrene and poly(methyl methacrylate). Macromolecules, 1990;23(3):890-893. DOI: 10.1021/ma00205a033.

Schrock et al., Tungsten(VI) neopentylidyne complexes. Organometallics, 1982, 1 (12), pp. 1645-1651. DOI: 10.1021/om00072a018.

Schulze et al., Poly(cyclohexylethylene)-block-poly(ethylene oxide) Block Polymers for Metal Oxide Templating. ACS Macro Lett., 2015;4(9):1027-1032. DOI: 10.1021/acsmacrolett.5b00458.

Shi et al., Producing Small Domain Features Using Miktoarm Block Copolymers with Large Interaction Parameters. ACS Macro Lett., 2015;4(11):1287-1292. DOI: 10.1021/acsmacrolett.5b00712.

Sinturel et al., High $\chi$-Low N Block Polymers: How Far Can We Go? ACS Macro Lett., 2015, 4 (9), pp. 1044-1050. DOI: 10.1021/acsmacrolett.5b00472.

Smith et al., Batteries. Opening the window for aqueous electrolytes. Science. Nov. 20, 2015;350(6263):918. doi: 10.1126/science.aad5575.

Sun et al., Directed Self-Assembly of Poly(2-vinylpyridine)-b-polystyrene-b-poly(2-vinylpyridine) Triblock Copolymer with Sub-15 nm Spacing Line Patterns Using a Nanoimprinted Photoresist Template. Adv Mater. Aug. 5, 2015;27(29):4364-70. doi: 10.1002/adma.201501585. Epub Jun. 18, 2015.

Sun et al., Using Block Copolymer Architecture to Achieve Sub-10 nm Periods. Polymer, 2017;121:297-303 DOI: 10.1016/j.polymer.2017.

Sunday et al., Characterizing the Interface Scaling of High $\chi$ Block Copolymers near the Order-Disorder Transition. Macromolecules, 2018, 51 (1), pp. 173-180. DOI: 10.1021/acs.macromol.7b01982.

Suo et al., "Water-in-salt" electrolyte enables high-voltage aqueous lithium-ion chemistries. Science. Nov. 20, 2015;350(6263):938-43. doi: 10.1126/science.aab1595.

Sweat et al., Rational Design of a Block Copolymer with a High Interaction Parameter. Macromolecules, 2014;47(19):6687-6696. DOI: 10.1021/ma501597g.

Teran et al., Thermodynamics of Block Copolymers with and without Salt. J. Phys. Chem. B, 2014;118(1):4-17. DOI: 10.1021/jp408079z.

Thurn-Albrecht et al., Ultrahigh-density nanowire arrays grown in self-assembled diblock copolymer templates. Science. Dec. 15, 2000;290(5499):2126-9.

Tirumala et al., Well Ordered Polymer Melts from Blends of Disordered Triblock Copolymer Surfactants and Functional Homopolymers. Adv. Mater., 2008;20:1603-1608. doi:10.1002/adma.200701577.

Van Genabeek et al., Synthesis and Self-Assembly of Discrete Dimethylsiloxane-Lactic Acid Diblock Co-oligomers: The Dononacontamer and Its Shorter Homologues. J. Am. Chem. Soc., 2016;138(12):4210-4218. DOI: 10.1021/jacs.6b00629.

Wang et al., Block Co-PolyMOCs by Stepwise Self-Assembly. J. Am. Chem. Soc., 2016;138(33):10708-10715. DOI: 10.1021/jacs.6b06712.

Wright et al., Electrical conductivity in ionic complexes of poly(ethylene oxide). Brit. Poly. J., 1975;7:319-327. doi:10.1002/pi.4980070505.

(56) References Cited

OTHER PUBLICATIONS

Yang et al., Virus Filtration Membranes Prepared from Nanoporous Block Copolymers with Good Dimensional Stability under High Pressures and Excellent Solvent Resistance. Adv. Funct. Mater., 18: 1371-1377. doi:10.1002/adfm.200700832.

Young et al., Salt Doping in PEO-Containing Block Copolymers: Counterion and Concentration Effects. Macromolecules, 2009;42(7):2672-2678. DOI: 10.1021/ma802799p.

Zha et al., Origin of the Difference in Order-Disorder Transition Temperature between Polystyrene-block-poly(2-vinylpyridine) and Polystyrene-block-poly(4-vinylpyridine) Copolymers. Macromolecules, 2007;40(6):2109-2119. DOI: 10.1021/ma062516u.

Huang et al., Fluorinated Aryl Sulfonimide Tagged (FAST) salts: modular synthesis and structure—property relationships for battery applications. Energy Environ. Sci., 2018, Advance Article DOI: 10.1039/C7EE03509H.

\* cited by examiner

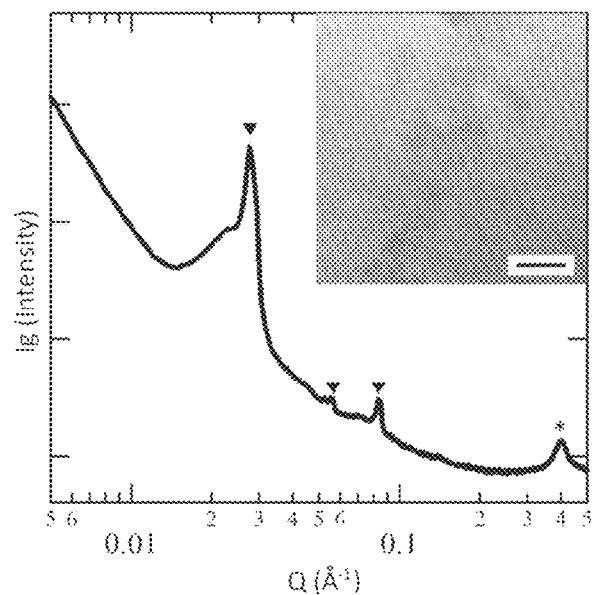 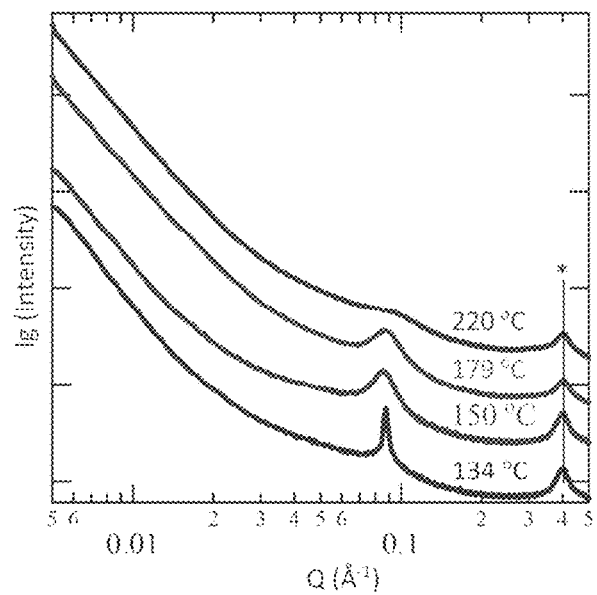
Figure 3A        Figure 3B
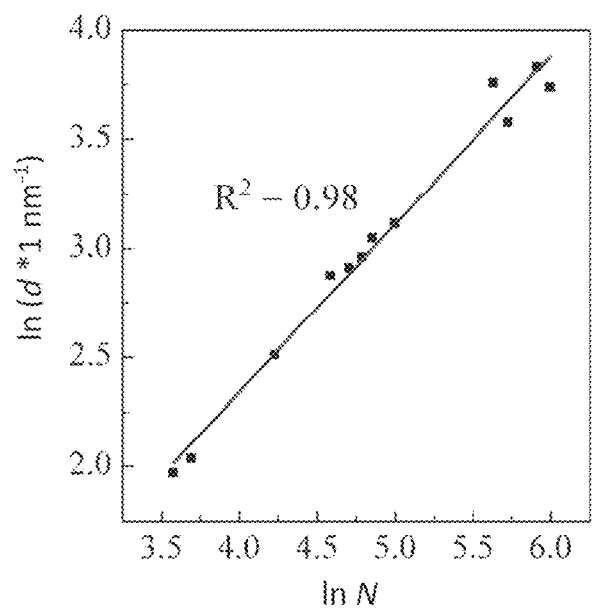
Figure 4

| # | DP of MMA | DP of St | mol% | wt%, after RD | End-group Removal | Reduction |
|---|---|---|---|---|---|---|
| 1 | 220 | 401 | 35 | 27 | Done | Done |
| 2 | 220 | 378 | 37 | 29 | Done | |
| 3 | 145 | 166 | 47 | 38 | Done | Done |
| 4 | 145 | 215 | 40 | 32 | Done | |
| 5 | 185 | 327 | 36 | 28 | Done | |
| 6 | 185 | 283 | 40 | 31 | Done | Done |
| 7 | 185 | 100 | 65 | 56 | Done | Done |
| 8 | 185 | 118 | 61 | 52 | Done | |
| 9 | 185 | 168 | 52 | 43 | Done | Done |
| 10 | 185 | 121 | 60 | 51 | Done | Done |
| 11 | 185 | 143 | 56 | 47 | Done | Done |
| 12 | 185 | 51 | 78 | 71 | Done | Done |

Figure 19

POLYMERS AND USES THEREOF

RELATED APPLICATIONS

This application claims priority under 35 U.S.C. § 119(e) to U.S. Provisional Patent application Ser. No. 62/448,475, filed Jan. 20, 2017, the entire contents of which is incorporated herein by reference.

BACKGROUND OF THE INVENTION

Ordered block copolymers (BCPs), with ultra-small microdomain sizes and repeat periods, have attracted significant research interest during the past decades as they find applications in many areas. For example, BCPs can be used as templates for the fabrication of nanowires and bit-patterned storage media, as well as water filtration membranes. See, e.g., Sun et al. "Directed Self-Assembly of Poly(2-Vinylpyridine)-B-Polystyrene-B-poly(2-Vinylpyridine) Triblock Copolymer with Sub-15 Nm Spacing Line Patterns Using a Nanoimprinted Photoresist Template", *Adv. Mater.* 2015, 27 (29), 4364-4370; Thurn-Albrecht et al. "Ultrahigh-Density Nanowire Arrays Grown in Self-Assembled Diblock Copolymer Templates", *Science* 2000, 290 (5499), 2126-2129; Kim et al. "Mussel-Inspired Block Copolymer Lithography for Low Surface Energy Materials of Teflon, Graphene, and Gold", *Adv. Mater.* 2011, 23 (47), 5618-5622; Ruiz et al. "Density Multiplication and Improved Lithography by Directed Block Copolymer Assembly", *Science* 2008, 321 (5891), 936-939; Jackson et al. "Nanoporous Membranes Derived from Block Copolymers: From Drug Delivery to Water Filtration", *ACS Nano.* 2010, pp 3548-3553; Peinemann et al. "Asymmetric Superstructure Formed in a Block Copolymer via Phase Separation", *Nat. Mater.* 2007, 6 (12), 992-996; Yang, S. Y.; Park, J.; Yoon, J.; Ree, M.; Jang, S. K.; Kim, J. K. Virus Filtration Membranes Prepared from Nanoporous Block Copolymers with Good Dimensional Stability under High Pressures and Excellent Solvent Resistance. *Adv. Funct. Mater.* 2008, 18 (9), 1371-1377.

To further boost the performance of these materials, achieving smaller feature sizes/d-spacing (d) is in urgent need. See, e.g., Lo et al. "Silicon-Containing Block Copolymers for Lithographic Applications", *Progress in Polymer Science.* 2017; Bates et al. "Block Copolymer Lithography", *Macromolecules.* 2014, pp 2-12. In particular, achieving sub-10 nm spacing is an important task. See, e.g., Sinturel et al. "High χ-Low N Block Polymers: How Far Can We Go?", *ACS Macro Letters.* 2015, pp 1044-1050. To reduce the interdomain spacing of a BCP material, the degree of polymerization (N) needs to be decreased. This is, however, limited by the fact that the χN value needs to be above a critical value (10.5 for diblock copolymers with conformational symmetry) to maintain the formation of ordered nanostructures, where χ is the Flory-Huggins interaction parameter. See, e.g., Bates et al. "Copolymer Thermodynamics: Theory and Experiment", *Annu. Rev. Phys. Chem.* 1990, 41 (1), 525-557. This leads to the general acceptance that the availability of high χ-low N block copolymers is the key to the accessibility of sub-10 nm d-spacing. Note here that, although it has been demonstrated that by adopting polymer architectures, ordered morphologies can be achieved at slightly lower χN values, it cannot meet the rapid growing requirement for smaller features. Thus, seeking for BCPs systems with large χ values has become one of the major topics in the polymer community. See, e.g., Shi et al. "Producing Small Domain Features Using Miktoarm Block Copolymers with Large Interaction Parameters", *ACS Macro Lett.* 2015, 4 (11), 1287-1292; Sun et al. "Using Block Copolymer Architecture to Achieve Sub-10 Nm Periods", *Polym. (United Kingdom)* 2017, 121, 297-303; Poelma et al. "Cyclic Block Copolymers for Controlling Feature Sizes in Block Copolymer Lithography", *ACS Nano* 2012, 6 (12), 10845-10854; Wang et al. "Block Co-PolyMOCs by Stepwise Self-Assembly", *J. Am. Chem. Soc.* 2016, 138 (33), 10708-10715; Isono et al. "Sub-10 Nm Nano-Organization in AB2- and AB3-Type Miktoarm Star Copolymers Consisting of Maltoheptaose and Polycaprolactone", *Macromolecules* 2013, 46 (4), 1461-1469; Olvera de la Cruz et al. "Theory of Microphase Separation in Graft and Star Copolymers", *Macromolecules* 1986, 19 (10), 2501-2508.

One popular strategy to this end is the use of strongly interacting additives. Inorganic salts have been widely used to effectively enhance the microphase separation in polystyrene-b-poly(ethylene oxide), especially in thin films. See, e.g., Kim et al. "Salt Complexation in Block Copolymer Thin Films", *Macromolecules* 2006, 39 (24), 8473-8479; Epps et al. "Phase Behavior of Lithium Perchlorate-Doped Poly(styrene-B-Isoprene-B-Ethylene Oxide) Triblock Copolymers", *Chem. Mater.* 2002, 14 (4), 1706-1714; Park et al. "Macroscopic 10-Terabit-per-Square-Inch Arrays from Block Copolymers with Lateral Order. *Science* 2009, 323 (5917), 1030-1033; Young et al. "Salt Doping in PEO-Containing Block Copolymers: Counterion and Concentration Effects", *Macromolecules* 2009, 42 (7), 2672-2678; Teran et al. "Thermodynamics of Block Copolymers with and without Salt. *J. Phys. Chem. B* 2014, 118 (1), 4-17. This can also be applied to other coordinating polymers, such as poly(vinylpyridine)s. Watkins et al. utilized the hydrogen bonding between poly(ethylene oxide)-b-poly(propylene oxide)-b-poly(ethylene oxide) and polyacrylic acid to form well-ordered polymer blend melts, which displayed d-spacing values around 10 nm. See, e.g., Tirumala et al. "Well Ordered Polymer Melts from Blends of Disordered Triblock Copolymer Surfactants and Functional Homopolymers", *Adv. Mater.* 2008, 20 (9), 1603-1608. Despite being a useful and effective strategy, it certainly limits the following processing conditions that can be used, as well as the compatibility with certain applications.

Thus, researchers are motivated to look for BCPs that have intrinsically higher χ values. A few strides have been made towards achieving sub-10 nm spacing by selectively pairing traditional polymers. Pionnering work by Hillmyer et al. provided d=20 nm and further suggested that achieving sub-7 nm periodicity is possible, when using block copolymers based on poly(lactic acid) and polydimethylsiloxane. See, e.g., Rodwogin et al. "Polylactide-Poly(dimethylsiloxane)-Polylactide Triblock Copolymers as Multifunctional Materials for Nanolithographic Applications", In *ACS Nano;* 2010; Vol. 4, pp 725-732. In 2014, Gopalan et al. successfully accessed 9.6 nm periodicity in bulk lamellar morphology based on poly(tert-butylstyrene)-b-poly(2-vinylpyridine), while the Bates and Hillmyer research groups synthesized poly(cyclohexylethylene)-b-poly(methyl methacrylate) by hydrogenating polystyrene followed by chain extension, which exhibited a 9.0 nm spacing between ordered lamellae in bulk. See, e.g., Sweat et al. "Rational Design of a Block Copolymer with a High Interaction Parameter", *Macromolecules* 2014, 47 (19), 6687-6696; Kennemur et al. "Sub-5 Nm Domains in Ordered Poly (cyclohexylethylene)-Block-Poly(methyl Methacrylate) Block Polymers for Lithography", *Macromolecules* 2014, 47 (4), 1411-1418. A year later, using a similar strategy, Hillmyer et al. reported poly(cyclohexylethylene)-b-poly (ethylene oxide) with the smallest spacing being 7.9 nm. See, e.g., Schulze et al. "Poly(cyclohexylethylene)-Block-Poly(ethylene Oxide) Block Polymers for Metal Oxide Templating", *ACS Macro Lett.* 2015, 4 (9), 1027-1032. Contemporarily, a lamellar spacing of 8.7 nm based on poly(dimethylsiloxane)-b-poly(methyl methacrylate) was obtained by the Hawker research group. See, e.g., Luo et al. "Poly(dimethylsiloxane-B-Methyl Methacrylate): A Promising Candidate for Sub-10 nm Patterning", *Macromolecules* 2015, 48 (11), 3422-3430. Progress has also been achieved by incorporating novel monomers/polymers. It was reported that the minimum spacing exhibited by the lamellae of poly(3-hydroxystyrene)-b-poly(tert-butylstyrene) was as small as 8.8 nm. In case of oligosaccharide-b-poly(para-trimethylsilylstyrene), the smallest spacing, 8.3 nm, was observed on a cylindrical morphology, in spite of the costly multistep synthesis. See, e.g., Cushen et al. "Oligosaccharide/silicon-Containing Block Copolymers with 5 Nm Features for Lithographic Applications", *ACS Nano* 2012, 6 (4), 3424-3433. By synthesizing discrete dimethylsiloxanelactic acid diblock co-oligomers, Meijer obtained 6.8 nm and 6.5 nm d-spacing values for lamellar and cylindrical morphologies, respectively. See, e.g., Van Genabeek et al. "Synthesis and Self-Assembly of Discrete Dimethylsiloxane-Lactic Acid Diblock Co-Oligomers: The Dononacontamer and Its Shorter Homologues", *J. Am. Chem. Soc.* 2016, 138 (12), 4210-4218. Recently, the Rzayev and Russell groups showcased that 5.4 nm full pitch lamellar domains can be realized by in-situ hydrolyzing poly(solketal methacrylate)-b-polystyrene into poly(glycerol monomethacrylate)-b-polystyrene. However, the processing conditions are limited to acid vapor annealing. See, e.g., Jeong et al. "Realizing 5.4 Nm Full Pitch Lamellar Microdomains by a Solid-State Transformation", *Macromolecules* 2017, acs.macromol.7b01443 Assisted by highly toxic BBr$_3$, Kim et al synthesized poly (3,4-dihydroxystyrene)-b-polystyrene and were able to access 5.9 nm d-spacing in lamellae. See, e.g., Kwak et al. "Fabrication of Sub-3 Nm Feature Size Based on Block Copolymer Self-Assembly for Next-Generation Nanolithography", *Macromolecules* 2017, 50 (17), 6813-6818.

Although progress has been achieved recently, the involvement of exotic monomers, highly toxic reagents, and multistep synthesis limits their applications.

SUMMARY OF THE INVENTION

The present invention provides polymers and methods of preparing the same. The present invention also provides compositions and materials comprising the polymers described herein. In certain embodiments, the polymers described herein self-assemble to form well-defined nanostructures. In some instances, the nanostructures exhibit relatively small d-spacing (e.g., a d-spacing value of 10 nm or less). Small d-spacing can lead to more well-defined nanostructures and better performance of materials. Due to their properties (e.g., the ability to self-organize into well-defined nanostructures), the polymers described herein are useful in a variety of applications, including functional materials and biomedical applications (e.g., drug delivery systems, nanowires, bit-patterned storage media, filtration membranes, batteries, and more). In certain embodiments, the polymers are formed from derivatization of polymers (e.g., homopolymers, copolymers, block copolymers) comprising acrylate repeating units.

In one aspect, provided herein are polymers comprising repeating units of the following formula:

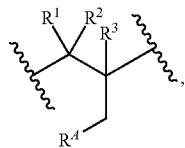

wherein $R^1$, $R^2$, $R^3$ and $R^4$ are as defined herein.

For example, in certain embodiments, the polymer comprises a repeating unit of the following formula:

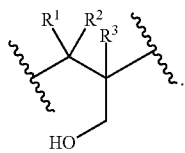

In certain embodiments, the repeating unit is not of the following formula:

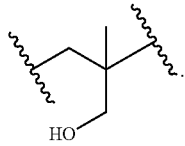

In certain embodiments, the polymer is a block copolymer. In certain embodiments, at least one of the polymer blocks of the block copolymer comprises repeating units of the following formula:

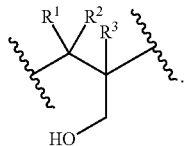

In certain embodiments, the block copolymer is a diblock copolymer. In certain embodiments, the block copolymer is a triblock or tetrablock copolymer. In certain embodiments, the block copolymer comprises five or more polymer blocks. The additional polymer blocks of the block copolymer described herein can be composed of any polymeric material (e.g., composed of any monomers). Examples of classes of polymers are provided herein.

For example, in certain embodiments, a block copolymer provided herein is of Formula

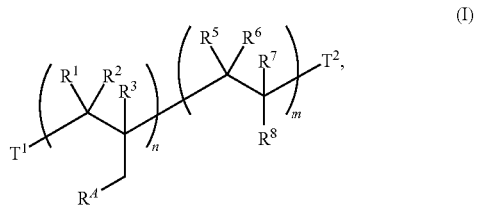

wherein $T^1$, $T^2$, $R^4$, $R^1$, $R^2$, $R^3$ $R^5$, $R^6$, $R^7$, $R^8$, n, and m are as defined herein.

In certain embodiments, a block copolymer is of Formula (II):

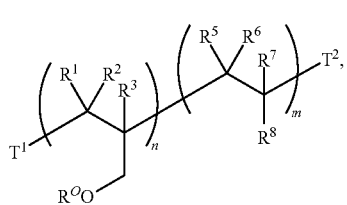
(II)

wherein $T^1$, $T^2$, $R^4$, $R^1$, $R^2$, $R^3$ $R^5$, $R^6$, $R^7$, $R^8$, $R^O$, n, and m are as defined herein.

In certain embodiments, a block copolymer is of the formula:

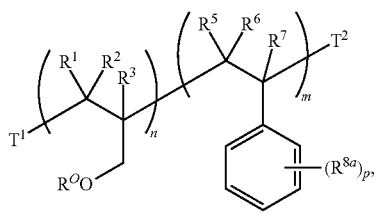

wherein $T^1$, $T^2$, $R^4$, $R^1$, $R^2$, $R^3$ $R^5$, $R^6$, $R^7$, $R^8$, $R^O$, $R^{8a}$, p, n, and m are as defined herein.

As described above, another aspect of the present invention provides methods for preparing the polymers provided herein. These methods may involve assembling a homopolymer or copolymer via polymerization, followed by derivatization (e.g., reduction, substitution, etc.).

The details of certain embodiments of the invention are set forth in the Detailed Description of Certain Embodiments, as described below. Other features, objects, and advantages of the invention will be apparent from the Definitions, Examples, Figures, and Claims.

Definitions

Definitions of specific functional groups and chemical terms are described in more detail below. The chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5th Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3rd Edition, Cambridge University Press, Cambridge, 1987.

Compounds described herein can comprise one or more asymmetric centers, and thus can exist in various stereomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, E. L. *Stereochemistry of Carbon Compounds* (McGraw-Hill, N Y, 1962); and Wilen, S. H., *Tables of Resolving Agents and Optical Resolutions*, p. 268 (E. L. Eliel, Ed., Univ. of Notre Dame Press, Notre Dame, Ind. 1972). The invention additionally encompasses compounds as individual isomers substantially free of other isomers, and alternatively, as mixtures of various isomers.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}F$ with $^{18}F$, or the replacement of $^{12}C$ with $^{13}C$ or $^{14}C$ are within the scope of the disclosure. Such compounds are useful, for example, as analytical tools or probes in biological assays.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., $CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., $CF_3$, Bn).

The term "haloalkyl" is a substituted alkyl group, wherein one or more of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). Examples of haloalkyl groups include —$CF_3$, —$CF_2CF_3$, —$CF_2CF_2CF_3$, —$CCl_3$, —$CFCl_2$, —$CF_2Cl$, and the like.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 7 carbon atoms and 1 or more heteroatoms within the parent chain ("hetero$C_{1-7}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 5 carbon atoms and 1 or 2 heteroatoms within the parent chain ("hetero$C_{1-5}$ alkyl"). In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_1$ alkyl"). In some embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-10}$ alkyl. In certain embodiments, the heteroalkyl group is a substituted hetero$C_{1-10}$ alkyl.

The term "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl. In an alkenyl group, a C=C double bond for which the stereochemistry is not specified (e.g., —CH=CHCH$_3$ or

)

may be an (E)- or (Z)-double bond.

The term "heteroalkenyl" refers to an alkenyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("hetero$C_{2-10}$ alkenyl"). In some embodiments, a heteroalkenyl group has 2 to 9 carbon atoms at least one double bond, and 1 or more heteroatoms within the parent chain ("hetero$C_{2-9}$ alkenyl"). In some embodiments, a heteroalkenyl group has 2 to 8 carbon atoms, at least one double bond, and 1 or more heteroatoms within the parent chain ("hetero$C_{2-8}$ alkenyl"). In some embodiments, a heteroalkenyl group has 2 to 7 carbon atoms, at least one double bond, and 1 or more heteroatoms within the parent chain ("hetero$C_{2-7}$ alkenyl"). In some embodiments, a heteroalkenyl group has 2 to 6 carbon atoms, at least one double bond, and 1 or more heteroatoms within the parent chain ("hetero$C_{2-6}$ alkenyl"). In some embodiments, a heteroalkenyl group has 2 to 5 carbon atoms, at least one double bond, and 1 or 2 heteroatoms within the parent chain ("hetero$C_{2-5}$ alkenyl"). In some embodiments, a heteroalkenyl group has 2 to 4 carbon atoms, at least one double bond, and 1 or 2 heteroatoms within the parent chain ("hetero$C_{2-4}$ alkenyl"). In some embodiments, a heteroalkenyl group has 2 to 3 carbon atoms, at least one double bond, and 1 heteroatom within the parent chain ("hetero$C_{2-3}$ alkenyl"). In some embodiments, a heteroalkenyl group has 2 to 6 carbon atoms, at least one double bond, and 1 or 2 heteroatoms within the parent chain ("hetero$C_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted hetero$C_{2-10}$ alkenyl. In certain embodiments, the heteroalkenyl group is a substituted hetero$C_{2-10}$ alkenyl.

The term "alkynyl" refers to a radical of a straight-chain or branched hydrocarbon group having from 2 to 10 carbon atoms and one or more carbon-carbon triple bonds (e.g., 1, 2, 3, or 4 triple bonds) ("$C_{2-10}$ alkynyl"). In some embodiments, an alkynyl group has 2 to 9 carbon atoms ("$C_{2-9}$ alkynyl"). In some embodiments, an alkynyl group has 2 to 8 carbon atoms ("$C_{2-8}$ alkynyl"). In some embodiments, an alkynyl group has 2 to 7 carbon atoms ("$C_{2-7}$ alkynyl"). In some embodiments, an alkynyl group has 2 to 6 carbon atoms ("$C_{2-6}$ alkynyl"). In some embodiments, an alkynyl group has 2 to 5 carbon atoms ("$C_{2-5}$ alkynyl"). In some embodiments, an alkynyl group has 2 to 4 carbon atoms ("$C_{2-4}$ alkynyl"). In some embodiments, an alkynyl group has 2 to 3 carbon atoms ("$C_{2-3}$ alkynyl"). In some embodiments, an alkynyl group has 2 carbon atoms ("$C_2$ alkynyl"). The one or more carbon-carbon triple bonds can be internal (such as in 2-butynyl) or terminal (such as in 1-butynyl). Examples of $C_{2-4}$ alkynyl groups include, without limitation, ethynyl ($C_2$), 1-propynyl ($C_3$), 2-propynyl ($C_3$), 1-butynyl ($C_4$), 2-butynyl ($C_4$), and the like. Examples of $C_{2-6}$ alkenyl groups include the aforementioned $C_{2-4}$ alkynyl groups as well as pentynyl ($C_5$), hexynyl ($C_6$), and the like. Additional examples of alkynyl include heptynyl ($C_7$), octynyl ($C_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted $C_{2-10}$ alkynyl. In certain embodiments, the alkynyl group is a substituted $C_{2-10}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkynyl group refers to a group having from 2 to 10 carbon atoms, at least one triple bond, and 1 or more heteroatoms within the parent chain ("hetero$C_{2-10}$ alkynyl"). In some embodiments, a heteroalkynyl group has 2 to 9 carbon atoms, at least one triple bond, and 1 or more heteroatoms within the parent chain ("hetero$C_{2-9}$ alkynyl"). In some embodiments, a heteroalkynyl group has 2 to 8 carbon atoms, at least one triple bond, and 1 or more heteroatoms within the parent chain ("hetero$C_{2-8}$ alkynyl"). In some embodiments, a heteroalkynyl group has 2 to 7 carbon atoms, at least one triple bond, and 1 or more heteroatoms within the parent chain ("hetero$C_{2-7}$ alkynyl"). In some embodiments, a heteroalkynyl group has 2 to 6 carbon atoms, at least one triple bond, and 1 or more heteroatoms within the parent chain ("hetero$C_{2-6}$ alkynyl"). In some embodiments, a heteroalkynyl group has 2 to 5 carbon atoms, at least one triple bond, and 1 or 2 heteroatoms within the parent chain ("hetero$C_{2-5}$ alkynyl"). In some embodiments, a heteroalkynyl group has 2 to 4 carbon atoms, at least one triple bond, and 1 or 2 heteroatoms within the parent chain ("hetero$C_{2-4}$ alkynyl"). In some embodiments, a heteroalkynyl group has 2 to 3 carbon atoms, at least one triple bond, and 1 heteroatom within the parent chain ("hetero$C_{2-3}$ alkynyl"). In some embodiments, a heteroalkynyl group has 2 to 6 carbon atoms, at least one triple bond, and 1 or 2 heteroatoms within the parent chain ("hetero$C_{2-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted hetero$C_{2-10}$ alkynyl. In certain embodiments, the heteroalkynyl group is a substituted hetero$C_{2-10}$ alkynyl.

The term "carbocyclyl" or "carbocyclic" refers to a radical of a non-aromatic cyclic hydrocarbon group having from 3 to 14 ring carbon atoms ("$C_{3-14}$ carbocyclyl") and zero heteroatoms in the non-aromatic ring system. In some embodiments, a carbocyclyl group has 3 to 10 ring carbon atoms ("$C_{3-10}$ carbocyclyl"). In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocyclyl"). In some embodiments, a carbocyclyl group has 3 to 6 ring carbon atoms ("$C_{3-6}$ carbocyclyl"). In some embodiments, a carbocyclyl group has 4 to 6 ring carbon atoms ("$C_{4-6}$ carbocyclyl"). In some embodiments, a carbocyclyl group has 5 to 6 ring carbon atoms ("$C_{5-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include, without limitation, cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include, without limitation, the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments, "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$).

Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur. Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 2 heteroatoms include, without limitation, triazinanyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetrahydrobenzo-thienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14 r electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl. Exemplary 5-membered heteroaryl groups containing 1 heteroatom include, without limitation, pyrrolyl, furanyl, and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl. Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl. Exemplary 6-membered heteroaryl groups containing 3 or 4 heteroatoms include, without limitation, triazinyl and tetrazinyl, respectively. Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl and phenazinyl.

The term "unsaturated bond" refers to a double or triple bond.

The term "unsaturated" or "partially unsaturated" refers to a moiety that includes at least one double or triple bond.

The term "saturated" refers to a moiety that does not contain a double or triple bond, i.e., the moiety only contains single bonds.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include, but are not limited to, halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3$+X-, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(NR$^{bb}$)R$^{aa}$, —C(NR$^{bb}$)OR$^{aa}$, —OC(=NR$^{bb}$)R$^{aa}$, —OC(NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$, —C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$, —OP(=O)(R$^{aa}$)$_2$, —OP(=O)(OR$^{cc}$)$_2$, —P(=O)(N(R$^{bb}$)$_2$)$_2$, —OP(=O)(N(R$^{bb}$)$_2$)$_2$, NR$^{bb}$P(=O)(R$^{aa}$)$_2$, —NR$^{bb}$P(=O)(OR$^{cc}$)$_2$, —NR$^{bb}$P(=O)(N(R$^{bb}$)$_2$)$_2$, —P(R$^{cc}$)$_2$, —P(OR$^{cc}$)$_2$, —P(R$^{cc}$)$_3$+X$^-$, —P(OR$^{cc}$)$_3$+X$^-$, —P(R$^{cc}$)$_4$, —P(OR$^{cc}$)$_4$, —OP(R$^{cc}$)$_2$, —OP(R$^{cc}$)$_3$+X$^-$, —OP(OR$^{cc}$)$_2$, —OP(OR$^{cc}$)$_3$+X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR';

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N(R$^{cc}$)$_2$)$_2$, C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

each instance of R$^{cc}$ is, independently, selected from hydrogen, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3$+X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)(OR$^{ee}$)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form =O or =S; wherein X$^-$ is a counterion;

each instance of R$^{ee}$ is, independently, selected from C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{ff}$ is, independently, selected from hydrogen, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl and 5-10 membered heteroaryl, or two R$^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups; and each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$+X$^-$, —NH(C$_{1-6}$ alkyl)$_2$+X$^-$, —NH$_2$(C$_{1-6}$ alkyl)+X$^-$, —NH$_3$+X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$C$_{1-6}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$-C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, C$_{6-10}$ aryl, 3-10 membered heterocyclyl, 5-10 membered heteroaryl; or two geminal $R^{gg}$ substituents can be joined to form =O or =S; wherein $X^-$ is a counterion.

In certain embodiments, carbon atom substituents include: halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$$^+$X$^-$, —NH(C$_{1-6}$ alkyl)$_2$$^+$X$^-$, —NH$_2$(C$_{1-6}$ alkyl)$^+$X$^-$, —NH$_3$$^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(=NH)NH(C$_{1-6}$ alkyl), —OC(=NH)NH$_2$, —NHC(=NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$(C$_{1-6}$ alkyl), —SO$_2$O(C$_{1-6}$ alkyl), —OSO$_2$(C$_{1-6}$ alkyl), —SO(C$_{1-6}$ alkyl), —Si(C$_{1-6}$ alkyl)$_3$, —OSi(C$_{1-6}$ alkyl)$_3$-C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$ alkynyl, C$_{3-10}$ carbocyclyl, C$_{6-10}$ aryl, 3-10 membered heterocyclyl, 5-10 membered heteroaryl; or two geminal $R^{gg}$ substituents can be joined to form =O or =S; wherein $X^-$ is a counterion.

The term "halo" or "halogen" refers to fluorine (fluoro, —F), chlorine (chloro, —Cl), bromine (bromo, —Br), or iodine (iodo, —I).

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —OR$^{aa}$, —ON(R$^{bb}$)$_2$, —OC(=O)SR$^{aa}$, —OC(=O)R$^{aa}$, —OCO$_2$R$^{aa}$, —OC(=O)N(R$^{bb}$)$_2$, —OC(=NR$^{bb}$)R$^{aa}$, —OC(=NR$^{bb}$)OR$^{aa}$, —OC(=NR$^{bb}$)N(R$^{bb}$)$_2$, —OS(=O)R$^{aa}$, —OSO$_2$R$^{aa}$, —OSi(R$^{aa}$)$_3$, —OP(R$^{cc}$)$_2$, —OP(R$^{cc}$)$_3$$^+$X$^-$, —OP(OR$^{cc}$)$_2$, —OP(OR$^{cc}$)$_3$$^+$X$^-$, —OP(=O)(R$^{aa}$)$_2$, —OP(=O)(OR$^{cc}$)$_2$, and —OP(=O)(N(R$^{bb}$))$_2$, wherein X$^-$, R$^{aa}$, R$^{bb}$, and R$^{cc}$ are as defined herein.

The term "amino" refers to the group —NH$_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "monosubstituted amino" refers to an amino group wherein the nitrogen atom directly attached to the parent molecule is substituted with one hydrogen and one group other than hydrogen, and includes groups selected from —NH(R$^{bb}$), —NHC(=O)R$^{aa}$, —NHCO$_2$R$^{aa}$, —NHC(=O)N(R$^{bb}$)$_2$, —NHC(=NR$^{bb}$)N(R$^{bb}$)$_2$, —NHSO$_2$R$^{aa}$, —NHP(=O)(OR$^{cc}$)$_2$, and —NHP(=O)(N(R$^{bb}$)$_2$)$_2$, wherein R$^{aa}$, R$^{bb}$ and R$^{cc}$ are as defined herein, and wherein R$^{bb}$ of the group —NH(R$^{bb}$) is not hydrogen.

The term "disubstituted amino" refers to an amino group wherein the nitrogen atom directly attached to the parent molecule is substituted with two groups other than hydrogen, and includes groups selected from —N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —NR$^{bb}$C(=NR$^{bb}$)N(R$^{bb}$)$_2$, —NR$^{bb}$SO$_2$R$^{aa}$, —NR$^{bb}$P(=O)(OR$^{cc}$)$_2$, and —NR$^{bb}$P(=O)(N(R$^{bb}$)$_2$)$_2$, wherein R$^{aa}$, R$^{bb}$, and R$^{cc}$ are as defined herein, with the proviso that the nitrogen atom directly attached to the parent molecule is not substituted with hydrogen.

The term "trisubstituted amino" refers to an amino group wherein the nitrogen atom directly attached to the parent molecule is substituted with three groups, and includes groups selected from —N(R$^{bb}$)$_3$ and —N(R$^{bb}$)$_3$$^+$X$^-$, wherein R$^{bb}$ and X$^-$ are as defined herein.

The term "substituted phosphorous" refers to one of the following groups: —P(R$^{cc}$)$_2$, —P(OR$^{cc}$)$_2$, —P(R$^{cc}$)$_3$$^+$X$^-$, —P(OR$^{cc}$)$_3$$^+$X$^-$, —P(R$^{cc}$)$_4$, —P(OR$^{cc}$)$_4$, —P(=O)(N(R$^{bb}$)$_2$)$_2$, —P(=O)(R$^{aa}$)$_2$, or —P(=O)(OR$^{cc}$)$_2$.

The term "acyl" refers to a group having the general formula —C(=O)R$^{X1}$, —C(=O)OR$^{X1}$, —C(=O)—O—C(=O)R$^{X1}$, —C(=O)SR$^{X1}$, —C(=O)N(R$^{X1}$)$_2$, —C(=S)R$^{X1}$, —C(=S)N(R$^{X1}$)$_2$, and —C(=S)S(R$^{X1}$), —C(=NR$^{X1}$)R$^{X1}$, C(=NR$^{X1}$)OR$^{X1}$, —C(=NR$^{X1}$)SR$^{X1}$, and —C(=NR$^{X1}$)N(R$^{X1}$)$_2$, wherein R$^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two R$^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "carbonyl" refers a group wherein the carbon directly attached to the parent molecule is sp$^2$ hybridized, and is substituted with an oxygen, nitrogen or sulfur atom, e.g., a group selected from ketones (—C(=O)R$^{aa}$), carboxylic acids (—CO$_2$H), aldehydes (—CHO), esters (—CO$_2$R$^{aa}$, —C(=O)SR$^{aa}$, —C(=S)SR$^{aa}$), amides (—C(=O)N(R$^{bb}$)$_2$, —C(=O)NR$^{bb}$SO$_2$R$^{aa}$, —C(=S)N(R$^{bb}$)$_2$), and imines (—C(=NR$^{bb}$)R$^{aa}$, —C(=NR$^{bb}$)OR$^{aa}$), —C(=NR$^{bb}$)N(R$^{bb}$)$_2$), wherein R$^{aa}$ and R$^{bb}$ are as defined herein.

The term "silyl" refers to the group Si(R$^{aa}$)$_3$, wherein R$^{aa}$ is as defined herein.

The term "oxo" refers to the group =O, and the term "thiooxo" refers to the group =S.

Nitrogen atoms can be substituted or unsubstituted as valency permits, and include primary, secondary, tertiary, and quaternary nitrogen atoms. Exemplary nitrogen atom substituents include, but are not limited to, hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{bb}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(OR$^{cc}$)$_2$, —P(=O)(R$^{aa}$)$_2$, —P(=O)(N(R$^{cc}$)$_2$)$_2$, C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined above.

In certain embodiments, the substituent present on the nitrogen atom is an nitrogen protecting group (also referred to herein as an "amino protecting group"). Nitrogen protecting groups include, but are not limited to, —OH, —OR$^{aa}$, —N(R$^{cc}$)$_2$, —C(=O)R$^{aa}$, —C(=O)N(R$^{cc}$)$_2$, —CO$_2$R$^{aa}$, —SO$_2$R$^{aa}$, —C(=NR$^{cc}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, C$_{1-10}$ alkyl (e.g., aralkyl, heteroaralkyl), C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl groups, wherein each alkyl, alkenyl, alkynyl, heteroalkyl, heteroalkenyl, heteroalkynyl, carbocyclyl, heterocyclyl, aralkyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

For example, nitrogen protecting groups such as amide groups (e.g., —C(=O)R$^{aa}$) include, but are not limited to, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxyacylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide and o-(benzoyloxymethyl)benzamide.

Nitrogen protecting groups such as carbamate groups (e.g., C(=O)OR$^{aa}$) include, but are not limited to, methyl carbamate, ethyl carbamate, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl) ethyl carbamate (Pyoc), 2-(N,N-dicyclohexylcarboxamido) ethyl carbamate, t-butyl carbamate (BOC or Boc), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo) benzyl carbamate, 2,4,6-tri-t-butylphenyl carbamate, 4-(trimethylammonium)benzyl carbamate, and 2,4,6-trimethylbenzyl carbamate.

Nitrogen protecting groups such as sulfonamide groups (e.g., S(=O)$_2$R$^{aa}$) include, but are not limited to, p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Other nitrogen protecting groups include, but are not limited to, phenothiazinyl-(10)-acyl derivative, N'-p-toluenesulfonylaminoacyl derivative, N'-phenylaminothioacyl derivative, N-benzoylphenylalanyl derivative, N-acetylmethionine derivative, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene)amine, N,N'-isopropylidenediamine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl)amine, N-borane derivative, N-diphenylborinic acid derivative, N-[phenyl(pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys).

In certain embodiments, the substituent present on an oxygen atom is an oxygen protecting group (also referred to herein as an "hydroxyl protecting group"). Oxygen protecting groups include, but are not limited to, —$R^{aa}$, —$N(R^{bb})_2$, —$C(=O)SR^{aa}$, —$C(=O)R^{aa}$, —$CO_2R^{aa}$, —$C(=O)N(R^{bb})_2$, —$C(=NR^{bb})R^{aa}$, —$C(=NR^{bb})OR^{aa}$, —$C(=NR^{bb})N(R^{bb})_2$, —$S(=O)R^{aa}$, —$SO_2R^{aa}$, —$Si(R^{aa})_3$, —$P(R^{cc})_2$, —$P(R^{cc})_3{}^+X^-$, —$P(OR^{cc})_2$, —$P(OR^{cc})_3{}^+X^-$, —$P(=O)(R^{aa})_2$, —$P(=O)(OR^{cc})_2$, and —$P(=O)(N(R^{bb})_2)_2$, wherein $X^-$, $R^{aa}$, $R^{bb}$, and $R^{cc}$ are as defined herein. Oxygen protecting groups are well known in the art and include those described in detail in *Protecting Groups in Organic Synthesis*, T. W. Greene and P. G. M. Wuts, 3rd edition, John Wiley & Sons, 1999, incorporated herein by reference.

Exemplary oxygen protecting groups include, but are not limited to, methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxide, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), methyl carbonate, 9-fluorenylmethyl carbonate (Fmoc), ethyl carbonate, 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), isobutyl carbonate, vinyl carbonate, allyl carbonate, t-butyl carbonate (BOC or Boc), p-nitrophenyl carbonate, benzyl carbonate, p-methoxybenzyl carbonate, 3,4-dimethoxybenzyl carbonate, o-nitrobenzyl carbonate, p-nitrobenzyl carbonate, S-benzyl thiocarbonate, 4-ethoxy-1-napthyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

In certain embodiments, the substituent present on a sulfur atom is a sulfur protecting group (also referred to as a "thiol protecting group"). Sulfur protecting groups include, but are not limited to, —$R^{aa}$, —$N(R^{bb})_2$, —$C(=O)SR^{aa}$, —$C(=O)R^{aa}$, —$CO_2R^{aa}$, —$C(=O)N(R^{bb})_2$, —$C(=NR^{bb})R^{aa}$, —$C(=NR^{bb})OR^{aa}$, —$C(=NR^{bb})N(R^{bb})_2$, —$S(=O)R^{aa}$, —$SO_2R^{aa}$, —$Si(R^{aa})_3$, —$P(R^{cc})_2$, —$P(R^{cc})_3{}^+X^-$, —$P(OR^{cc})_2$, —$P(OR^{cc})_3{}^+X^-$, —$P(=O)(R^{aa})_2$, —$P(=O)(OR^{cc})_2$, and —$P(=O)(N(R^{bb})_2)_2$, wherein $R^{aa}$, $R^{bb}$, and $R^{cc}$ are as defined herein. Sulfur protecting groups are well known in the art and include those described in detail in *Protecting Groups in Organic Synthesis*, T. W. Greene and P. G. M. Wuts, 3rd edition, John Wiley & Sons, 1999, incorporated herein by reference.

A "counterion" or "anionic counterion" is a negatively charged group associated with a positively charged group in order to maintain electronic neutrality. An anionic counterion may be monovalent (i.e., including one formal negative charge). An anionic counterion may also be multivalent (i.e., including more than one formal negative charge), such as divalent or trivalent. Exemplary counterions include halide ions (e.g., $F^-$, $Cl^-$, $Br^-$, $I^-$), $NO_3^-$, $ClO_4^-$, $OH^-$, $H_2PO_4^-$, $HCO_3^-$, $HSO_4^-$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), carboxylate ions (e.g., acetate, propanoate, benzoate, glycerate, lactate, tartrate, glycolate, gluconate, and the like), $BF_4^-$, $PF_4^-$, $PF_6^-$, $AsF_6^-$, $SbF_6^-$, $B[3,5-(CF_3)_2C_6H_3]_4^-$, $B(C_6F_5)_4^-$, $BPh_4^-$, $Al(OC(CF_3)_3)_4^-$, and carborane anions (e.g., $CB_{11}H_{12}^-$ or $(HCB_{11}Me_5Br_6)^-$). Exemplary counterions which may be multivalent include $CO_3^{2-}$, $HPO_4^{2-}$, $PO_4^{3-}$, $B_4O_7^{2-}$, $SO_4^{2-}$, $S_2O_3^{2-}$, carboxylate anions (e.g., tartrate, citrate, fumarate, maleate, malate, malonate, gluconate, succinate, glutarate, adipate, pimelate, suberate, azelate, sebacate, salicylate, phthalates, aspartate, glutamate, and the like), and carboranes.

As used herein, a "leaving group" (LG) is an art-understood term referring to a molecular fragment that departs with a pair of electrons in heterolytic bond cleavage, wherein the molecular fragment is an anion or neutral molecule. As used herein, a leaving group can be an atom or a group capable of being displaced by a nucleophile. See, for example, Smith, *March Advanced Organic Chemistry* 6th ed. (501-502). Exemplary leaving groups include, but are not limited to, halo (e.g., chloro, bromo, iodo) and activated substituted hydroxyl groups (e.g., —OC(=O)SR$^{aa}$, —OC(=O)R$^{aa}$, —OCO$_2$R$^{aa}$, —OC(=O)N(R$^{bb}$)$_2$, —OC(=NR$^{bb}$)R$^{aa}$, —OC(=NR$^{bb}$)R$^{aa}$, —OC(=NR$^{bb}$)N(R$^{bb}$)$_2$, —OS(=O)R$^{aa}$, —OSO$_2$R$^{aa}$, —OP(R$^{cc}$)$_2$, —OP(R$^{cc}$)$_3$, —OP(=O)$_2$R$^{aa}$, —OP(=O)(R$^{aa}$)$_2$, —OP(=O)(OR$^{cc}$)$_2$, —OP(=O)$_2$N(R$^{bb}$)$_2$, and —OP(=O)(NR$^{bb}$)$_2$, wherein R$^{aa}$, R$^{bb}$, and R$^{cc}$ are as defined herein).

As used herein, use of the phrase "at least one instance" refers to 1, 2, 3, 4, or more instances, but also encompasses a range, e.g., for example, from 1 to 4, from 1 to 3, from 1 to 2, from 2 to 4, from 2 to 3, or from 3 to 4 instances, inclusive.

These and other exemplary substituents are described in more detail in the Detailed Description, Examples, and Claims. The invention is not intended to be limited in any manner by the above exemplary listing of substituents.

The polymers described herein include ionic forms and salt forms. The term "salt" refers to ionic compounds that result from the neutralization reaction of an acid and a base. A salt is composed of one or more cations (positively charged ions) and one or more anions (negative ions) so that the salt is electrically neutral (without a net charge). Salts of the polymers of this disclosure include those derived from inorganic and organic acids and bases. Examples of acid addition salts are salts of an amino group formed with inorganic acids such as hydrochloric acid, hydrobromic acid, phosphoric acid, sulfuric acid, and perchloric acid, or with organic acids such as acetic acid, oxalic acid, maleic acid, tartaric acid, citric acid, succinic acid, or malonic acid or by using other methods known in the art such as ion exchange. Other salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}$ alkyl$)_4$ salts. Representative alkali or alkaline earth metal salts include sodium, lithium, potassium, calcium, magnesium, and the like. Further salts include ammonium, quaternary ammonium, and amine cations formed using counterions such as halide, hydroxide, carboxylate, sulfate, phosphate, nitrate, lower alkyl sulfonate, and aryl sulfonate.

In certain embodiments, the salt is a pharmaceutically acceptable salt. The term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al. describe pharmaceutically acceptable salts in detail in *J. Pharmaceutical Sciences*, 1977, 66, 1-19, incorporated herein by reference. Pharmaceutically acceptable salts of the compounds of this disclosure include those derived from suitable inorganic and organic acids and bases. Examples of pharmaceutically acceptable, nontoxic acid addition salts are salts of an amino group formed with inorganic acids, such as hydrochloric acid, hydrobromic acid, phosphoric acid, sulfuric acid, and perchloric acid or with organic acids, such as acetic acid, oxalic acid, maleic acid, tartaric acid, citric acid, succinic acid, or malonic acid or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium, and $N^+(C_{1-4}$ alkyl$)_4^-$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

The term "polymer" refers to a molecule comprised of two or more (e.g., 10 or more) repeating units which are covalently bonded together. In certain embodiments, a polymer comprises 10 or more, 50 or more, 100 or more, 1000 or more, 2000 or more, or 4000 or more repeating units. In certain embodiments, a polymer comprises more than 4000 repeating units. The repeating units of a polymer are referred to as "monomers." A "homopolymer" is a polymer that consists of a single repeating monomer. A "copolymer" is a polymer that comprises two or more different monomer subunits. Copolymers include, but are not limited to, random, block, alternating, segmented, linear, branched, grafted, and tapered copolymers. Polymers may be natural (e.g., naturally occurring polypeptides), or synthetic (e.g., non-naturally occurring). A polymer may have an overall molecular weight of 50 Da or greater, 100 Da or greater, 500 Da or greater, 1000 Da or greater, 2000 Da or greater, 5000 Da or greater, 10000 Da or greater, 20000 Da or greater, or 50000 Da or greater.

The term "monomer" refers to a molecule that may be covalently joined to other monomers to form a polymer. The process by which the monomers are combined to form a polymer is called polymerization. A macromolecule with a reactive moiety that enables it to act as a monomer is called a macromonomer.

"Block copolymers" are copolymers comprising homopolymer subunits (i.e., "blocks") covalently linked together. The blocks of a block copolymer are separated into distinct domains. A "diblock copolymer" is a block copolymer comprising two distinct homopolymer domains. A "triblock copolymer" is a block copolymer comprising three distinct homopolymer domains, etc. Each distinct homopolymer domain of a block copolymer is of a different polymeric composition (e.g., comprising different repeating monomers).

The term "average polydispersity" (PDI) as used herein refers to a measure of the distribution of molecular size in a mixture, e.g., as determined by a chromatographic method, such as gel permeation chromatography or size exclusion chromatography, or through dynamic light scattering.

BRIEF DESCRIPTION OF THE DRAWINGS

The accompanying drawings, which constitute a part of this specification, illustrate several embodiments of the invention and together with the description, serve to explain the principles of the invention.

FIG. 3A. SAXS patterns of $PiBOH_{84}$-b-$PS_{51}$. FIG. 3B. SAXS patterns of $PiBOH_{16}$-b-$PS_{14}$. FIGS. 3A-3B. The inset is a representative TEM image, where the scale bar is 100 nm. The star marks denote the scattering peak from Kapton tape.

FIG. 4. Plot of ln d against ln N.

FIGS. 18-19. Exemplary synthesis of PS-b-PiBOH block copolymer. Spectral and analytical data is also shown.

DETAILED DESCRIPTION OF CERTAIN EMBODIMENTS

Figure 1:
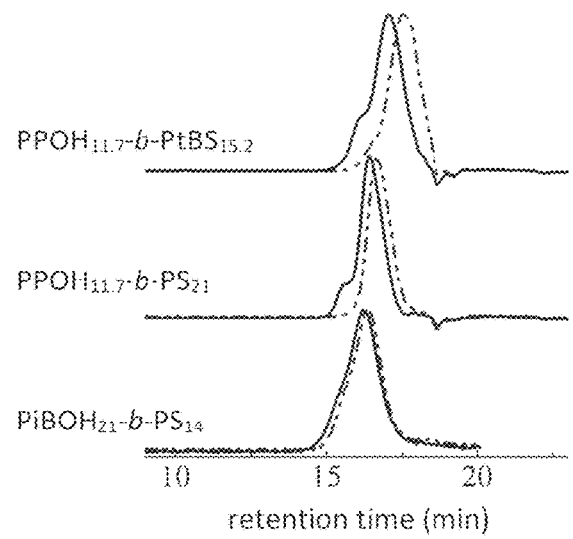
FIG. 1. GPC traces on the synthesis of $PiBOH_{21}$-b-$PS_{14}$, $PPOH_{11.7}$-b-$PS_{21}$, and $PPOH_{11.7}$-b-$PtBS_{15.2}$. The dashed traced are before $LiAlH_4$ reduction, and the solid lines are the final products.

Provided herein are polymers that, in certain embodiments, self-assemble to form well-defined nanostructures. In some instances, the nanostructures exhibit relatively small d-spacing (e.g., a d-spacing value of 10 nm or less), which can lead to more well-defined nanostructures. Due to their properties, the polymers described herein are useful in a variety of applications including functional materials and biomedical applications (e.g., drug delivery systems, nanowires, bit-patterned storage media, filtration membranes, and more). Also provided herein are compositions and materials comprising the polymers, and uses of the polymers.

In certain embodiments, the polymers are prepared from derivatization (e.g., reduction) of polymers (e.g., homopolymers, copolymers, block copolymers) comprising acrylate repeating units. Another aspect of the present invention provides methods for preparing the polymers provided herein. These methods may involve assembling a homopolymer or copolymer, followed by derivatization (e.g., reduction, substitution, etc.) of the acrylate portions of the polymer.

Polymers

In one aspect, the present invention provides polymers (e.g., homopolymers, copolymers, block copolymers). In certain embodiments, the polymers comprise polyacrylate repeating units that have been derivatized (e.g., reduced, and optionally further derivatized). For example, in certain embodiments, the present invention provides homopolymers or copolymers comprising acrylate repeating units, wherein the acrylate repeating units have been reduced. In certain embodiments, the acrylate repeating units are not poly (methyl methacrylate) (PMMA) repeating units. The present invention also provides block copolymers (e.g., diblock, triblock, tetrablock copolymers) wherein at least one block comprises acrylate repeating units, wherein the acrylate repeating units have been reduced. In certain embodiments, the polymers have useful properties, such as defined structures after self-assembly. In certain embodiments, the polymers self-assemble to form specific morphologies (e.g., lamellar, hexagonal cylinder, body centered cubic morphology) with certain d-spacing values (e.g., less than 10 nm). The well-defined morphologies and relatively small d-spacing values of polymers described herein can confer advantageous properties, and thus the polymers are useful in, e.g., functional materials and biomedical applications (e.g., drug delivery systems, nanowires, bit-patterned storage media, filtration membranes, and more).

Provided herein are polymers comprising repeating units of the following formula:

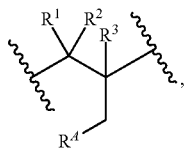

wherein:
R¹, R², and R³ are independently hydrogen, halogen, optionally substituted alkyl, optionally substituted carbocyclyl, optionally substituted heterocyclyl, optionally substituted aryl, or optionally substituted heteroaryl;
R$^A$ is halogen, —OR$^O$, —SR$^S$, —N(R$^N$)$_2$, or substituted phosphorous;
each instance of R$^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group;
each instance of R$^N$ is independently hydrogen, optionally substituted alkyl, optionally substituted carbocyclyl, optionally substituted heterocyclyl, optionally substituted aryl, optionally substituted heteroaryl, optionally substituted acyl, or a nitrogen protecting group; optionally wherein two R$^N$ attached to the same nitrogen atom are joined together with the intervening atoms to form optionally substituted heterocyclyl or optionally substituted heteroaryl;
each instance of R$^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group; and
each instance of R$^S$ is independently hydrogen, optionally substituted alkyl, optionally substituted carbocyclyl, optionally substituted heterocyclyl, optionally substituted aryl, optionally substituted heteroaryl, optionally substituted acyl, or a sulfur protecting group;
provided that the repeating unit is not of the formula:

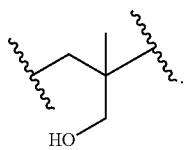

In certain embodiments, the polymer comprises repeating units of one of the following formulae:

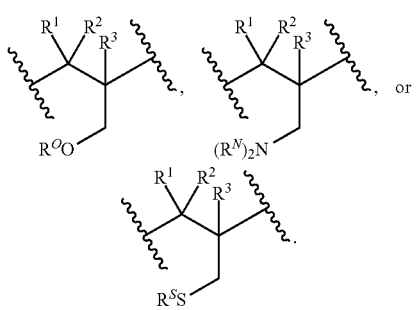

In certain embodiments, the polymer comprises repeating units of the following formula:

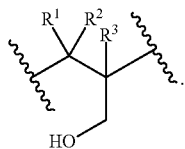

In certain embodiments, the polymer comprises repeating units of the following formula:

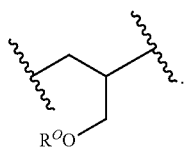

In certain embodiments, the polymer is a reduced form of poly(methyl acrylate), comprising repeating units of the following formula:

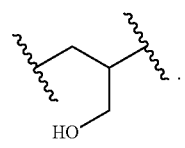

In certain embodiments, the polymer is a block copolymer. Provided herein are block copolymers, wherein at least one of the polymer blocks comprises repeating units of the following formula:

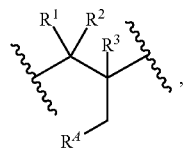

wherein:
R¹, R², and R³ are independently hydrogen, halogen, optionally substituted alkyl, optionally substituted carbocyclyl, optionally substituted heterocyclyl, optionally substituted aryl, or optionally substituted heteroaryl;
R$^A$ is halogen, —OR$^O$, —SR$^S$, —N(R$^N$)$_2$, or substituted phosphorous;
each instance of R$^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group;
each instance of R$^N$ is independently hydrogen, optionally substituted alkyl, optionally substituted carbocyclyl, optionally substituted heterocyclyl, optionally substituted aryl, optionally substituted heteroaryl, optionally substituted acyl, or a nitrogen protecting group; optionally wherein two R$^N$ attached to the same nitrogen atom are joined together with the intervening atoms to form optionally substituted heterocyclyl or optionally substituted heteroaryl;

each instance of $R^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group; and each instance of $R^S$ is independently hydrogen, optionally substituted alkyl, optionally substituted carbocyclyl, optionally substituted heterocyclyl, optionally substituted aryl, optionally substituted heteroaryl, optionally substituted acyl, or a sulfur protecting group.

In certain embodiments, at least one of the polymer blocks of the block copolymer comprises repeating units of one of the following formulae:

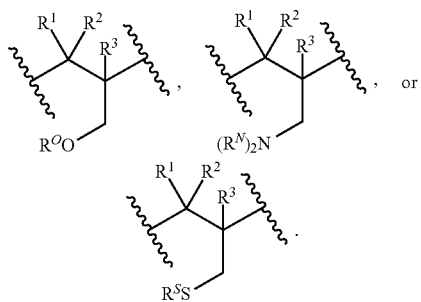

In certain embodiments, at least one of the polymer blocks of the block copolymer comprises repeating units of the following formula:

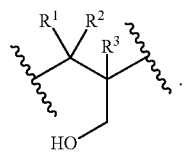

In certain embodiments, at least one of the polymer blocks of the block copolymer comprises repeating units of the following formula:

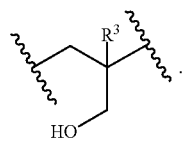

In certain embodiments, at least one of the polymer blocks of the block copolymer comprises repeating units of the following formula:

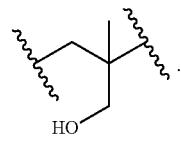

In certain embodiments, at least one of the polymer blocks of the block copolymer

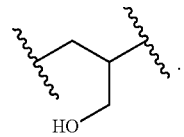 [SMILES: *CC(*)CO]

comprises repeating units of the following formula:

In certain embodiments, the block copolymer is a diblock copolymer. In certain embodiments, the block copolymer is a triblock or tetrablock copolymer. In certain embodiments, the block copolymer comprises five or more polymer blocks.

The additional polymer blocks of the block copolymer described herein can be composed of any polymeric material (e.g., any monomers). Examples of polymers include, but are not limited to, polyvinyl polymers (e.g., polyvinyl chloride), polyethylenes (e.g., polyethylene, polytetrafluoroethylene), polypropylenes, polyacetylenes, polyethers (e.g., polyethylene glycol, polyoxymethylene, polypropylene glycol, polytetramethylene glycol, poly(ethyl ethylene) phosphate, poly(oxazoline)), polyamines, polyesters (e.g., polyglycolic acid, polylactic acid, poly(lactic-co-glycolic acid), polycaprolactone, polyhydroxyalkanoate, polyhydroxybutryate, polyethylene adipate, polybutylene succinate, poly(3-hydroxybutyrate-co-3-hydroxyvalerate), polysilanes, polysiloxanes (e.g., polydimethylsiloxane), polyacrylates (e.g., polymethacrylate, poly(n-butyl acrylate), poly(tert-butyl acrylate)), polystyrenes, polylactides (e.g., polylactic acid), polyamino acids, polypeptides, polyamides, polyacrylamides (e.g., polymethylacrylamide), and polysaccharides.

For example, in certain embodiments, the block copolymer comprises a second polymer block, wherein the second polymer block comprises repeating units of the formula:

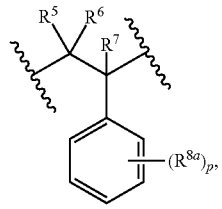

wherein:

$R^5$, $R^6$, and $R^7$ are independently hydrogen, halogen, optionally substituted alkyl, optionally substituted carbocyclyl, optionally substituted heterocyclyl, optionally substituted aryl, or optionally substituted heteroaryl;

each instance of $R^{8a}$ is independently hydrogen, halogen, —CN, —NO$_2$, —N$_3$, optionally substituted alkyl, optionally substituted carbocyclyl, optionally substituted heterocyclyl, optionally substituted aryl, optionally substituted heteroaryl, optionally substituted acyl, —OR$^O$, —SR$^S$, or —N(R$^N$)$_2$;

each instance of $R^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group;

each instance of $R^N$ is independently hydrogen, optionally substituted alkyl, optionally substituted carbocyclyl, optionally substituted heterocyclyl, optionally substituted aryl, optionally substituted heteroaryl, optionally substituted acyl, or a nitrogen protecting group; optionally wherein two $R^N$ attached to the same nitrogen atom are joined together with the intervening atoms to form optionally substituted heterocyclyl or optionally substituted heteroaryl;

each instance of $R^S$ is independently hydrogen, optionally substituted alkyl, optionally substituted carbocyclyl, optionally substituted heterocyclyl, optionally substituted aryl, optionally substituted heteroaryl, optionally substituted acyl, or a sulfur protecting group; and p is 0, 1, 2, 5, 4, or 5.

In certain embodiments, the second polymer block is a polymer composed of optionally substituted styrene monomers. In certain embodiments, the second polymer block is polystyrene (PS), poly(4-vinylanisole), poly(4-acetoxystyrene), poly(4-tert-butoxystyrene), poly(4-fluorostyrene), poly(3-nitrostyrene), poly(α-methylstyrene), poly(methylstyrene), or poly(4-tert-butylstyrene).

In certain embodiments, the block copolymer comprises a polystyrene (PS) block, wherein the repeating units of the second polymer block are of the formula:

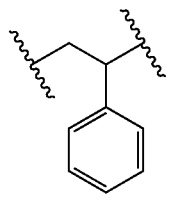

In certain embodiments, the block copolymer comprises a poly(4-tert-butylstyrene) (PtBS) block, wherein the repeating units of the second polymer block are of the formula:

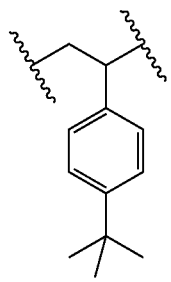

In certain embodiments, the block copolymers provided herein are of Formula (I):

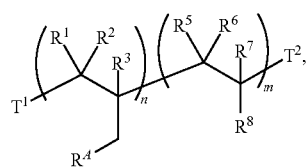

(I)

wherein:

$T^1$ and $T^2$ are independently terminal groups selected from the group consisting of hydrogen, halogen, optionally substituted alkyl, optionally substituted alkenyl, optionally substituted alkynyl, optionally substituted heteroalkyl, optionally substituted carbocyclyl, optionally substituted heterocyclyl, optionally substituted aryl, optionally substituted heteroaryl, and optionally substituted acyl, and polymers;

$R^A$ is halogen, $-OR^O$, $-SR^S$, $-N(R^N)_2$, or substituted phosphorous;

each instance of $R^O$ is independently hydrogen, optionally substituted alkyl, optionally substituted carbocyclyl, optionally substituted heterocyclyl, optionally substituted aryl, optionally substituted heteroaryl, optionally substituted acyl, or an oxygen protecting group;

each instance of $R^N$ is independently hydrogen, optionally substituted alkyl, optionally substituted carbocyclyl, optionally substituted heterocyclyl, optionally substituted aryl, optionally substituted heteroaryl, optionally substituted acyl, or a nitrogen protecting group; optionally wherein two $R^N$ attached to the same nitrogen atom are joined together with the intervening atoms to form optionally substituted heterocyclyl or optionally substituted heteroaryl;

each instance of $R^O$ is independently hydrogen, optionally substituted alkyl, optionally substituted carbocyclyl, optionally substituted heterocyclyl, optionally substituted aryl, optionally substituted heteroaryl, optionally substituted acyl, or a sulfur protecting group; and each instance of $R^S$ is independently hydrogen, optionally substituted alkyl, optionally substituted carbocyclyl, optionally substituted heterocyclyl, optionally substituted aryl, optionally substituted heteroaryl, optionally substituted acyl, or a sulfur protecting group $R^1$, $R^2$, and $R^3$ are independently hydrogen, halogen, optionally substituted alkyl, optionally substituted carbocyclyl, optionally substituted heterocyclyl, optionally substituted aryl, or optionally substituted heteroaryl;

$R^5$, $R^6$, and $R^7$ are independently hydrogen, halogen, optionally substituted alkyl, optionally substituted carbocyclyl, optionally substituted heterocyclyl, optionally substituted aryl, or optionally substituted heteroaryl;

$R^8$ is optionally substituted alkyl, optionally substituted carbocyclyl, optionally substituted heterocyclyl, optionally substituted aryl, optionally substituted heteroaryl, or optionally substituted acyl; or $R^8$ is a polymer; and n and m are independently integers from 1 to 2000, inclusive.

In certain embodiments, the block copolymer is of one of the following formulae:

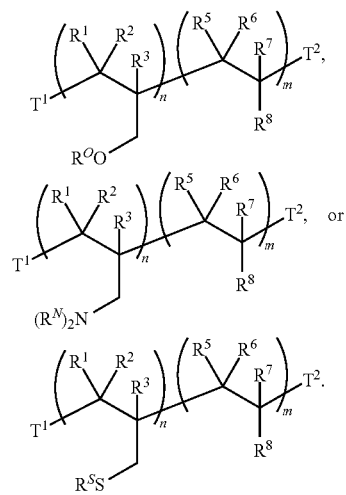

In certain embodiments, the block copolymer is of Formula (II):

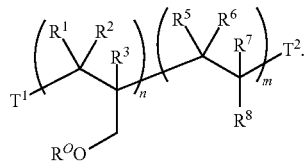
(II)

In certain embodiments, the block copolymer is of Formula (III):

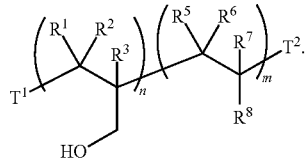
(III)

In certain embodiments, the block copolymer is of the formula:

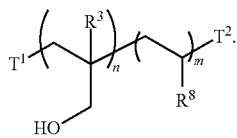

In certain embodiments, the block copolymer is of the formula:

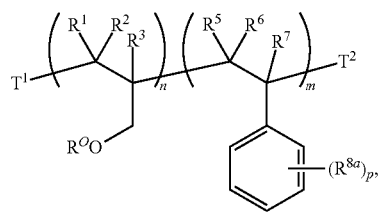

wherein:
each instance of $R^{8a}$ is independently hydrogen, halogen, —CN, —NO$_2$, —N$_3$, optionally substituted alkyl, optionally substituted carbocyclyl, optionally substituted heterocyclyl, optionally substituted aryl, optionally substituted heteroaryl, optionally substituted acyl, —OR$^O$, —SR$^S$, or —N(R$^N$)$_2$; and p is 0, 1, 2, 5, 4, or 5.

In certain embodiments, the block copolymer is of the formula:

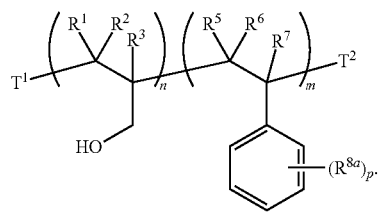

In certain embodiments, the block copolymer is of the formula:

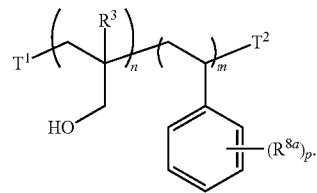

In certain embodiments, the block copolymer is of the formula:

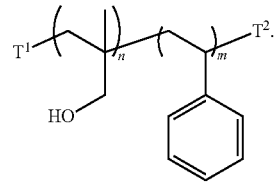

In certain embodiments, the block copolymer is of the formula:

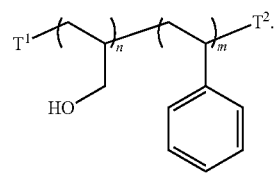

In certain embodiments, the block copolymer is of the formula:

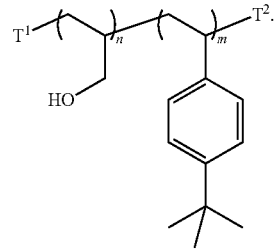

As generally defined herein, n is an integer from 1-2000, inclusive. In certain embodiments, n is from 2-1000, inclusive. In certain embodiments, n is from 2-200, inclusive. In certain embodiments, n is from 2-100, inclusive. In certain embodiments, n is from 2-50, inclusive. In certain embodiments, n is from 2-40, inclusive. In certain embodiments, n is from 2-30, inclusive. In certain embodiments, n is from 2-20, inclusive. In certain embodiments, n is from 2-10, inclusive. In certain embodiments, n is from 5-20, inclusive.

As generally defined herein, m is an integer from 1-2000, inclusive. In certain embodiments, m is from 2-1000, inclusive. In certain embodiments, m is from 2-200, inclusive. In certain embodiments, m is from 2-100, inclusive. In certain embodiments, m is from 2-50, inclusive. In certain embodiments, m is from 2-40, inclusive. In certain embodiments, m is from 2-30, inclusive. In certain embodiments, m is from 2-20, inclusive. In certain embodiments, m is from 2-10, inclusive. In certain embodiments, m is from 5-20, inclusive.

The ratio of n to m can be any ratio. In certain embodiments, the ratio of n to m is approximately 1:1. In certain embodiments, the ratio of n to m is approximately from 1:1 to 1:2. In certain embodiments, the ratio of n to m is approximately 1:1.1. In certain embodiments, the ratio of n to m is approximately 1:1.2. In certain embodiments, the ratio of n to m is approximately 1:1.3. In certain embodiments, the ratio of n to m is approximately 1:1.4. In certain embodiments, the ratio of n to m is approximately 1:1.5. In certain embodiments, the ratio of n to m is approximately 1:1.6. In certain embodiments, the ratio of n to m is approximately 1:1.7. In certain embodiments, the ratio of n to m is approximately 1:1.8. In certain embodiments, the ratio of n to m is approximately 1:1.9. In certain embodiments, the ratio of n to m is approximately 1:2.0.

In certain embodiments, the ratio of m to n is approximately from 1:1 to 1:2. In certain embodiments, the ratio of m to n is approximately 1:1.1. In certain embodiments, the ratio of m to n is approximately 1:1.2. In certain embodiments, the ratio of m to n is approximately 1:1.3. In certain embodiments, the ratio of m to n is approximately 1:1.4. In certain embodiments, the ratio of m to n is approximately 1:1.5. In certain embodiments, the ratio of m to n is approximately 1:1.6. In certain embodiments, the ratio of m to n is approximately 1:1.7. In certain embodiments, the ratio of m to n is approximately 1:1.8. In certain embodiments, the ratio of m to n is approximately 1:1.9. In certain embodiments, the ratio of m to n is approximately 1:2.0.

The polymers described herein may self-assemble into form structures with any morphology. In certain embodiments, the polymers self-assemble into structures with hexagonal cylindrical, gyroid, spherical, lamellar, ellipsoidal, polyhedral, or cubic morphologies. In certain embodiments, the polymer has a lamellae, hexagonal cylinder, or body-centered cubic morphology.

Self-assembled polymers described herein have d-spacing values which can be measured. "d-spacing," as used herein, refers to the spacing or distance between successive planes of atoms in an ordered nanostructure. In certain embodiments, the d-spacing value is from 1-50 nm. In certain embodiments, the d-spacing value is from 1-40 nm. In certain embodiments, the d-spacing value is from 1-30 nm. In certain embodiments, the d-spacing value is from 1-20 nm. In certain embodiments, the d-spacing value is less than 20 nm. In certain embodiments, the d-spacing value is less than 25 nm. In certain embodiments, the d-spacing value is less than 24 nm. In certain embodiments, the d-spacing value is less than 23 nm. In certain embodiments, the d-spacing value is less than 22 nm. In certain embodiments, the d-spacing value is less than 21 nm. In certain embodiments, the d-spacing value is less than 20 nm. In certain embodiments, the d-spacing value is less than 19 nm. In certain embodiments, the d-spacing value is less than 18 nm. In certain embodiments, the d-spacing value is less than 17 nm. In certain embodiments, the d-spacing value is less than 16 nm. In certain embodiments, the d-spacing value is less than 15 nm. In certain embodiments, the d-spacing value is less than 14 nm. In certain embodiments, the d-spacing value is less than 13 nm. In certain embodiments, the d-spacing value is less than 12 nm. In certain embodiments, the d-spacing value is less than 11 nm. In certain embodiments, the d-spacing value is less than 10 nm. In certain embodiments, the d-spacing value from 1-10 nm. In certain embodiments, the d-spacing value from 5-10 nm. In certain embodiments, the d-spacing value is less than 9 nm. In certain embodiments, the d-spacing value is less than 8 nm. In certain embodiments, the d-spacing value is less than 7 nm. In certain embodiments, the d-spacing value is less than 6 nm. In certain embodiments, the d-spacing value is less than 5 nm. In a preferred embodiment, the d-spacing value is less than 10 nm.

Polymers described herein may be of any molecular weight. A polymer may have an overall molecular weight of approximately 10 Da or greater, approximately 20 Da or greater, approximately 30 Da or greater, approximately 50 Da or greater, approximately 100 Da or greater, approximately 500 Da or greater, approximately 1000 Da or greater, approximately 2000 Da or greater, approximately 5000 Da or greater, approximately 10000 Da or greater, approximately 20000 Da or greater, or approximately 50000 Da or greater.

The following R group definitions apply to all polymers, compounds, and methods described herein.

As generally defined herein, $R^A$ is halogen, $-OR^O$, $-SR^S$, $-N(R^N)_2$, or substituted phosphorous. In certain embodiments, $R^A$ is halogen (e.g., $-Cl$, $-F$, $-Br$, $-I$). In certain embodiments, $R^A$ is $-OR^O$. In certain embodiments, $R^A$ is $-SR^S$. In certain embodiments, $R^A$ is $-N(R^N)_2$. In certain embodiments, $R^A$ is substituted phosphorous (e.g., $-P(R_{cc})_2$, $-P(OR_{cc})_2$, $-P(R_{cc})_3^+X^-$, $-P(OR_{cc})_3^+X^-$, $-P(R_{cc})_4$, $-P(OR_{cc})_4$, $-P(=O)(N(R_{bb})_2)_2$, $-P(=O)(R_{aa})_2$, or $-P(=O)(OR_{cc})_2$).

As generally defined herein, $R^1$ is hydrogen, halogen, optionally substituted alkyl, optionally substituted aryl, optionally substituted heteroaryl, optionally substituted carbocyclyl, or optionally substituted heterocyclyl. In certain embodiments, $R^1$ is hydrogen. In certain embodiments, $R^1$ is halogen (e.g., $-Cl$, $-F$, $-Br$, $-I$). In certain embodiments, $R^1$ is optionally substituted alkyl. In certain embodiments, $R^1$ is optionally substituted aryl. In certain embodiments, $R^1$ is optionally substituted heteroaryl. In certain embodiments, $R^1$ is optionally substituted carbocyclyl. In certain embodiments, $R^1$ is optionally substituted heterocyclyl. In certain embodiments, $R^1$ is optionally substituted $C_{1-6}$ alkyl. In certain embodiments, $R^1$ is unsubstituted $C_{1-6}$ alkyl. In certain embodiments, $R^1$ is optionally substituted $C_{1-3}$ alkyl. In certain embodiments, $R^1$ is unsubstituted $C_{1-3}$ alkyl. In certain embodiments, $R^1$ is selected from the group consisting of methyl, ethyl, n-propyl, iso-propyl, n-butyl, sec-butyl, iso-butyl, and tert-butyl. In certain embodiments, $R^1$ is methyl.

As generally defined herein, $R^2$ is hydrogen, halogen, optionally substituted alkyl, optionally substituted aryl, optionally substituted heteroaryl, optionally substituted carbocyclyl, or optionally substituted heterocyclyl. In certain embodiments, $R^2$ is hydrogen. In certain embodiments, $R^2$ is halogen (e.g., $-Cl$, $-F$, $-Br$, $-I$). In certain embodiments, $R^2$ is optionally substituted alkyl. In certain embodiments, $R^2$ is optionally substituted aryl. In certain embodiments, $R^2$ is optionally substituted heteroaryl. In certain embodiments, $R^2$ is optionally substituted carbocyclyl. In certain embodiments, $R^2$ is optionally substituted heterocyclyl. In certain embodiments, $R^2$ is optionally substituted $C_{1-6}$ alkyl. In certain embodiments, $R^2$ is unsubstituted $C_{1-6}$ alkyl. In certain embodiments, $R^2$ is optionally substituted $C_{1-3}$ alkyl. In certain embodiments, $R^2$ is unsubstituted $C_{1-3}$ alkyl. In certain embodiments, $R^2$ is selected from the group consisting of methyl, ethyl, n-propyl, iso-propyl, n-butyl, sec-butyl, iso-butyl, and tert-butyl. In certain embodiments, $R^2$ is methyl.

As generally defined herein, $R^3$ is hydrogen, halogen, optionally substituted alkyl, optionally substituted aryl, optionally substituted heteroaryl, optionally substituted carbocyclyl, or optionally substituted heterocyclyl. In certain embodiments, $R^3$ is hydrogen. In certain embodiments, $R^3$ is halogen (e.g., —Cl, —F, —Br, —I). In certain embodiments, $R^3$ is optionally substituted alkyl. In certain embodiments, $R^3$ is optionally substituted aryl. In certain embodiments, $R^3$ is optionally substituted heteroaryl. In certain embodiments, $R^3$ is optionally substituted carbocyclyl. In certain embodiments, $R^3$ is optionally substituted heterocyclyl. In certain embodiments, $R^3$ is optionally substituted $C_{1-6}$ alkyl. In certain embodiments, $R^3$ is unsubstituted $C_{1-6}$ alkyl. In certain embodiments, $R^3$ is optionally substituted $C_{1-3}$ alkyl. In certain embodiments, $R^3$ is unsubstituted $C_{1-3}$ alkyl. In certain embodiments, $R^3$ is selected from the group consisting of methyl, ethyl, n-propyl, iso-propyl, n-butyl, sec-butyl, iso-butyl, and tert-butyl. In certain embodiments, $R^3$ is methyl.

In certain embodiments, $R^1$, $R^2$, and $R^3$ are each hydrogen. In certain embodiments, $R^1$ and $R^2$ are hydrogen; and $R^3$ is methyl. In certain embodiments, $R^3$ is not methyl.

As generally defined herein, $R^5$ is hydrogen, halogen, optionally substituted alkyl, optionally substituted aryl, optionally substituted heteroaryl, optionally substituted carbocyclyl, or optionally substituted heterocyclyl. In certain embodiments, $R^5$ is hydrogen. In certain embodiments, $R^5$ is halogen (e.g., —Cl, —F, —Br, —I). In certain embodiments, $R^5$ is optionally substituted alkyl. In certain embodiments, $R^5$ is optionally substituted aryl. In certain embodiments, $R^5$ is optionally substituted heteroaryl. In certain embodiments, $R^5$ is optionally substituted carbocyclyl. In certain embodiments, $R^5$ is optionally substituted heterocyclyl. In certain embodiments, $R^5$ is optionally substituted $C_{1-6}$ alkyl. In certain embodiments, $R^5$ is unsubstituted $C_{1-6}$ alkyl. In certain embodiments, $R^5$ is optionally substituted $C_{1-3}$ alkyl. In certain embodiments, $R^5$ is unsubstituted $C_{1-3}$ alkyl. In certain embodiments, $R^5$ is selected from the group consisting of methyl, ethyl, n-propyl, iso-propyl, n-butyl, sec-butyl, iso-butyl, and tert-butyl. In certain embodiments, $R^5$ is methyl.

As generally defined herein, $R^6$ is hydrogen, halogen, optionally substituted alkyl, optionally substituted aryl, optionally substituted heteroaryl, optionally substituted carbocyclyl, or optionally substituted heterocyclyl. In certain embodiments, $R^6$ is hydrogen. In certain embodiments, $R^6$ is halogen (e.g., —Cl, —F, —Br, —I). In certain embodiments, $R^6$ is optionally substituted alkyl. In certain embodiments, $R^6$ is optionally substituted aryl. In certain embodiments, $R^6$ is optionally substituted heteroaryl. In certain embodiments, $R^6$ is optionally substituted carbocyclyl. In certain embodiments, $R^6$ is optionally substituted heterocyclyl. In certain embodiments, $R^6$ is optionally substituted $C_{1-6}$ alkyl. In certain embodiments, $R^6$ is unsubstituted $C_{1-6}$ alkyl. In certain embodiments, $R^6$ is optionally substituted $C_{1-3}$ alkyl. In certain embodiments, $R^6$ is unsubstituted $C_{1-3}$ alkyl. In certain embodiments, $R^6$ is selected from the group consisting of methyl, ethyl, n-propyl, iso-propyl, n-butyl, sec-butyl, iso-butyl, and tert-butyl. In certain embodiments, $R^6$ is methyl.

As generally defined herein, $R^7$ is hydrogen, halogen, optionally substituted alkyl, optionally substituted aryl, optionally substituted heteroaryl, optionally substituted carbocyclyl, or optionally substituted heterocyclyl. In certain embodiments, $R^7$ is hydrogen. In certain embodiments, $R^7$ is halogen (e.g., —Cl, —F, —Br, —I). In certain embodiments, $R^7$ is optionally substituted alkyl. In certain embodiments, $R^7$ is optionally substituted aryl. In certain embodiments, $R^7$ is optionally substituted heteroaryl. In certain embodiments, $R^7$ is optionally substituted carbocyclyl. In certain embodiments, $R^7$ is optionally substituted heterocyclyl. In certain embodiments, $R^7$ is optionally substituted $C_{1-6}$ alkyl. In certain embodiments, $R^7$ is unsubstituted $C_{1-6}$ alkyl. In certain embodiments, $R^7$ is optionally substituted $C_{1-3}$ alkyl. In certain embodiments, $R^7$ is unsubstituted $C_{1-3}$ alkyl. In certain embodiments, $R^7$ is selected from the group consisting of methyl, ethyl, n-propyl, iso-propyl, n-butyl, sec-butyl, iso-butyl, and tert-butyl. In certain embodiments, $R^7$ is methyl.

In certain embodiments, $R^5$, $R^6$, and $R^7$ are each hydrogen.

As generally defined herein, $R^8$ is optionally substituted alkyl, optionally substituted carbocyclyl, optionally substituted heterocyclyl, optionally substituted aryl, optionally substituted heteroaryl, or optionally substituted acyl; or $R^8$ is a polymer. In certain embodiments, $R^8$ is optionally substituted alkyl. In certain embodiments, $R^8$ is optionally substituted carbocyclyl. In certain embodiments, $R^8$ is optionally substituted heterocyclyl. In certain embodiments, $R^8$ is optionally substituted aryl. In certain embodiments, $R^8$ is optionally substituted heteroaryl. In certain embodiments, $R^8$ is optionally substituted acyl. In certain embodiments, $R^8$ is a polymer sidechain. In certain embodiments, $R^8$ is optionally substituted phenyl. In certain embodiments, $R^8$ is of the formula:

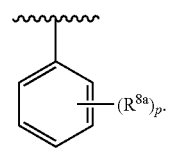

In certain embodiments, $R^8$ is of one of the following formulae:

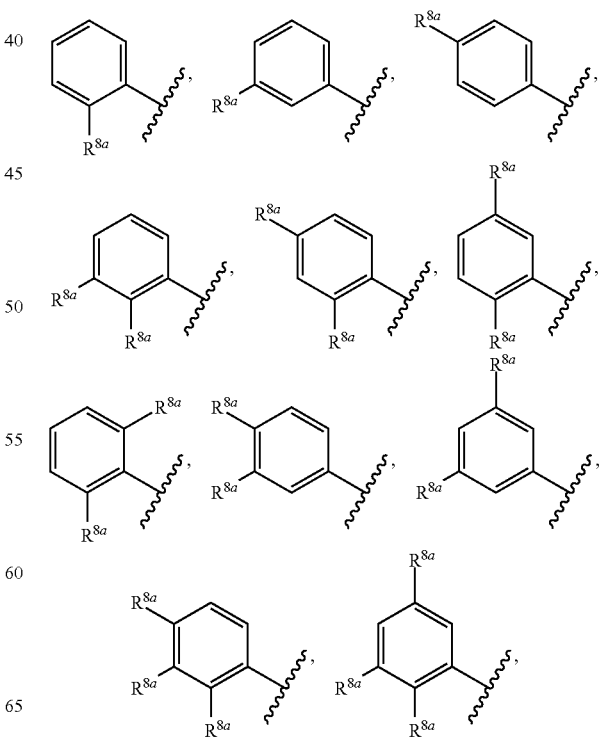

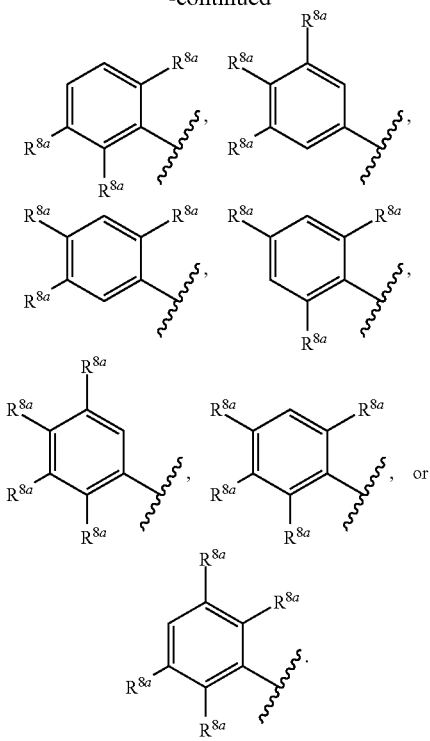

In certain embodiments, $R^8$ is of the formula:

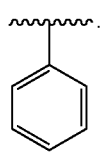

In certain embodiments, $R^8$ is of the formula:

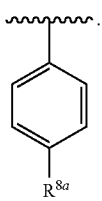

In certain embodiments, $R^8$ is of the formula:

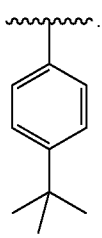

As defined herein, each instance of $R^{8a}$ is independently hydrogen, halogen, —CN, —NO$_2$, —N$_3$, optionally substituted alkyl, optionally substituted carbocyclyl, optionally substituted heterocyclyl, optionally substituted aryl, optionally substituted heteroaryl, optionally substituted acyl, —OR$^O$, —SR$^S$, or —N(R$^N$)$_2$. In certain embodiments, at least one instance of $R^{8a}$ is hydrogen. In certain embodiments, at least one instance of $R^{8a}$ is halogen. In certain embodiments, at least one instance of $R^{8a}$ is —CN. In certain embodiments, at least one instance of $R^{8a}$ is —NO$_2$. In certain embodiments, at least one instance of $R^{8a}$ is —N$_3$. In certain embodiments, at least one instance of $R^{8a}$ is optionally substituted alkyl. In certain embodiments, at least one instance of $R^{8a}$ is optionally substituted carbocyclyl. In certain embodiments, at least one instance of $R^{8a}$ is optionally substituted heterocyclyl. In certain embodiments, at least one instance of $R^{8a}$ is optionally substituted aryl. In certain embodiments, at least one instance of $R^{8a}$ is optionally substituted heteroaryl. In certain embodiments, at least one instance of $R^{8a}$ is optionally substituted acyl. In certain embodiments, at least one instance of $R^{8a}$ is —OR$^O$. In certain embodiments, at least one instance of $R^{8a}$ is —SR$^S$. In certain embodiments, at least one instance of $R^{8a}$ is —N(R$^N$)$_2$. In certain embodiments, at least one instance of $R^{8a}$ is unsubstituted $C_{1-6}$ alkyl. In certain embodiments, at least one instance of $R^{8a}$ is optionally substituted $C_{1-3}$ alkyl. In certain embodiments, at least one instance of $R^{8a}$ is unsubstituted $C_{1-3}$ alkyl. In certain embodiments, at least one instance of $R^{8a}$ is selected from the group consisting of methyl, ethyl, n-propyl, iso-propyl, n-butyl, sec-butyl, iso-butyl, and tert-butyl. In certain embodiments, at least one instance of $R^{8a}$ is tert-butyl.

As generally defined herein, p is 0, 1, 2, 3, 4, or 5. In certain embodiments, p is 0. In certain embodiments, p is 1. In certain embodiments, p is 2. In certain embodiments, p is 3. In certain embodiments, p is 4. In certain embodiments, p is 5.

As generally defined herein, $T^1$ is a terminal group selected from the group consisting of hydrogen, halogen, optionally substituted alkyl, optionally substituted alkenyl, optionally substituted alkynyl, optionally substituted heteroalkyl, optionally substituted carbocyclyl, optionally substituted heterocyclyl, optionally substituted aryl, optionally substituted heteroaryl, and optionally substituted acyl, and polymers. In certain embodiments, $T^1$ is hydrogen. In certain embodiments, $T^1$ is halogen. In certain embodiments, $T^1$ is optionally substituted alkyl. In certain embodiments, $T^1$ is optionally substituted alkenyl. In certain embodiments, $T^1$ is optionally substituted alkynyl. In certain embodiments, $T^1$ is optionally substituted heteroalkyl. In certain embodiments, $T^1$ is optionally substituted carbocyclyl. In certain embodiments, $T^1$ is optionally substituted heterocyclyl. In certain embodiments, $T^1$ is optionally substituted aryl. In certain embodiments, $T^1$ is optionally substituted heteroaryl. In certain embodiments, $T^1$ is and optionally substituted acyl. In certain embodiments, $T^1$ is optionally substituted $C_{1-6}$ alkyl. In certain embodiments, $T^1$ is of one of the following formulae:

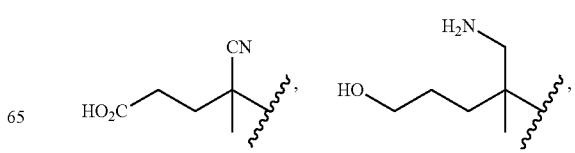

-continued

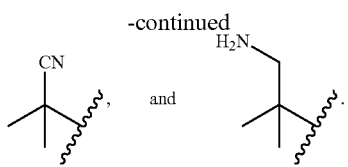

As generally defined herein, T² is a terminal group selected from the group consisting of hydrogen, halogen, optionally substituted alkyl, optionally substituted alkenyl, optionally substituted alkynyl, optionally substituted heteroalkyl, optionally substituted carbocyclyl, optionally substituted heterocyclyl, optionally substituted aryl, optionally substituted heteroaryl, and optionally substituted acyl, and polymers. In certain embodiments, T² is hydrogen. In certain embodiments, T² is halogen. In certain embodiments, T² is optionally substituted alkyl. In certain embodiments, T² is optionally substituted alkenyl. In certain embodiments, T² is optionally substituted alkynyl. In certain embodiments, T² is optionally substituted heteroalkyl. In certain embodiments, T² is optionally substituted carbocyclyl. In certain embodiments, T² is optionally substituted heterocyclyl. In certain embodiments, T² is optionally substituted aryl. In certain embodiments, T² is optionally substituted heteroaryl. In certain embodiments, T² is and optionally substituted acyl. In certain embodiments, T² is optionally substituted $C_{1-6}$ alkyl. In certain embodiments, T² is of one of the following formulae:

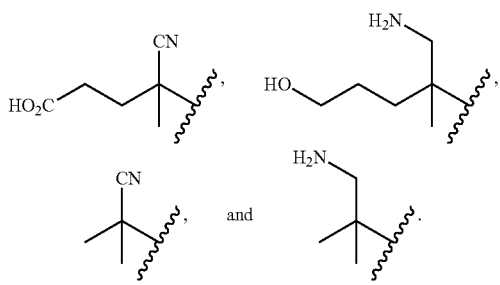

As generally defined herein, $R^O$ hydrogen, optionally substituted alkyl, optionally substituted aryl, optionally substituted heteroaryl, optionally substituted carbocyclyl, optionally substituted heterocyclyl, optionally substituted acyl, or an oxygen protecting group. In certain embodiments, $R^O$ is hydrogen. In certain embodiments, $R^O$ is optionally substituted alkyl. In certain embodiments, $R^O$ is optionally substituted $C_{1-6}$ alkyl. In certain embodiments, $R^O$ is unsubstituted $C_{1-6}$ alkyl. In certain embodiments, $R^O$ is selected from the group consisting of methyl, ethyl, n-propyl, iso-propyl, n-butyl, sec-butyl, iso-butyl, and tert-butyl. In certain embodiments, $R^O$ is methyl. In certain embodiments, $R^O$ is optionally substituted aryl. In certain embodiments, $R^O$ is optionally substituted heteroaryl. In certain embodiments, $R^O$ is optionally substituted carbocyclyl. In certain embodiments, $R^O$ is optionally substituted heterocyclyl. In certain embodiments, $R^O$ is optionally substituted acyl. In certain embodiments, $R^O$ is an oxygen protecting group.

As generally defined herein, each instance of $R^N$ is independently hydrogen, optionally substituted alkyl, optionally substituted carbocyclyl, optionally substituted heterocyclyl, optionally substituted aryl, optionally substituted heteroaryl, optionally substituted acyl, or a nitrogen protecting group; or optionally two $R^N$ on the same nitrogen atom are taken together with the intervening atoms to form optionally substituted heterocyclyl or optionally substituted heteroaryl. In certain embodiments, $R^N$ is hydrogen. In certain embodiments, $R^N$ is optionally substituted alkyl. In certain embodiments, $R^N$ is optionally substituted $C_{1-6}$ alkyl. In certain embodiments, $R^N$ is unsubstituted $C_{1-6}$ alkyl. In certain embodiments, $R^N$ is optionally substituted $C_{1-3}$ alkyl. In certain embodiments, $R^N$ is unsubstituted $C_{1-3}$ alkyl. In certain embodiments, $R^N$ is selected from the group consisting of methyl, ethyl, n-propyl, iso-propyl, n-butyl, sec-butyl, iso-butyl, and tert-butyl. In certain embodiments, $R^N$ is optionally substituted carbocyclyl. In certain embodiments, $R^N$ is optionally substituted heterocyclyl. In certain embodiments, $R^N$ is optionally substituted aryl. In certain embodiments, $R^N$ is optionally substituted heteroaryl. In certain embodiments, $R^N$ is or a nitrogen protecting group. In certain embodiments, $R^N$ on the same nitrogen atom are taken together with the intervening atoms to form optionally substituted heterocyclyl or optionally substituted heteroaryl.

As generally defined herein, $R^S$ hydrogen, optionally substituted alkyl, optionally substituted aryl, optionally substituted heteroaryl, optionally substituted carbocyclyl, optionally substituted heterocyclyl, optionally substituted acyl, or a sulfur protecting group. In certain embodiments, $R^S$ is hydrogen. In certain embodiments, $R^S$ is optionally substituted alkyl. In certain embodiments, $R^S$ is optionally substituted $C_{1-6}$ alkyl. In certain embodiments, $R^S$ is unsubstituted $C_{1-6}$ alkyl. In certain embodiments, $R^S$ is selected from the group consisting of methyl, ethyl, n-propyl, iso-propyl, n-butyl, sec-butyl, iso-butyl, and tert-butyl. In certain embodiments, $R^S$ is methyl. In certain embodiments, $R^S$ is optionally substituted aryl. In certain embodiments, $R^S$ is optionally substituted heteroaryl. In certain embodiments, $R^S$ is optionally substituted carbocyclyl. In certain embodiments, $R^S$ is optionally substituted heterocyclyl. In certain embodiments, $R^S$ is optionally substituted acyl. In certain embodiments, $R^S$ is a sulfur protecting group.

Uses and Compositions

Polymers described herein can be used in material and biomedical applications. For example, polymers described herein can be used in functional materials such as photonics (e.g., photonic crystals), chromatography media (e.g., filtration membranes), stimuli-responsive materials, lubricants, coatings, nanowires, nanolithography, storage media, films, and batteries (e.g., lithium-air batteries). Polymers described herein are also useful in biomedical applications such as drug delivery, materials (e.g., an injectable implant) for tissue or cartilage repair, cosmetic implantation, and lubrication of tissues or biological membranes.

Also provided herein are compositions comprising a polymer described herein and one or more carriers. The carrier may be a pharmaceutically acceptable carrier or another chemical medium (e.g., a solvent or other medium). In certain embodiments, the composition is a pharmaceutical composition optionally comprising one or more additional agents (e.g., therapeutic agents)

Also provided herein are particles (e.g., nanoparticles, microparticles) comprising a polymer described herein. In another aspect, the present invention provides gels (e.g., hydrogels) comprising polymers described herein.

Also provided herein are kits comprising one or more polymers described herein, or a composition or material thereof. The kit may further comprise instructions for use of the polymer, composition, or material.

Methods for Preparing Polymers

Provided herein are methods for preparing the polymers described herein. In general, the methods comprise polymerizing one or more monomers to form a homopolymer or copolymer, wherein at least one of the monomers is an acrylate. The polyacrylate portions of the homopolymer or copolymer can then be reduced to form polymeric segments with hydroxyl sidechains. The hydroxyl groups of the resulting polymer can then be reacted (e.g., substituted or protected) to form a derivatized polymer. This process is outlined in Scheme A.

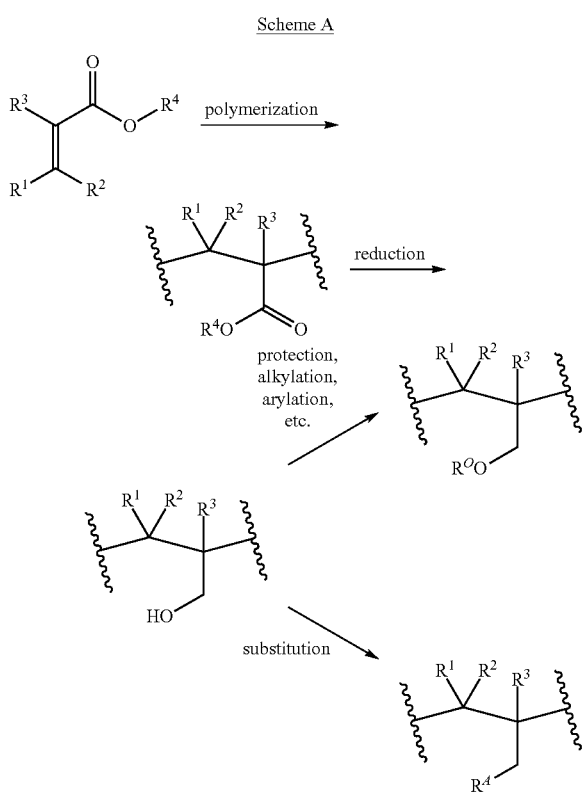

Provided herein is a method for preparing a polymer, the method comprising reducing an original polymer; wherein the original polymer comprises polyacrylate repeating units. In certain embodiments, the polyacrylate repeating units are not poly(methyl methacrylate) repeating units. The acrylate repeating units of the original polymer may be fully or partially reduced. In certain embodiments, the acrylate repeating units are approximately 5%, 10%, 15%, 20%, 25%, 30%, 35%, 40%, 45%, 50%, 55%, 60%, 65%, 70%, 75%, 80%, 85%, 90%, 95%, or 99% reduced.

In certain embodiments, the polyacrylate repeating units of the original polymer are of the formula:

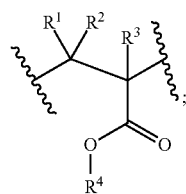

and the polyacrylate repeating units of the original polymer are reduced to form a polymer with repeating units of the formula:

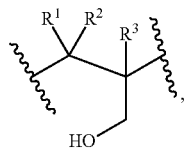

wherein:

$R^4$ is hydrogen, optionally substituted alkyl, optionally substituted carbocyclyl, optionally substituted heterocyclyl, optionally substituted aryl, optionally substituted heteroaryl, optionally substituted acyl, or an oxygen protecting group.

As generally defined herein, $R^4$ is hydrogen, optionally substituted alkyl, optionally substituted aryl, optionally substituted heteroaryl, optionally substituted carbocyclyl, optionally substituted heterocyclyl, optionally substituted acyl, or an oxygen protecting group. In certain embodiments, $R^4$ is hydrogen. In certain embodiments, $R^4$ is optionally substituted alkyl. In certain embodiments, $R^4$ is optionally substituted aryl. In certain embodiments, $R^4$ is optionally substituted heteroaryl. In certain embodiments, $R^4$ is optionally substituted carbocyclyl. In certain embodiments, $R^4$ is optionally substituted heterocyclyl. In certain embodiments, $R^4$ is optionally substituted acyl. In certain embodiments, $R^4$ is an oxygen protecting group. In certain embodiments, $R^4$ is optionally substituted $C_{1-6}$ alkyl. In certain embodiments, $R^4$ is unsubstituted $C_{1-6}$ alkyl. In certain embodiments, $R^4$ is optionally substituted $C_{1-3}$ alkyl. In certain embodiments, $R^4$ is unsubstituted $C_{1-3}$ alkyl. In certain embodiments, $R^4$ is selected from the group consisting of methyl, ethyl, n-propyl, iso-propyl, n-butyl, sec-butyl, iso-butyl, and tert-butyl. In certain embodiments, $R^4$ is methyl.

In certain embodiments, the method further comprises a step of reacting the OH groups of the repeating units to form repeating units of the formula:

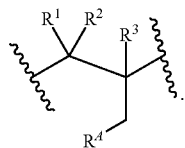

In certain embodiments, the —OH groups are protected (e.g., alkylated, arylated, heteroarylated) to transform the —OH groups to groups of the formula —$OR^O$. In certain embodiments, the —OH groups are substituted (e.g., transformed into a leaving group and then treated with a nucleophile) to transform the —OH groups to groups of the formula —$R^A$. Non-limiting examples of protection and substitution reactions of this kind are outlined in the Figures.

As described above, in certain embodiments, a polymer provided herein is a block copolymer. Therefore, provided herein is a method of preparing a block copolymer, the method comprising reducing an original block copolymer, wherein the original block copolymer is of the formula:

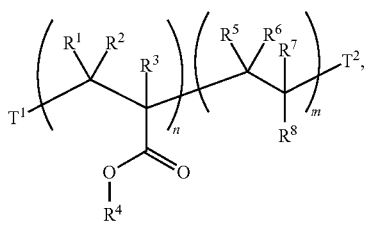

to yield a block copolymer of the formula:

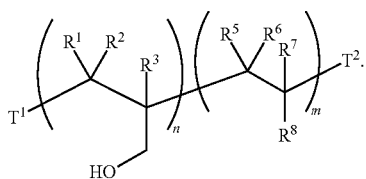

The acrylate repeating units of the original block copolymer may be fully or partially reduced. In certain embodiments, the acrylate repeating units are approximately 5%, 10%, 15%, 20%, 25%, 30%, 35%, 40%, 45%, 50%, 55%, 60%, 65%, 70%, 75%, 80%, 85%, 90%, 95%, or 99% reduced.

In certain embodiments, the original block copolymer is of the formula:

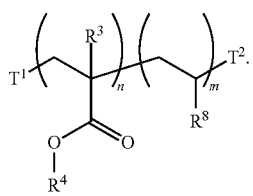

In certain embodiments, the original block copolymer is of the formula:

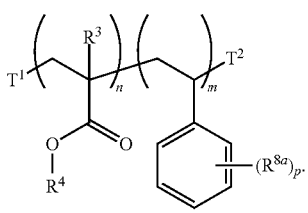

In certain embodiments, the method further comprises a step of reacting the —OH groups of the block copolymer to form a block copolymer of the formula:

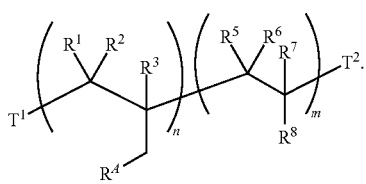

As described above, in certain embodiments, the —OH groups are protected (e.g., alkylated, arylated, heteroarylated) to transform the —OH groups to groups of the formula —OR$^O$. In certain embodiments, the —OH groups are substituted (e.g., transformed into a leaving group and then treated with a nucleophile) to transform the —OH groups to groups of the formula —R$^4$. Non-limiting examples of protection and substitution reactions of this kind are outlined in the Figures.

In certain embodiments, the step of reducing (i.e., the step of reducing a group of the formula —CO$_2$R$^4$ to a group of the formula —CH$_2$OH) is carried out in the presence of a reducing agent. In certain embodiments, the reduction is carried out in the presence of one or more of lithium aluminum hydride, hydrogen gas, sodium amalgam, sodium-lead alloy, diborane, sodium borohydride, dithionates, thiosulfates, hydrazine, diisobutylaluminium hydride (MAL), oxalic acid, formic acid, ascorbic acid, lithium triethylborohydride, diborane, borane-tetrahydrofuran, borane-dimethyl sulfide, samarium, sodium bis(2-methoxyethoxy)aluminium hydride, sodium triacetoxyborohydride, or zinc.

In certain embodiments, the reduction is carried out in the presence of a hydride donor. In certain embodiments, the hydride donor is diisobutylaluminium hydride (DIBAL) or lithium aluminum hydride (LAH). In certain embodiments, the hydride donor is LAH.

The methods described herein may further comprise one or more polymerization steps in order to prepare an original homopolymer or copolymer. For instance, in certain embodiments, the methods may further comprise steps of polymerizing two or more monomers to produce the original polymer or block copolymer, wherein at least one monomer is an acrylate of the formula:

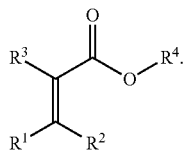

In certain embodiments, the monomer is not poly(methyl methacrylate) (PMMA).

In certain embodiments, the polymerization step is a polymerization selected from the group consisting of living radical polymerization, reversible-deactivation radical polymerization, atom transfer radical polymerization (ATRP), nitroxide mediated radical polymerization (NMP), and reversible addition-fragmentation chain transfer (RAFT) polymerization.

In certain embodiments, the polymerization uses an iniferter, initiator, or chain transfer agent. The term "iniferter" refers to a chemical compound that simultaneously acts as a initiator, transfer agent, and terminator. The term "initiator" refers to a chemical compound that can produce radical species and/or promote radical reactions. The term "chain transfer agent" refers to a chemical compound that is able to react with a chain carrier by a reaction in which the original chain carrier is deactivated and a new chain carrier is generated. In certain embodiments, the iniferter, initiator, or chain transfer agent is selected from the group consisting of dithiobenzoates, trithiocarbonates, dithiocarbamates, xanthates, and alkyl halides.

Examples of dithiobenzoate include, but are not limited to, benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenyl-carbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, and 2-phenyl-2-propyl benzodithioate.

Examples of trithiocarbonates include, but are not limited to, 3,5-bis(2-dodecylthiocarbonothioylthio-1-oxopropoxy) benzoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl)sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis (2-methylpropanoic acid), dibenzyl 2,2'-(thiocarbonylbis(sulfanediyl))bis(2-methylpropanoate), dibenzyl 2,2'-(thiocarbonylbis(sulfanediyl))dipropionate, and 2-(((dodecylthio)carbonothioyl)thio)propanoic acid.

Examples of dithiocarbamates include, but are not limited to, benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio] propionate, and 1-succinimidyl-4-cyano-4-[N-methyl-N-(4-pyridyl)carbamothioylthio]pentanoate. Examples of xanthates include, but are not limited to, ethyl 2-(((ethylthio) carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl) sulfanyl acetate, and methyl (isopropoxycarbonothioyl) sulfanyl acetate.

Examples of alkyl halides include, but are not limited to, ethyl 2-bromo-2-phenylacetate, dodecyl 2-bromoisobutyrate, ethyl 2-bromoisobutyrate, ethyl 2-bromopropionate, 2-hydroxyethyl 2-bromoisobutyrate, octadecyl 2-bromoisobutyrate, 2-(2-bromoisobutyryloxy)ethyl methacrylate, 1-bromoethylbenzene, 2-bromoisobutanoic acid N-hydroxysuccinimide ester, 2-bromoisobutyric anhydride, 2-azidoethyl 2-bromoisobutyrate, bis[2-(2$^1$-bromoisobutyryloxy)ethyl]disulfide, and bis[2-(2-bromoisobutyryloxy) undecyl] disulfide.

In certain embodiments, the polymerization involves transfer radical polymerization (ATRP). In certain embodiments, the ATRP uses a catalyst. In certain embodiments, the catalyst is a metal catalyst. In certain embodiments, the polymerization involves addition-fragmentation chain transfer (RAFT) polymerization.

In addition to the acrylate monomers incorporated into the polymers described herein, one or more other monomers may be incorporated via polymerization to form a copolymer (e.g., a block copolymer described herein). In certain embodiments, one or more other monomers are selected from the group consisting of styrenes, methacrylates, acrylates, acrylamides, vinyl halides, vinyl alcohols, vinyl esters, and vinyl amides. Further examples of polymers that may be incorporated include, but are not limited to, polyvinyl polymers (e.g., polyvinyl chloride), polyethylenes (e.g., polyethylene, polytetrafluoroethylene), polypropylenes, polyacetylenes, polyethers (e.g., polyethylene glycol, polyoxymethylene, polypropylene glycol, polytetramethylene glycol, poly(ethyl ethylene) phosphate, poly(oxazoline)), polyamines, polyesters (e.g., polyglycolic acid, polylactic acid, poly(lactic-co-glycolic acid), polycaprolactone, polyhydroxyalkanoate, polyhydroxybutryate, polyethylene adipate, polybutylene succinate, poly(3-hydroxybutyrate-co-3-hydroxyvalerate), polysilanes, polysiloxanes (e.g., polydimethylsiloxane), polyacrylates (e.g., polymethacrylate, poly(n-butyl acrylate), poly(tert-butyl acrylate)), polystyrenes, polylactides (e.g., polylactic acid), polyamino acids, polypeptides, polyamides, polyacrylamides (e.g., polymethylacrylamide), and polysaccharides.

EXAMPLES

Poly(meth)acrylate BCPs can be derivatized to achieve higher $\chi$ parameters. Herein, it is presented in the first place that using LiAlH$_4$, the block copolymers of poly(methyl methyacrylate) (PMMA) or poly(methyl acrylate) (PMA) can be reduced in a controlled manner. The microphase separation between pristine BCP samples and the reduction products is compared to demonstrate the massive increase in $\chi$ values. Small d-spacing was achieved. It is envisioned that this work will demonstrate an important strategy for the convenient synthesis of high $\chi$ BCPs to approach the downscaling limit. A generic representation of the synthesis of PiBOH and PPOH polymers is shown in Scheme 1.

Scheme 1

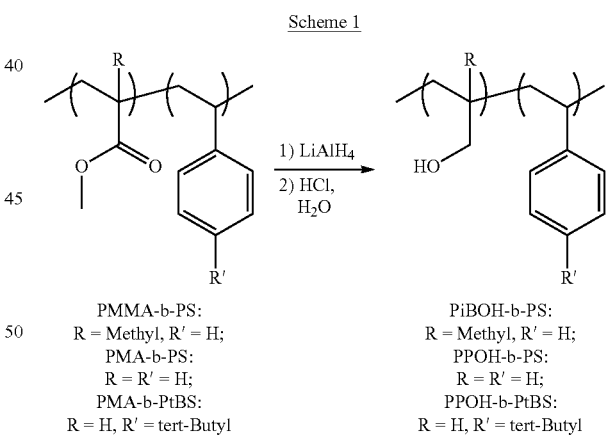

PMMA-b-PS:
R = Methyl, R' = H;
PMA-b-PS:
R = R' = H;
PMA-b-PtBS:
R = H, R' = tert-Butyl PiBOH-b-PS:
R = Methyl, R' = H;
PPOH-b-PS:
R = R' = H;
PPOH-b-PtBS:
R = H, R' = tert-Butyl The work started with reducing the BCPs of methyl methacrylate or methyl acrylate in a controlled manner (Scheme 1). The pristine poly(methyl methacrylate)-b-polystyrene (PMMA-b-PS), poly(methyl acrylate)-b-polystyrene (PMA-b-PS), and poly(methyl acrylate)-b-poly(tert-butylstyrene) (PMA-b-PtBS) were synthesized with narrow molecular weight (MW) distribution, with either atom transfer radical polymerization (ATRP) or reversible addition-fragmentation chain transfer radical polymerization (RAFT) technique. It is noted here that, for RAFT synthesized BCPs, the trithiocarbonate end groups were removed before LiAlH$_4$ reduction, using the method reported by: Rizzardo et al. "Thiocarbonylthio End Group Removal from RAFT-Synthesized Polymers by a Radical-Induced Process", *J. Polym. Sci. Part A Polym. Chem.* 2009, 47 (23), 6704-6714. This was based on the consideration that the trithiocarbonate end-groups would be reduced into thiol, which could lead to end-linking reactions. Then the BCPs were dissolved in THF and degassed by sparging with $N_2$, followed by dropwise addition onto $LiAlH_4$. Upon refluxing overnight, the reaction was quenched via adding excess water. To remove the inorganic side products, the resultant precipitate was boiled at 100° C. with first HCl solution (3~5 M, 2*30 mL per gram of polymer) and then DI-water (5*30 mL per gram of polymer). After drying, it was found that in the Fourier transformed-infrared spectra (Supporting Information), the peak corresponding to the carbonyl stretching, originally at 1727 $cm^{-1}$, disappeared, which confirmed the elimination of ester groups. At the same time, the absence of signals at $\delta>160$ ppm in $^{13}C$ NMR proved that aldehyde, acid, or amide, were not generated in this reaction. The MW distributions were measured using gel permeation chromatography (GPC) with 0.025M LiBr in DMF as the eluent. The low Đ values were retained, proving the suppression of backbone degradation. In the GPC traces (FIG. 1), the emerging of the small shoulder of high molecular weight species is likely due to hydrogen bonding induced aggregation. By elemental analysis on representative samples, only trace amount of salt can be detected (<0.5 wt % Cl content). These confirmed the controlled synthesis of poly(hydroxyisobutylene)-b-polystyrene (PiBOH-b-PS), poly(hydroxypropylene)-b-polystyrene (PPOH-b-PS), and poly(hydroxypropylene)-b-poly(tert-butylstyrene) (PPOH-b-PtBS), as summarized in Table 1. Using differential scanning calorimetry, the glass transition of PiBOH was detected around 100° C., while the Tg of PPOH was measured to be 65° C.

GPC. The values in the parentheses are on the pre-polymer before $LiAlH_4$ reduction (for RAFT-ER synthesized BCPs, the values were obtained after the removal of trithiocarbonate groups). [d]Calculated using a reference volume of 118 $Å^3$, based on the density of PiBOH, PS, and PtBS being 1.15, 1.04, and 0.95 $g/cm^3$, respectively, while the density of PPOH being estimated to be 1.22 $g/cm^3$. [e]Volume fraction of polyhydroxy block domains. [f]Morphologies observed upon thermal annealing. HEX denotes hexagonally packed cylinders, LAM denotes lamellae, BCC is for spheres with body centered cubic packing, DIS stands for disordered phase, while ODT means the sample was in order-disorder transition state. [g]The d-spacing achieved by thermal annealing at 134±1° C., and the values in the parentheses are at 179±1° C.

Figure 2:
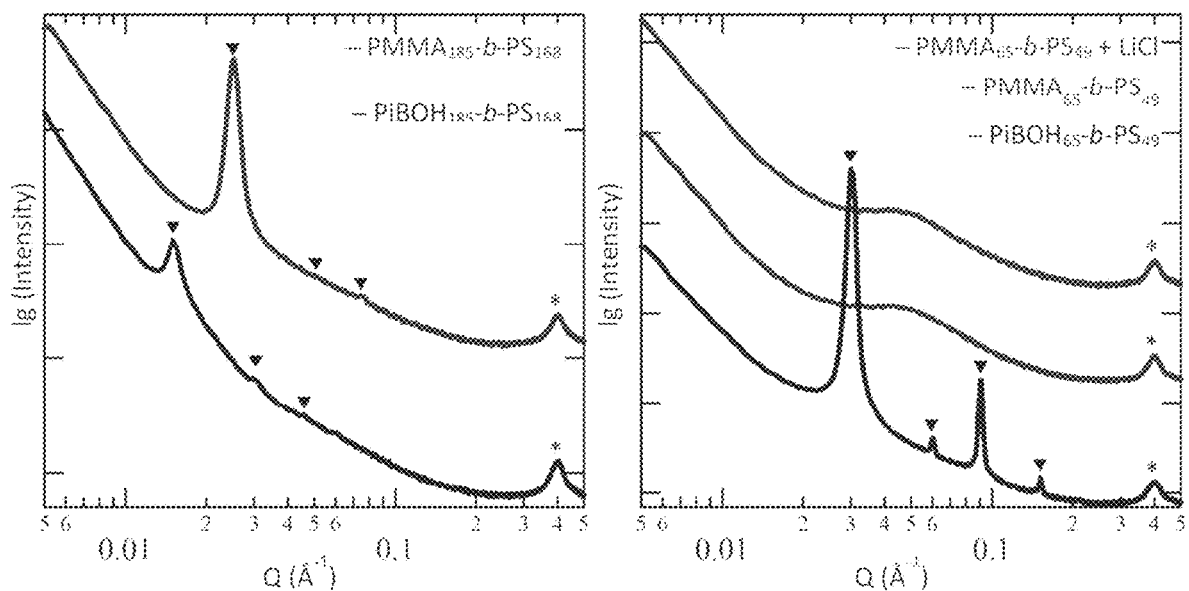
FIG. 2. SAXS patterns of block copolymers (BCPs) annealed at 179° C.

To investigate the bulk morphologies, the BCPs were applied to thermal annealing at designated temperatures for at least 12 hours and then quenched to room temperature to achieve equilibrated morphologies. By investigating the small angle X-ray scattering (SAXS) pattern achieved using synchrotron beam, the morphologies of the BCPs before and after reduction were compared. In FIG. 2, the top two traces denote $PMMA_{185}$-b-$PS_{168}$ (after end-group removal) and $PiBOH_{185}$-b-$PS_{168}$. Both traces show peaks with a position ratio of 1:2:3, indicating lamellar morphologies. However, it was observed that the d-spacing (d, calculated by $d=2\pi/q^*$, where $q^*$ is the primary peak position) was increased from 25 nm to 41.9 nm upon converting the PMMA block into PiBOH. This is likely a result of the largely increased $\chi$ value, since mean field theory suggests that d-spacing rises monotonically with increased $\chi$. See, e.g., Bates et al. "Block CopolymersDesigner Soft Materials", *Phys. Today* 1999, 52 (2), 32-38. Note that the ordering seems to be poor, which can probably be attributed to the slow ordering

TABLE 1

Summary of Block Copolymers Investigated.

| BCP | Method[a] | $DP_{OH}$[b] | $DP_S$[b] | Đ[c] | N[d] | $f_{OH}$[e] (%) | Phase[f] | $d^g$ (nm) |
|---|---|---|---|---|---|---|---|---|
| $PiBOH_{185}$-b-$PS_{168}$ | ATRP | 185 | 168 | 1.16 (1.29) | 401.9 | 40.7 | LAM | 41.89 |
| $PiBOH_{185}$-b-$PS_{145}$ | ATRP | 185 | 145 | 1.35 (1.37) | 369.5 | 44.3 | LAM | 46.20 |
| $PiBOH_{185}$-b-$PS_{100}$ | ATRP | 185 | 100 | 1.31 (1.33) | 306.0 | 53.5 | LAM | 35.70 |
| $PiBOH_{120}$-b-$PS_{122}$ | ATRP | 120 | 122 | 1.28 (1.24) | 279.7 | 38.0 | LAM | 42.74 |
| $PiBOH_{185}$-b-$PS_{51}$ | ATRP | 185 | 51 | 1.31 (1.35) | 237.0 | 71.7 | HEX | 26.10 |
| $PiBOH_{84}$-b-$PS_{51}$ | ATRP | 84 | 51 | 1.24 (1.11) | 147.9 | 50.5 | LAM | 22.52 |
| $PiBOH_{65}$-b-$PS_{49}$ | RAFT-ER | 65 | 49 | 1.28 (1.29) | 128.3 | 45.0 | LAM | 21.08 |
| $PiBOH_{65}$-b-$PS_{43}$ | RAFT-ER | 65 | 43 | 1.22 (1.30) | 119.8 | 48.2 | LAM | 19.27 |
| $PiBOH_{65}$-b-$PS_{36.5}$ | RAFT-ER | 65 | 36.5 | 1.24 (1.22) | 110.7 | 52.3 | LAM | 18.37 |
| $PiBOH_{65}$-b-$PS_{27.5}$ | RAFT-ER | 65 | 27.5 | 1.22 (1.22) | 98.0 | 59.1 | LAM | 17.75 |
| $PiBOH_{30}$-b-$PS_{43}$ | RAFT-ER | 30 | 43 | 1.19 (1.10) | 88.9 | 30.1 | HEX | 12.57 |
| $PiBOH_{30}$-b-$PS_{28.5}$ | RAFT-ER | 30 | 28.5 | 1.25 (1.26) | 68.5 | 39.2 | LAM | 12.32 |
| $PiBOH_{21}$-b-$PS_{23.4}$ | RAFT-ER | 21 | 23.4 | 1.16 (1.24) | 53.4 | 35.4 | HEX | 9.24 |
| $PiBOH_{21}$-b-$PS_{14}$ | RAFT-ER | 21 | 14 | 1.18 (1.15) | 40.1 | 47.3 | LAM | 7.66 |
| $PiBOH_{16}$-b-$PS_{14}$ | RAFT-ER | 16 | 14 | 1.31 (1.20) | 35.7 | 40.6 | LAM | 7.18 |
| $PiBOH_{16}$-b-$PS_{13}$ | RAFT-ER | 16 | 13 | 1.25 (1.15) | 34.3 | 46.2 | DIS | N.A. |
| $PiBOH_{10.8}$-b-$PS_{12.6}$ | RAFT-ER | 10.8 | 12.6 | 1.21 (1.15) | 29.1 | 37.5 | DIS | N.A. |
| $PPOH_{11.7}$-b-$PS_{21}$ | ATRP | 11.7 | 21 | 1.08 (1.05) | 38.1 | 22.3 | HEX | 7.27 (7.29) |
| $PPOH_{11.7}$-b-$PS_{18.4}$ | ATRP | 11.7 | 18.4 | 1.06 (1.04) | 34.4 | 24.7 | HEX | 7.51 (7.52) |
| $PPOH_{11.7}$-b-$PS_{14.5}$ | ATRP | 11.7 | 14.5 | 1.08 (1.06) | 28.9 | 29.4 | HEX | 7.27 (7.29) |
| $PPOH_{11.7}$-b-$PtBS_{15.2}$ | ATRP | 11.7 | 15.2 | 1.06 (1.02) | 44.6 | 19.1 | BCC | (7.11) |
| $PPOH_{8.6}$-b-$PtBS_{13.8}$ | ATRP | 8.6 | 13.8 | 1.06 (1.03) | 39.2 | 16.4 | ODT | (6.68) |
| $PPOH_{11.7}$-b-$PtBS_{11.3}$ | ATRP | 11.7 | 11.3 | 1.06 (1.02) | 35.3 | 24.1 | HEX | (6.53) |
| $PPOH_{9.1}$-b-$PtBS_8$ | ATRP | 9.1 | 8 | 1.12 (1.01) | 25.8 | 26.3 | DIS | N.A. |

For Table 1: [a]The technique utilized in pre-polymer synthesis before $LiAlH_4$ reduction, either ATRP or RAFT-ER (RAFT with the end-group removal process). [b]$DP_{OH}$ and $DP_s$ are degrees of polymerization for the polyhydroxy and polystyrenic blocks, respectively, which are calculated by end-group analysis using $^1H$ NMR spectra. [c]Measured by kinetics due to hydrogen bonding within PiBOH domains. The bottom half of FIG. 2 shows that $PMMA_{65}$-b-$PS_{49}$ was in disordered state, while $PiBOH_{65}$-b-$PS_{49}$ exhibited highly ordered lamellar morphologies, since the peak positions were in a ratio being 1:2:3:4. The pristine BCP was also blended with 10 wt % LiCl and then annealed thermally.

However, the salt/polymer complex showed no sign of ordered microphases. This assures that the difference in phase behavior is a consequence of the chemical structures rather than the trace residual salt. Considering the high ratio of hydroxyl groups over residual Cl⁻ (>60), it is expected that residual salt should have very limited effect on the segregation strength. The suppression of the second order peak in PiBOH$_{65}$-b-PS$_{49}$ is likely a consequence of the symmetry in volume fractions. The d-spacing is found to be 20.8 nm. So far, these two comparisons have demonstrated that PiBOH-b-PS has a significantly enhanced $\chi$ interaction parameter comparing with PMMA-b-PS.

A series of PiBOH-b-PS samples were investigated on their morphologies. Most of these BCPs, as shown in Table 1, have volume fractions close to 50%, and they displayed lamellar morphologies as confirmed by SAXS. For example, PiBOH$_{84}$-b-PS$_{51}$ is shown in FIG. 3a, where ordered lamellae (d=22.52 nm) can be observed from the peaks with a position ratio of 1:2:3 in the SAXS pattern. Using TEM, layered structures with an average center-to-center distance being ~20 nm were displayed, which was consistent with the SAXS measurement. The volume fraction was also tuned to achieve other morphologies. For example, PiBOH$_{21}$-b-PS$_{23.4}$ with a volume fraction of PiBOH being 38.6%, showed peaks at a position ratio of 1:√3:√4, indicating hexagonally packed PiBOH cylinders. In contrast, PiBOH$_{185}$-b-PS$_{51}$ (f$_{OH}$=71.7%) exhibited peak positions being 1:√4:√7:√12, which is likely the inverse cylindrical morphologies.

Then, the morphologies of BCPs with various N values were investigated. The shortest PiBOH-b-PS sample that showed a sharp peak (FIG. 3b) at 134° C. had an N of 35.7. The spacing is found to be 7.18 nm. Base on the volume fractions, it is expected to exhibit a lamellar morphology, although the higher order peaks are missing, which is attributed to the nearly symmetric volume fractions. To confirm the ordered microphase separation, PiBOH$_{16}$-b-PS$_{14}$ was annealed at 150° C., and the peak broadened significantly, which was a sign of entering the disorder phase. Increasing the annealing temperatures led to further broadening (FIG. 3b). This indicated that the BCP passed the order-disorder transition between 134° C. and 150° C., and the $\chi_{eff}$N value ($\chi_{eff}$ for effective $\chi$ parameter) at 134° C. is only slightly higher than 10.5.

In contrast, the polymer with N=34.3 (PiBOH$_{16}$-b-PS$_{13}$) showed only a broad peak in the SAXS pattern. This suggests that the $\chi_{eff}$N value crossed the critical point of being 10.5, when N changes from 35.7 to 34.3. So, one can estimate the effective $\chi$ parameter ($\chi_{eff}$) to be 0.3 at 134° C. This gives PiBOH$_{16}$-b-PS$_{14}$ a $\chi_{eff}$N value of 10.7, which is in good consistency with the previously observed order-disorder transition (ODT). Comparing with PMMA-b-PS at similar conditions ($\chi_{eff}$=0.03, with a reference volume of 118 Å$^3$ at 150° C.), it is demonstrated here that the $\chi_{eff}$ value can be increased by one order of magnitude using a basic organic reaction that is approachable in any chemistry labs. See, e.g., Koo et al. "Directed Self-Assembly of Block Copolymers in the Extreme: Guiding Microdomains from the Small to the Large", *Soft Matter* 2013, 9 (38), 9059; Russell et al. "Temperature Dependence of the Interaction Parameter of Polystyrene and Poly (Methyl Methacrylate)", *Macromolecules* 1990, 23, 890-893. To further elucidate the significance, here compare with the high $\chi_{eff}$ values reported in literature that were determined using ODT. For example, poly(cyclohexylethylene)-b-poly(ethylene oxide) possesses $\chi_{eff}$ being 0.22 at 150° C. and a reference volume of 118 Å$^3$, while under similar conditions, polystyrene-b-polydimethylsiloxane, poly(cyclohexylethylene)-b-poly(methyl methacrylate), poly(tert-butyl styrene)-b-poly(2-vinylpyridine), and poly(methyl methacrylate)-b-polydimethylsiloxane were found to have $\chi_{eff}$ values being 0.11, 0.053, 0.11, and 0.24, respectively. See, e.g., Kennemur et al. "Sub-5 Nm Domains in Ordered Poly(cyclohexylethylene)-Block-Poly (methyl Methacrylate) Block Polymers for Lithography," *Macromolecules* 2014, 47 (4), 1411-1418; Andersen et al. "Surface Morphology of PS-PDMS Diblock Copolymer Films", *J. Electron Spectros. Relat. Phenomena* 2001, 121 (1-3), 93-110. Various $\chi$ values were reported on poly(4-vinylpyridine)/polystyrene pair depending on the testing methodology, while ODT has not been used. However, from the work by Chang Dae Han et al., it is estimated that the $\chi_{eff}$ (ODT) value should be lower than 0.34, when the temperature and reference volume being 160° C. and 118 Å$^3$. See, e.g., Zha et al. "Origin of the Difference in Order-Disorder Transition Temperature between Polystyrene-Block-poly(2-Vinylpyridine) and Polystyrene-Block-poly(4-Vinylpyridine) Copolymers", *Macromolecules* 2007, 40 (6), 2109-2119. On poly(3,4-dihydroxystyrene)-b-polystyrene, the $\chi$ value was computed to be ~0.7 by fitting the SAXS profiles with Leibler theory, while the $\chi_{eff}$ value is reduced to be between 0.37 and 0.50 when merely using the molecular weights below and above ODT (the temperature and reference volume being 170° C. and 118 Å$^3$, respectively). Similarly, poly(trimethylsilylstyrene)-b-poly(D,L-lactide) was investigated to reveal its $\chi$ value being 0.42 at 140° C. using the absolute scattering intensity. See, e.g., Cushen et al. "Thin Film Self-Assembly of Poly(trimethylsilylstyrene-B-D,L-Lactide) with Sub-10 Nm Domains", *Macromolecules* 2012, 45 (21), 8722-8728. However, it was re-estimated the $\chi_{eff}$ (ODT) to be no larger than 0.35. So far, it has been demonstrated that the $\chi_{eff}$ value obtained on PiBOH-b-PS is amongst the highest.

To better understand how d is affected by N, the d values of lamellar samples are plotted against N in FIG. 4 in a log-log manner. Fitting the data linearly results in a scaling relationship of d~N$^\delta$ with R$^2$=0.98 indicating successful regression. Then, a value of δ=0.77 can be extracted, which is larger than the value (⅔) predicted by strong segregation theory. See, e.g., Hashimoto et al. "Domain-Boundary Structure of Styrene-Isoprene Block Copolymer Films Cast from Solution, 4. Molecular-Weight Dependence of Lamellar Microdomains", *Macromolecules* 1980, 13 (5), 1237-1247; Leibler, L. "Theory of Microphase Separation in Block Copolymers", *Macromolecules* 1980, 13 (6), 1602-1617. It suggests that these BCP chains adopted relatively stretched conformation, and this phenomenon has been observed in a few reports, however, not yet fully understood. See, e.g., Sunday et al. "Characterizing the Interface Scaling of High $\chi$ Block Copolymers near the Order-Disorder Transition", *Macromolecules* 2017; Papadakis et al. "Identification of an Intermediate-Segregation Regime in a Diblock Copolymer System", *Europhys. Lett.* 1996, 36 (4), 289-294; Almdal et al. "Gaussian- to Stretched-Coil Transition in Block Copolymer Melts", *Phys. Rev. Lett.* 1990, 65 (9), 1112-1115.

Figure 5:
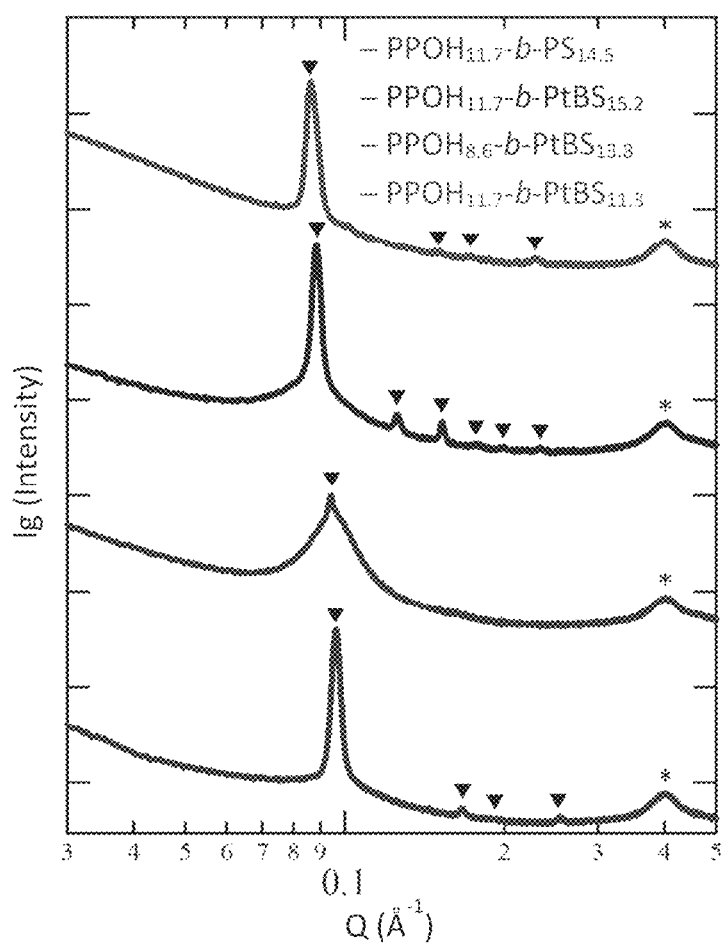
FIG. 5. SAXS profiles of $PPOH_{11.7}$-b-$PS_{14.5}$, $PPOH_{11.7}$-b-$PtBS_{15.2}$, $PPOH_{8.6}$-b-$PtBS_{13.8}$, and $PPOH_{11.7}$-b-$PtBS_{11.3}$ at 179° C. The stars mark the scattering peak from Kapton tape.
Figure 6:
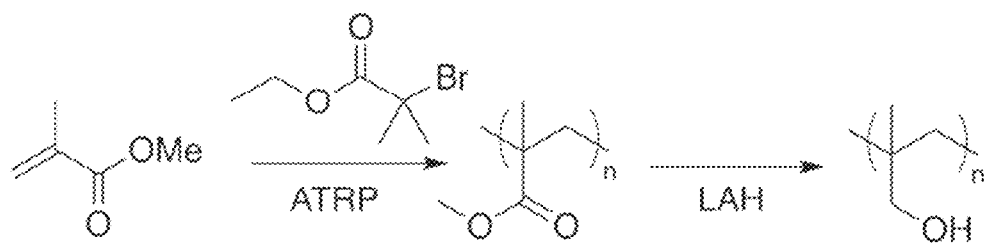
FIG. 6. Synthesis of poly(isobutenyl alcohol) (PiBOH) using atom transfer radical polymerization (ATRP) of methyl methacrylate and reduction with lithium aluminum hydride (LAH).
Figure 6:
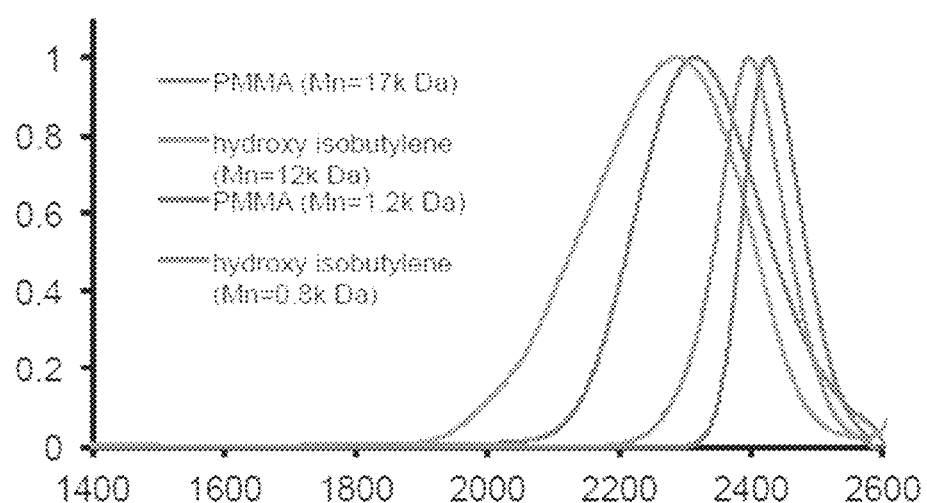
Figure 7:
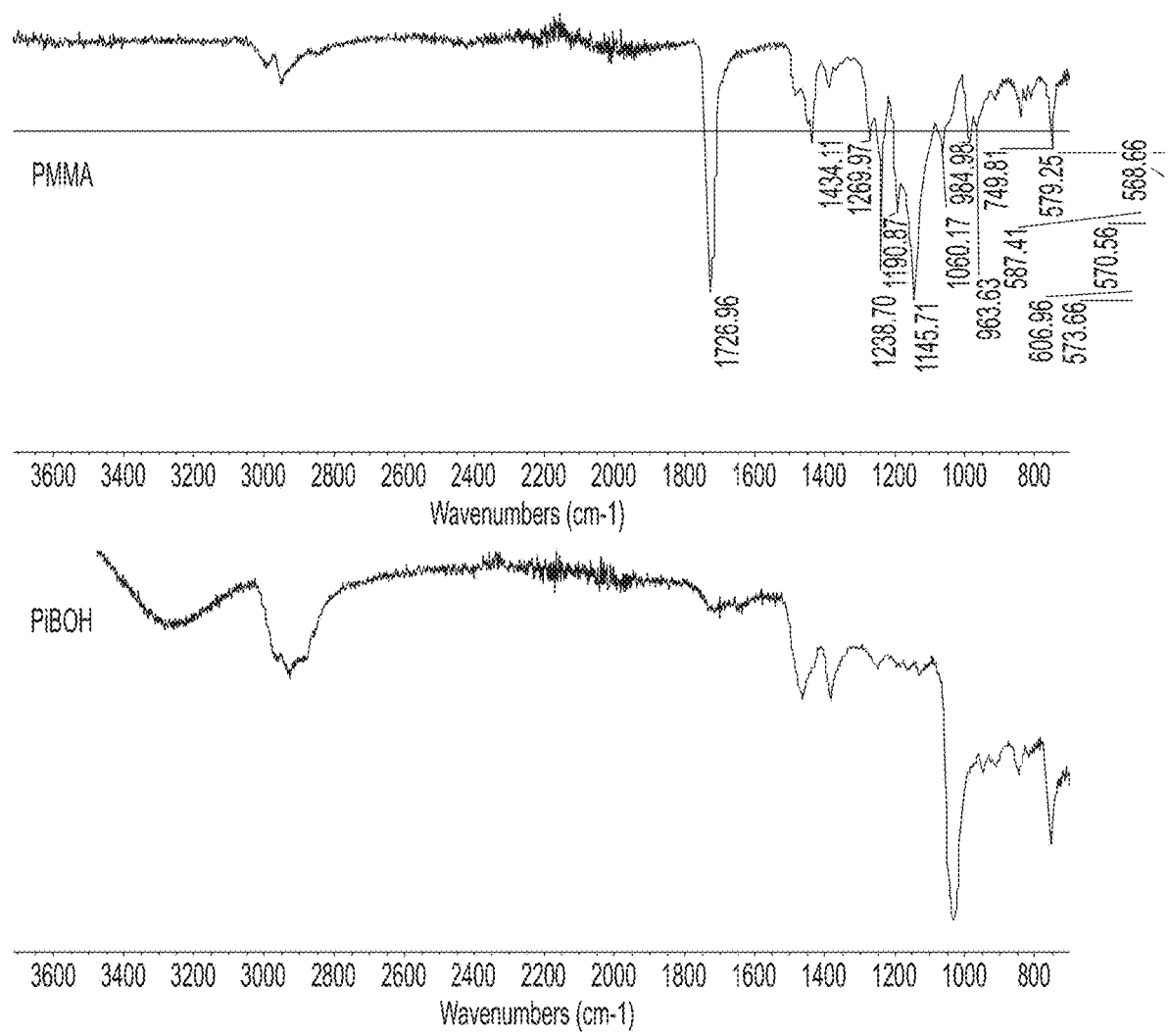
FIGS. 7-8. Spectral data for poly(methyl methacrylate) PMMA and PiBOH.
Figure 8:
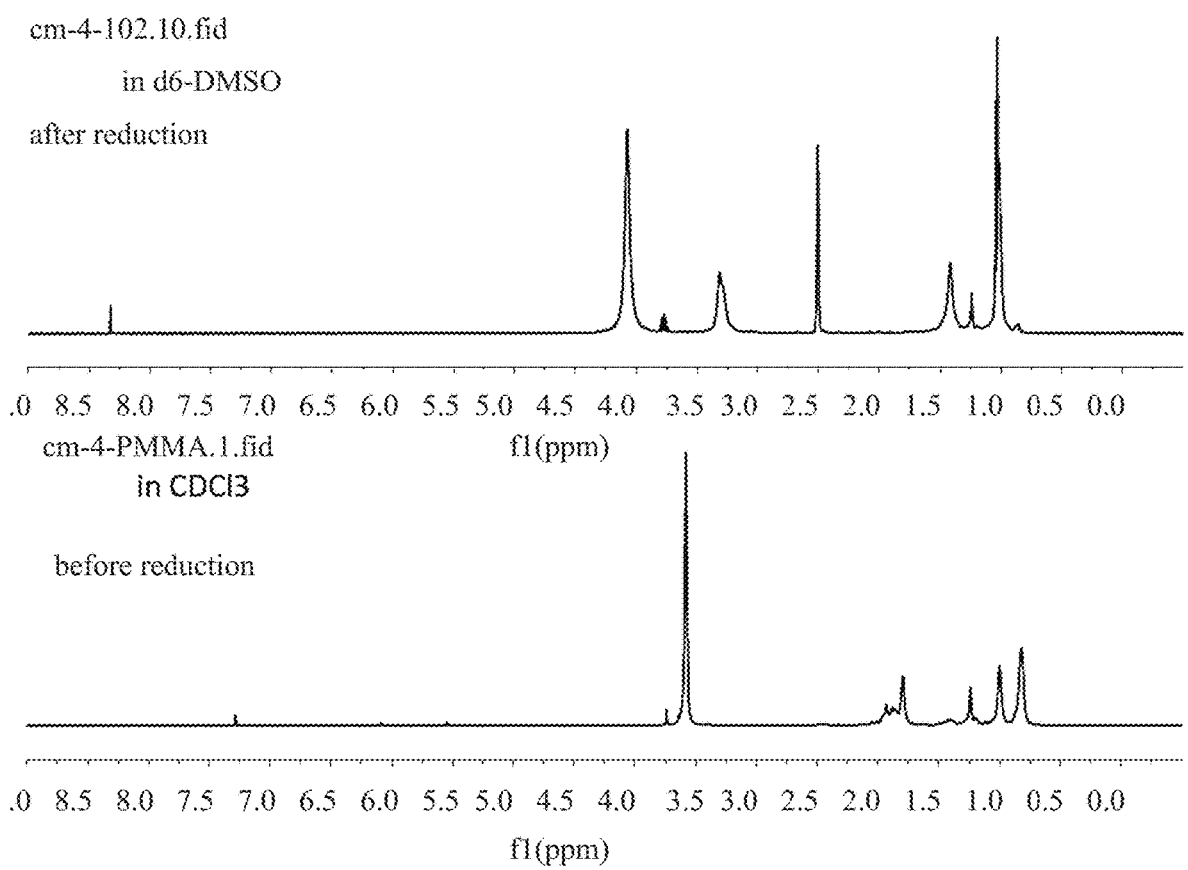
Figure 9:
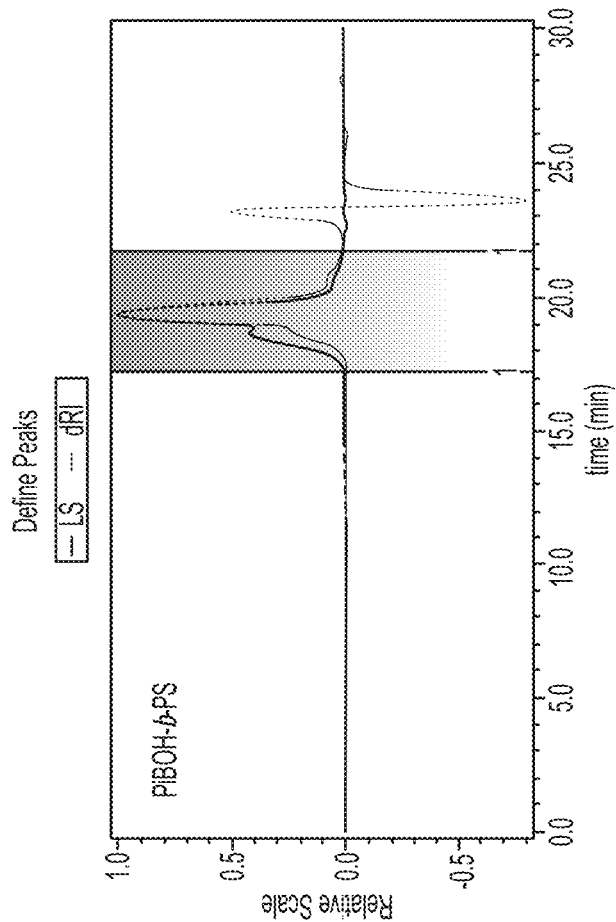
FIGS. 9-10. Synthesis of and characterization data for PiBOH-b-PS.
Figure 9:
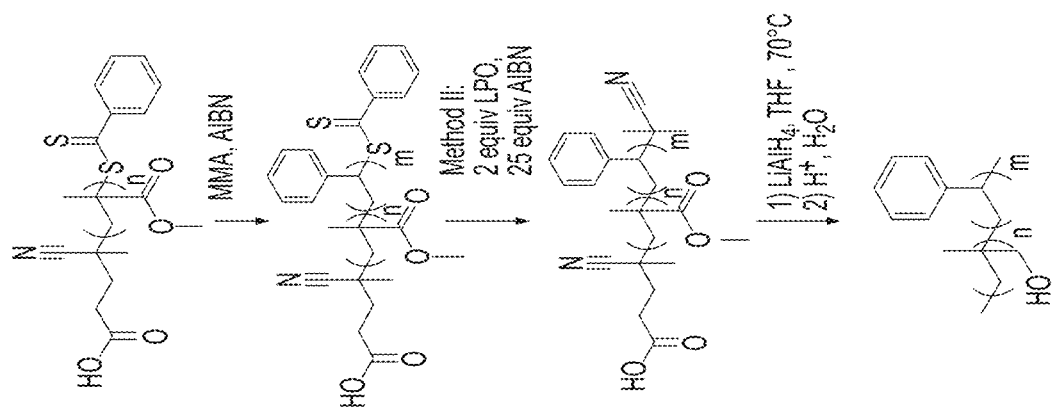
Figure 10:
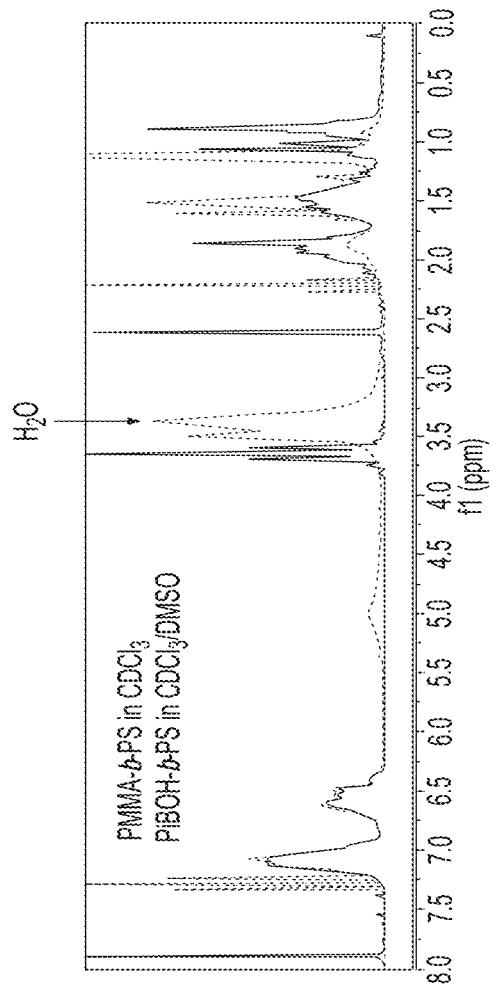
Figure 10:
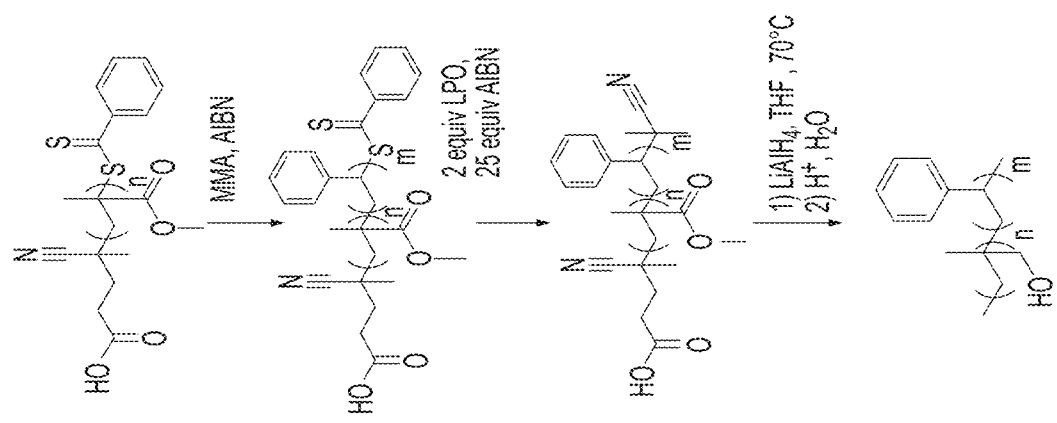
Figure 11A:
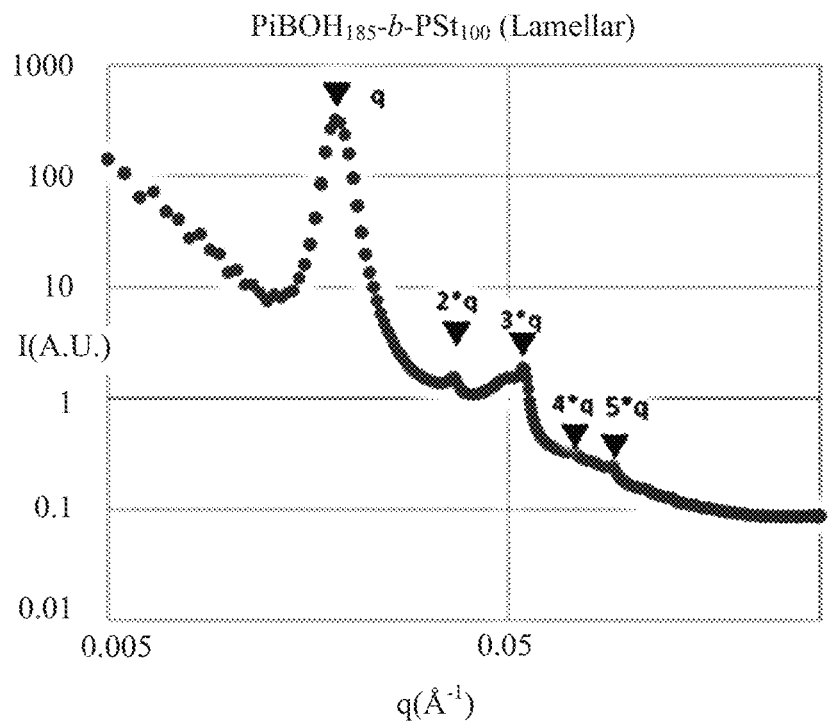
FIGS. 11A-11B. Morphology of thermally annealed (180° C.) PiBOH-b-PS.
Figure 11B:
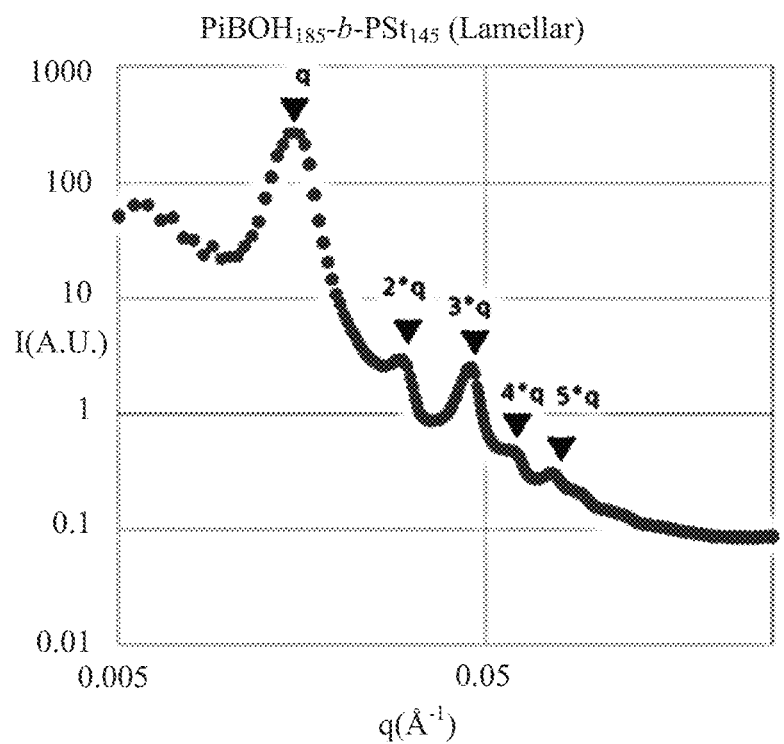
Figure 12:
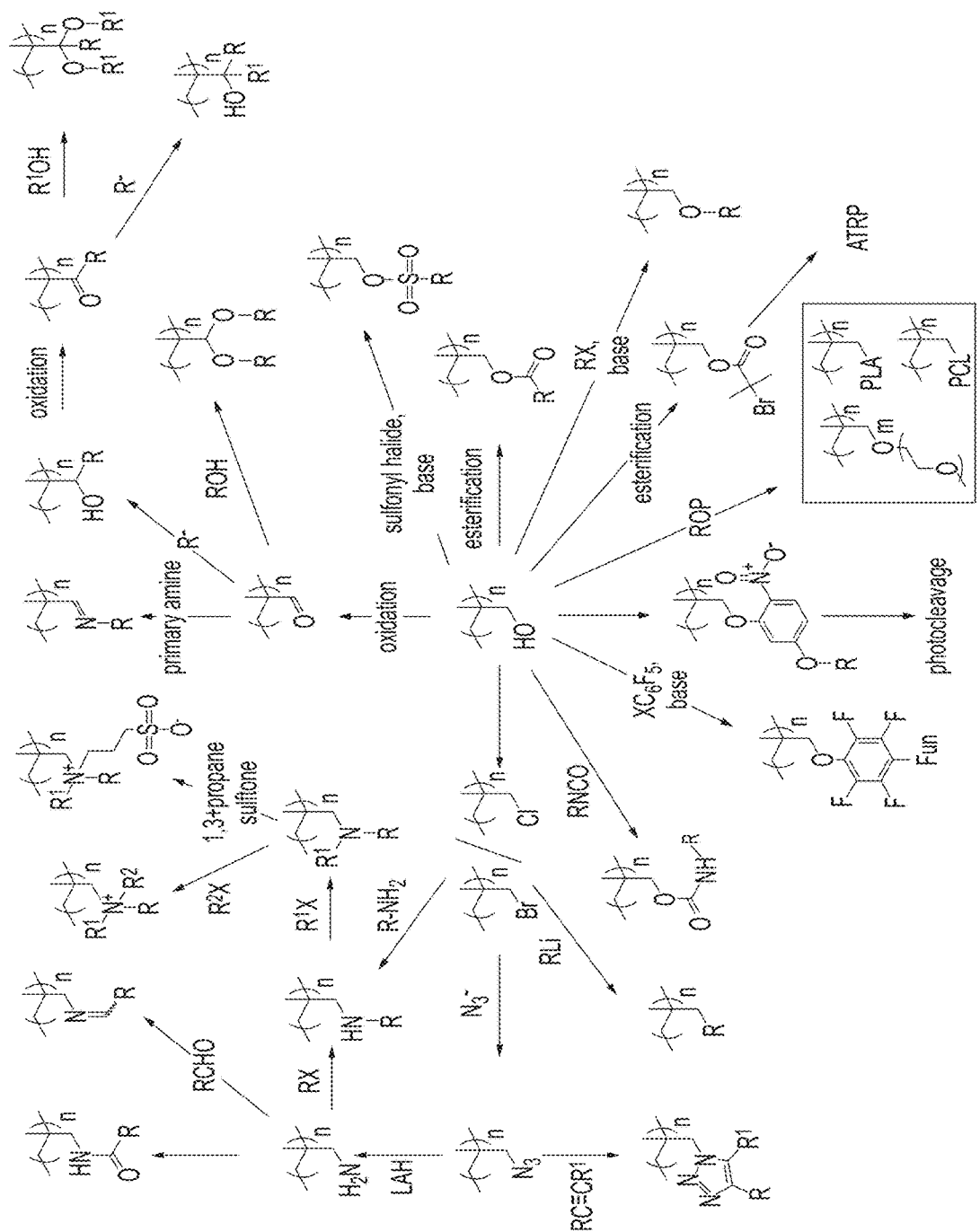
FIG. 12. Derivatization of PiBOH-containing polymers via reaction of the OH groups.
Figure 13:
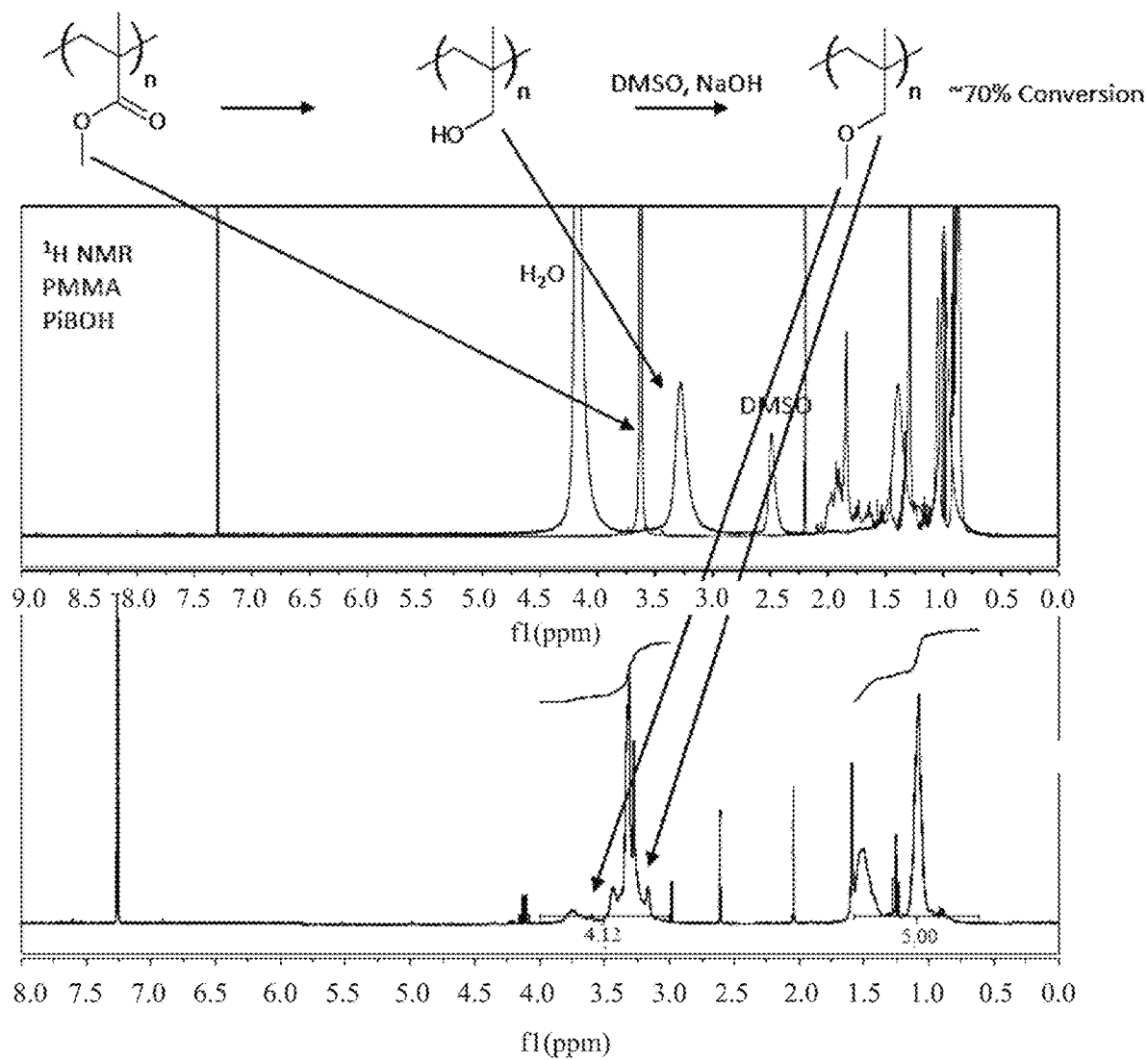
FIG. 13. Methylation of PiBOH-containing polymer to form a derivatized polymer.
Figure 14:
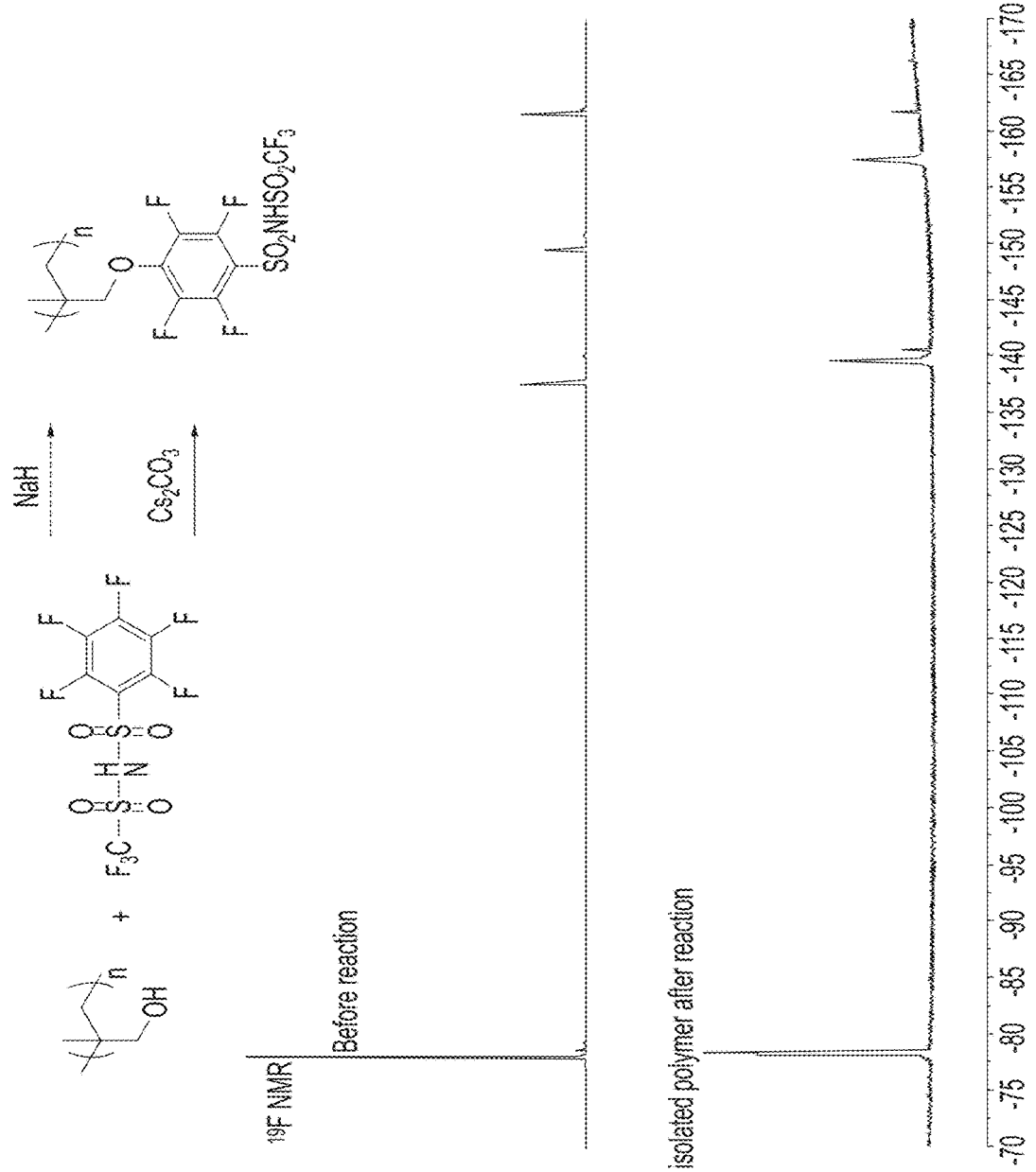
FIG. 14. Arylation of PiBOH-containing polymer to form a derivatized polymer.
Figure 15A:
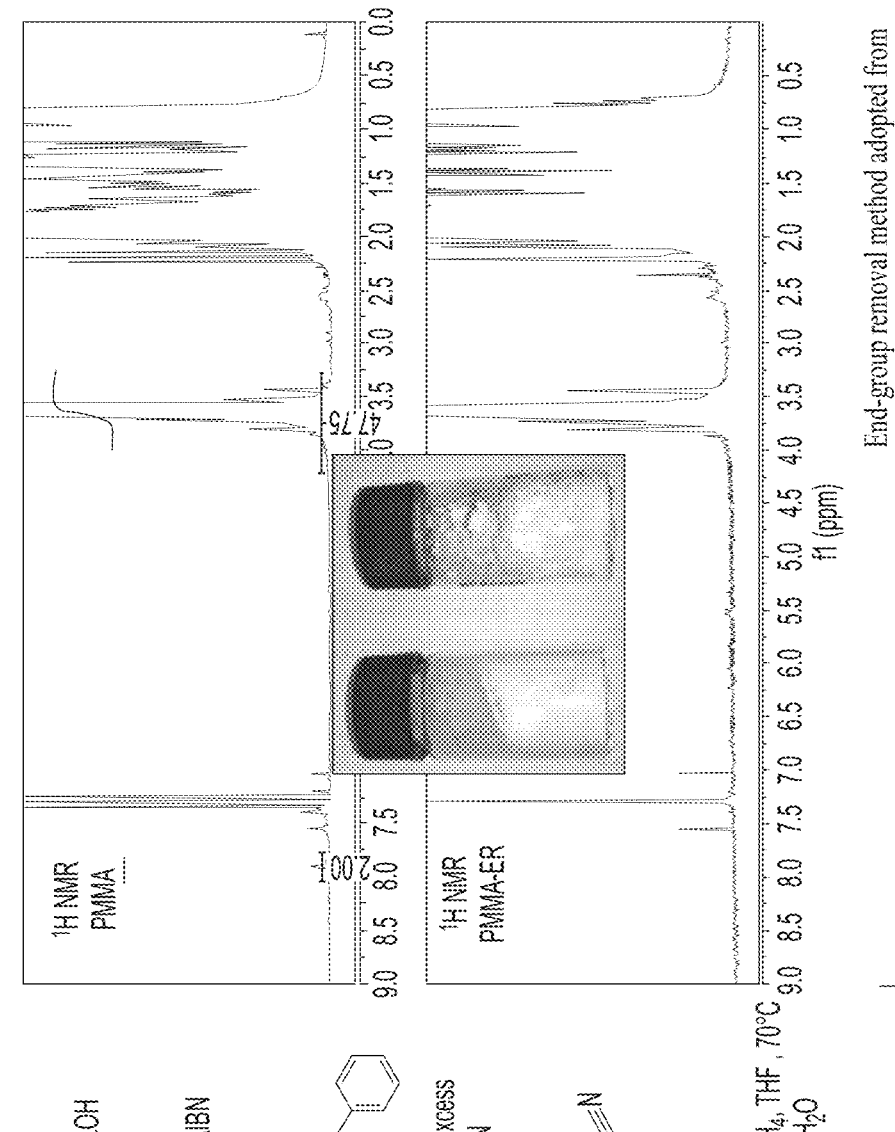
FIG. 15A-15C. Alternative synthesis of poly(hydroxyl-isobutylene) (PiBOH). Spectral data is also shown.
Figure 15A:
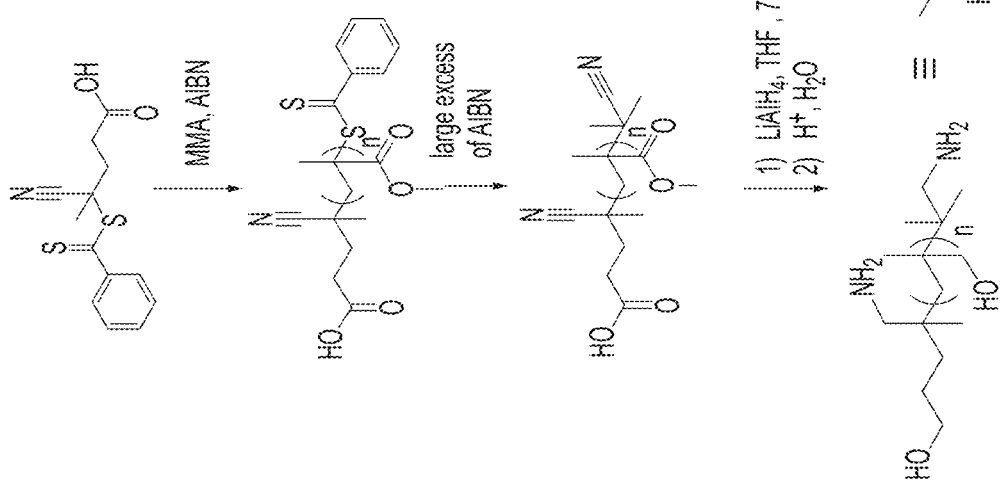
Figure 15B:
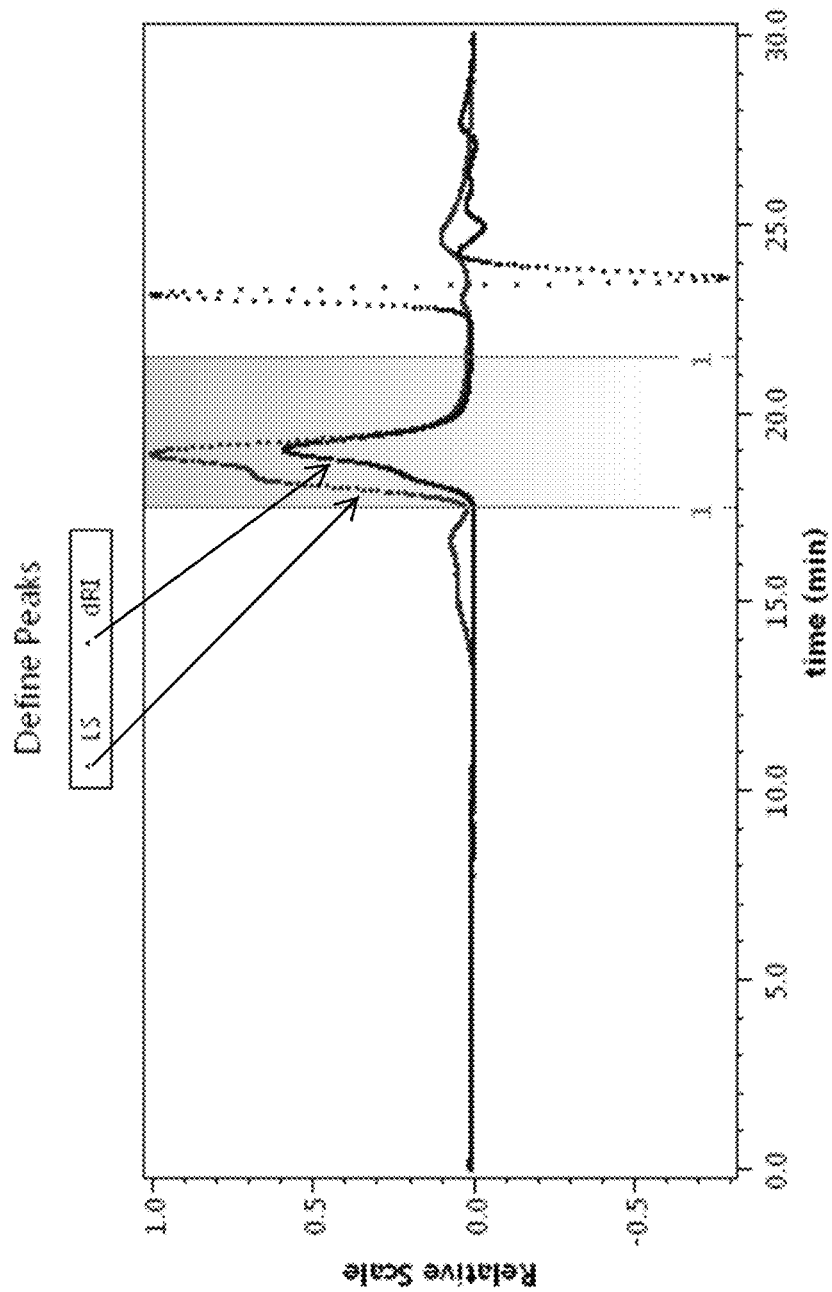
Figure 15C:
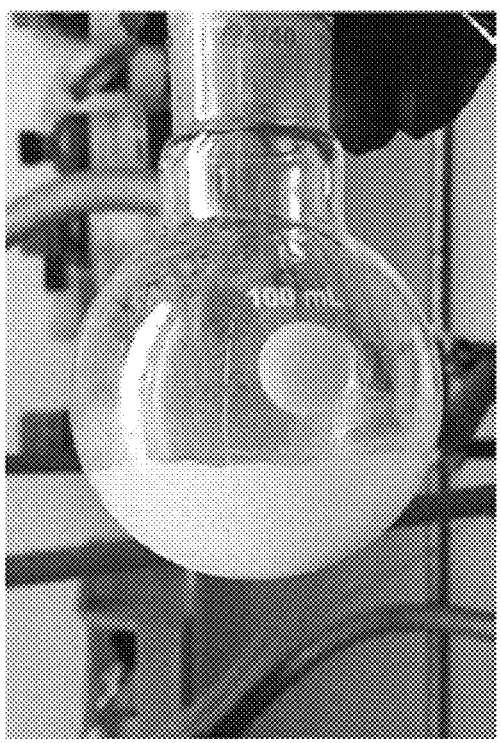
Figure 15C:
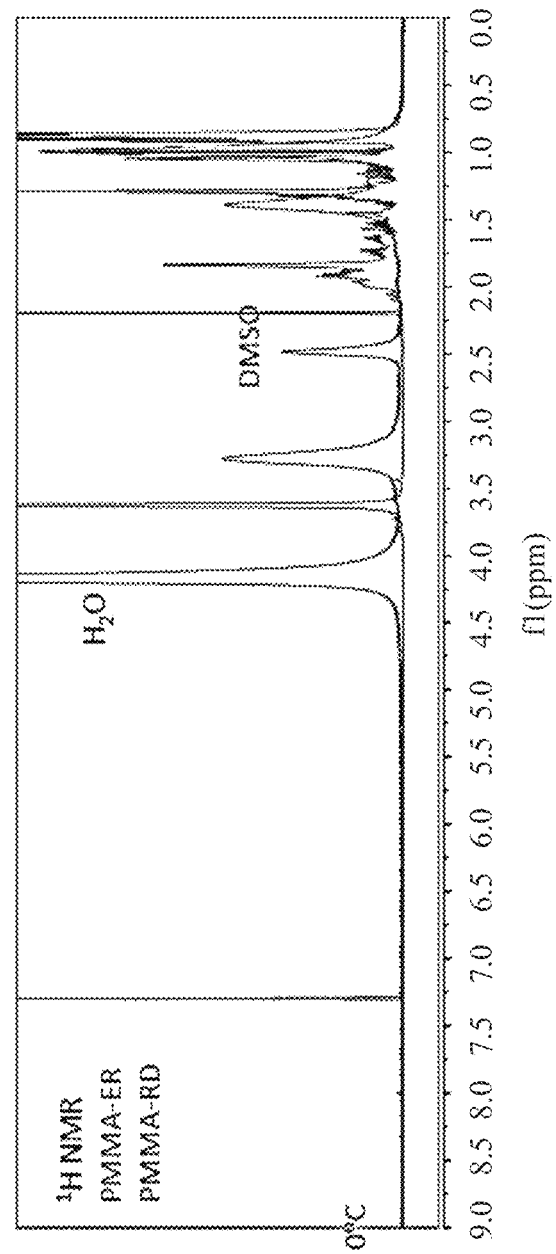
Figure 16A:
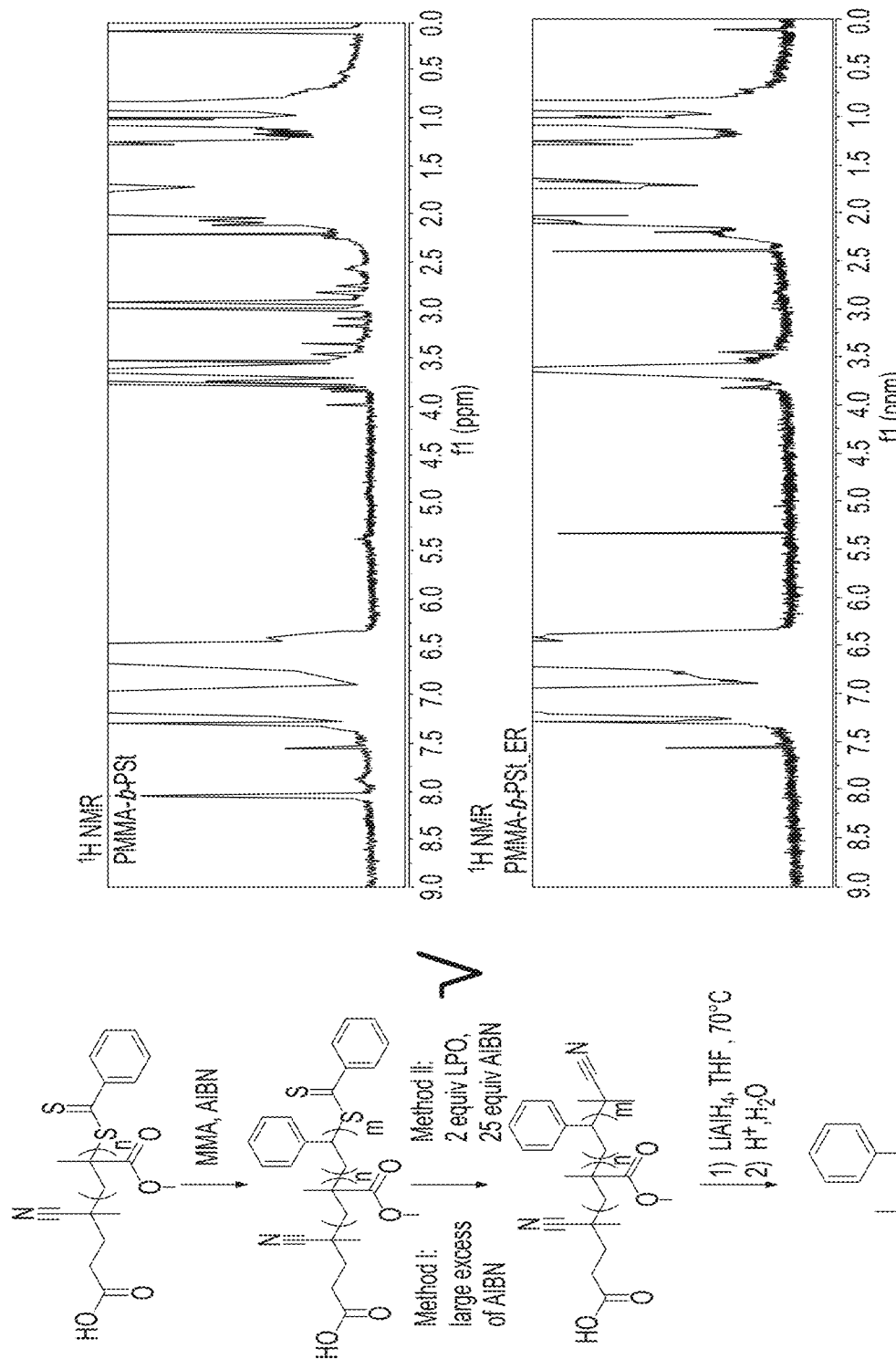
FIG. 16A-16D. Synthesis of and spectral data for PiBOH-b-PS block copolymer.
Figure 16B:
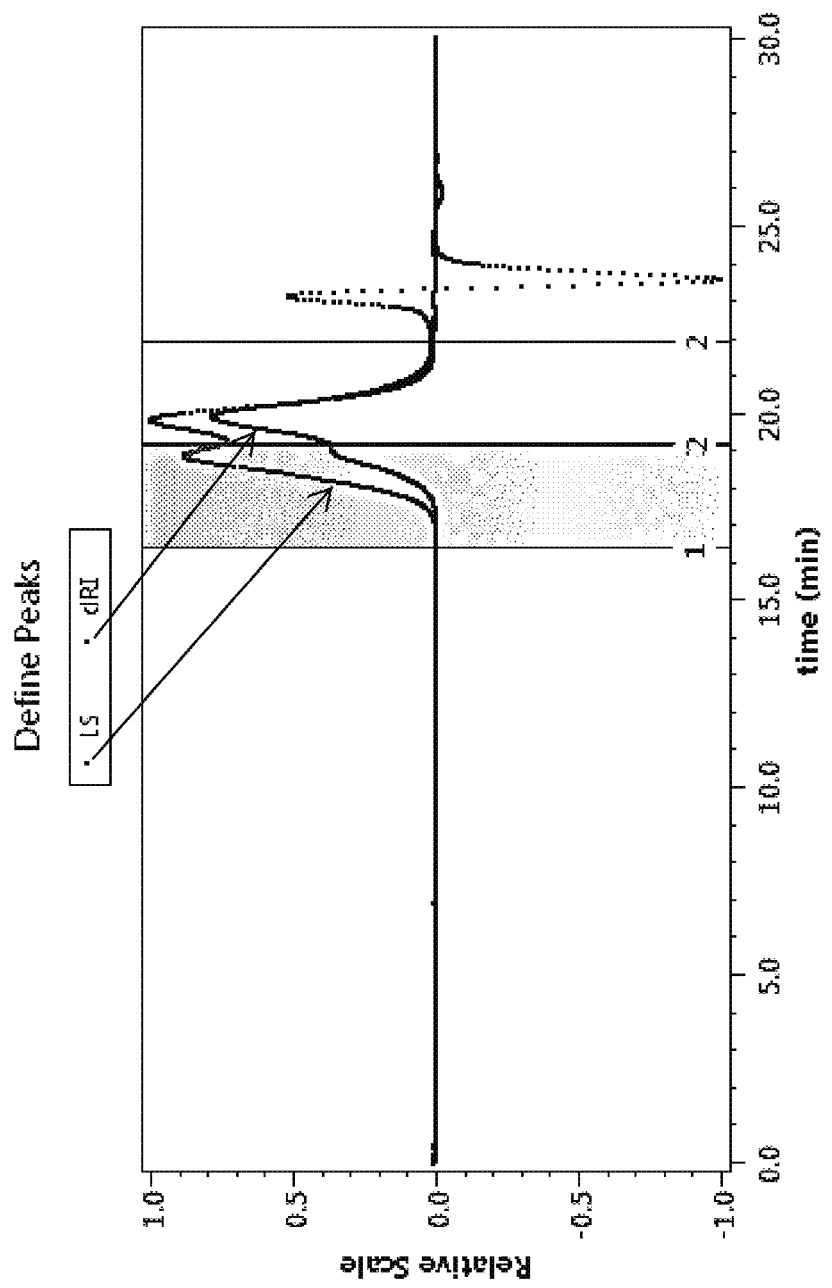
Figure 16C:
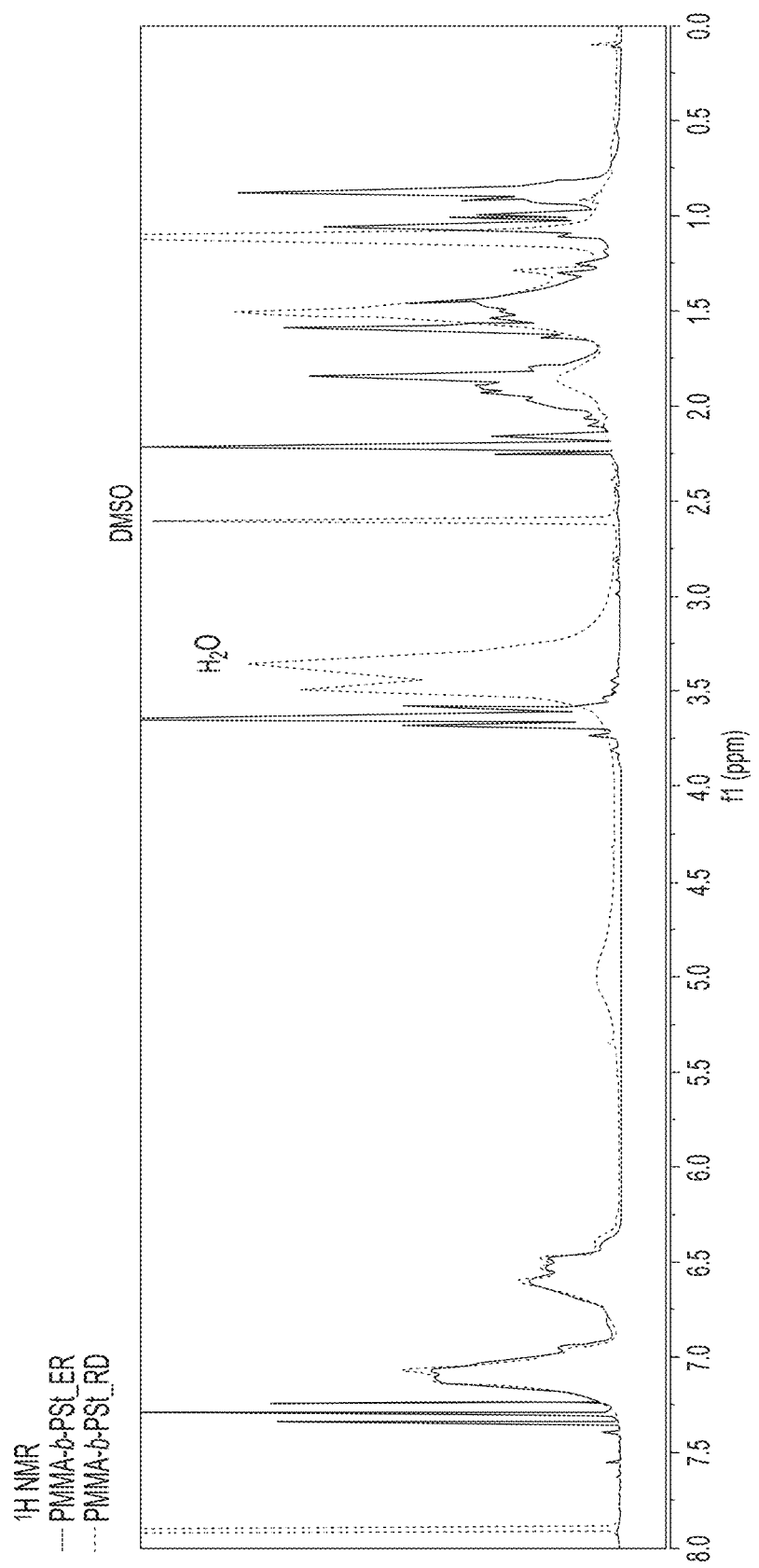
Figure 16D:
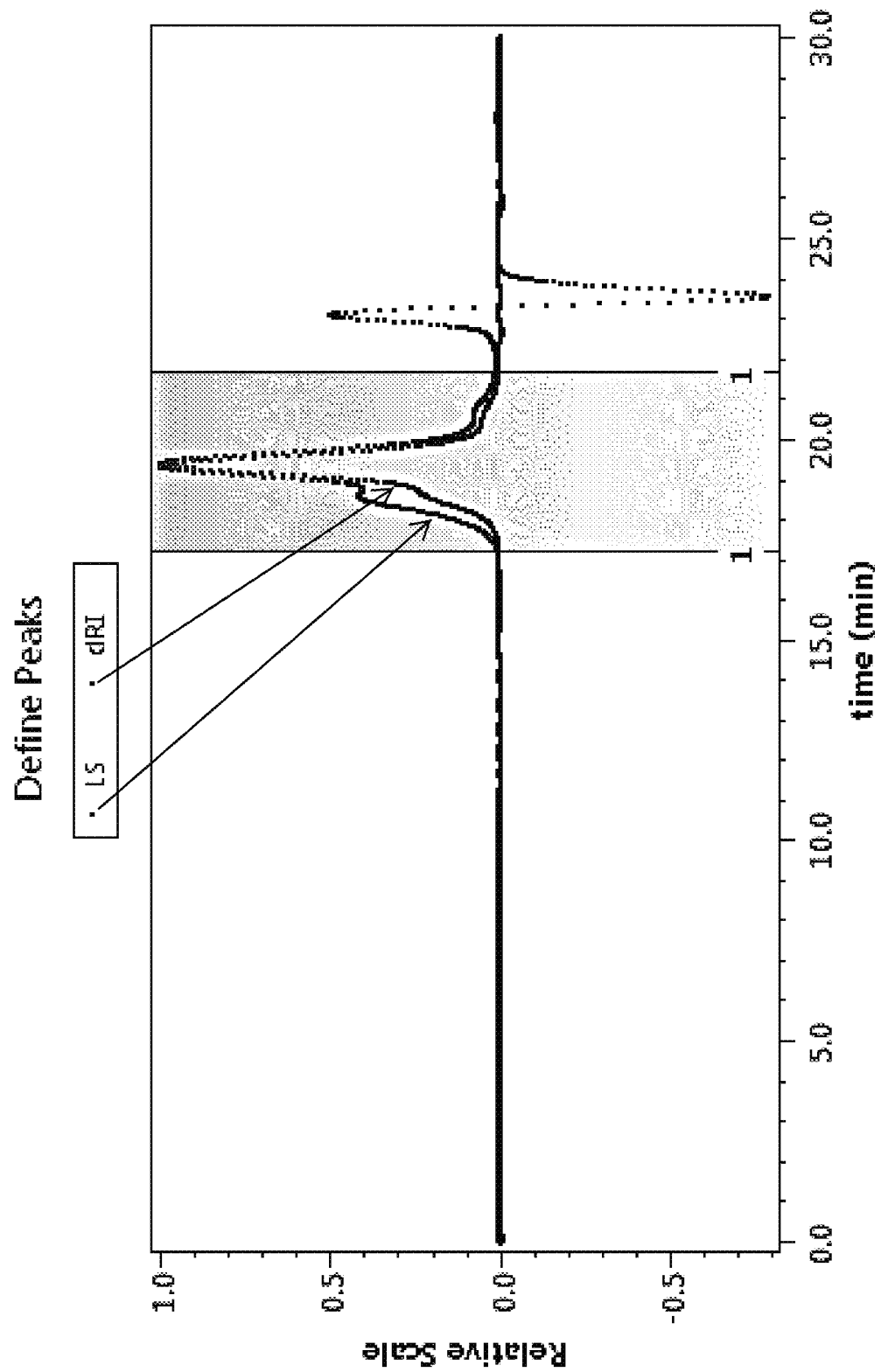
Figure 17A:
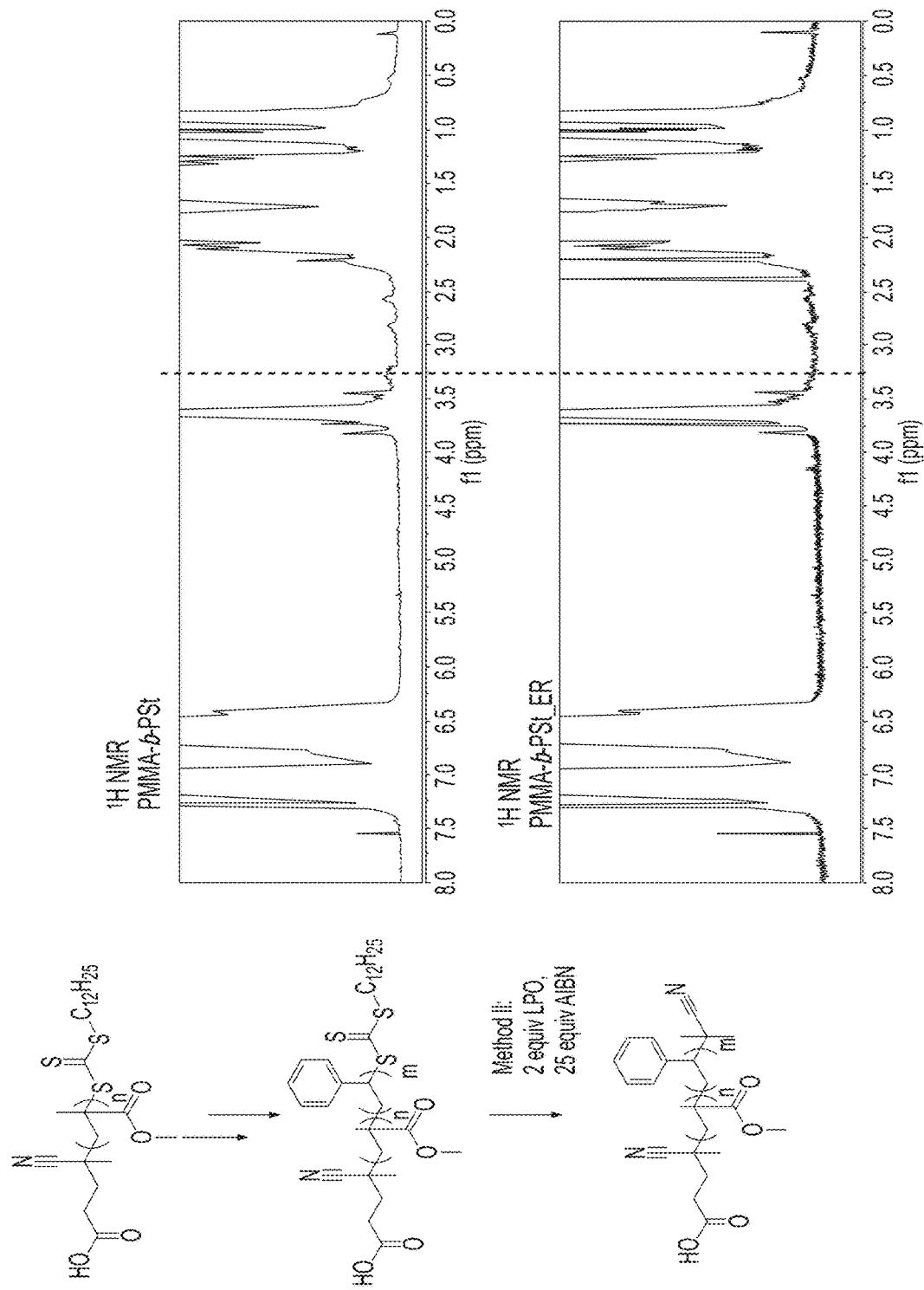
FIG. 17A-17B. PMMA-b-PS from an alternative RAFT procedure.
Figure 17B:
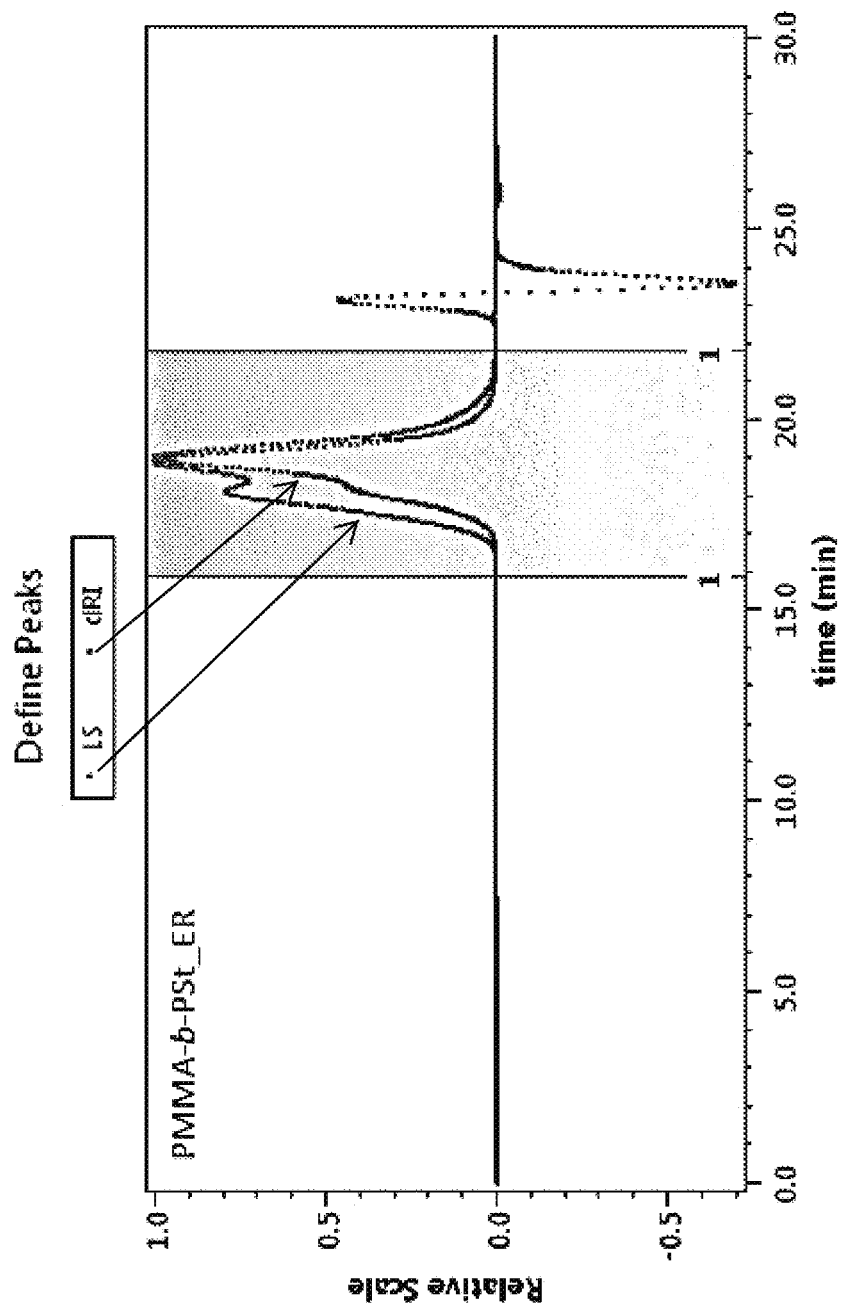
Figure 18:
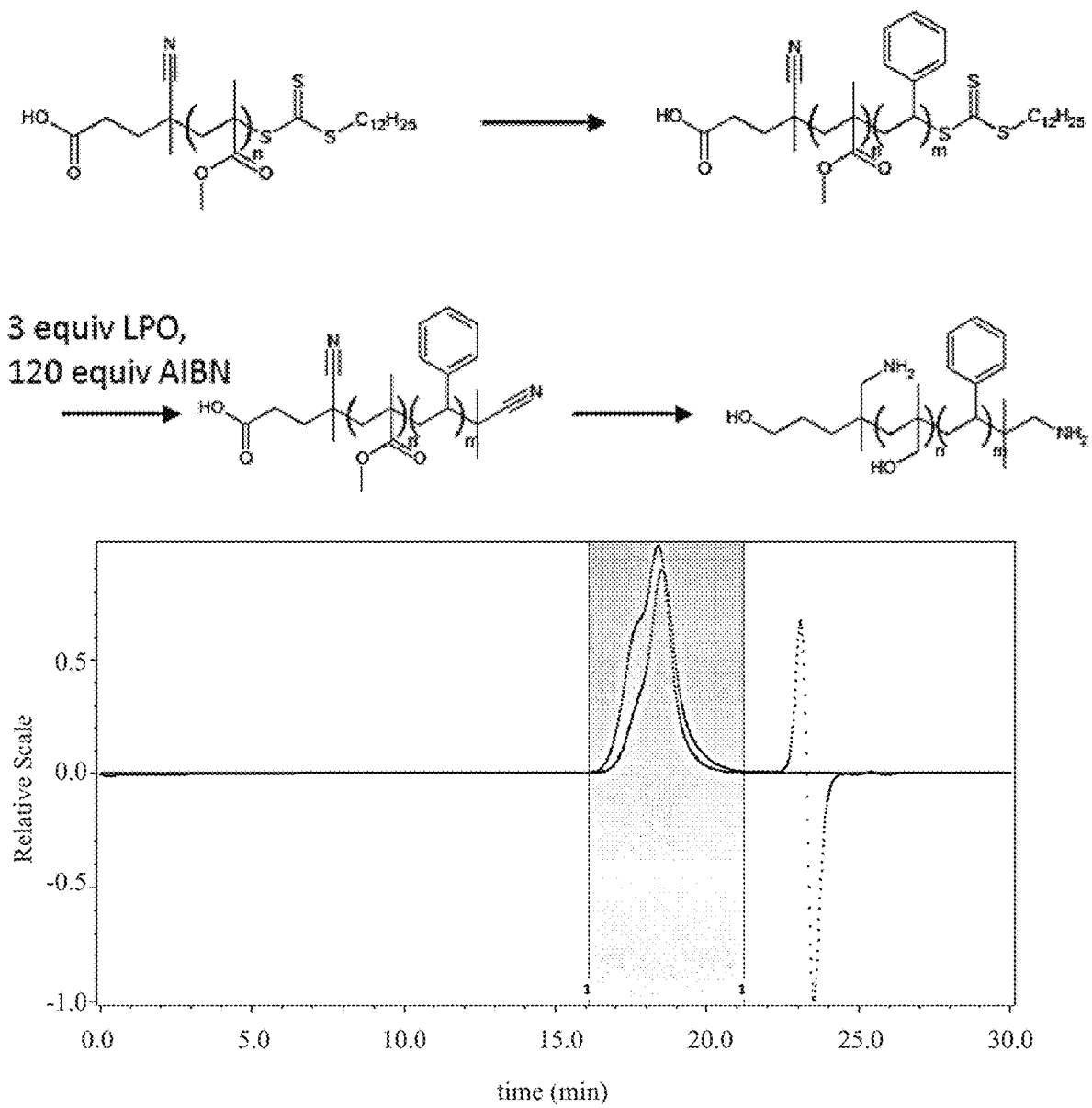

To access even smaller spacing values, the PPOH-b-PS samples were examined. Annealed at 134° C., PPOH$_{11.7}$-b-PS$_{21}$ and PPOH$_{11.7}$-b-PS$_{18.4}$ exhibited peaks at position ratios of 1:√3:√5 indicating hexagonal morphologies, and d-spacing values being 7.51 and 7.38 nm, respectively. With an N value of 28.9, PPOH$_{11.7}$-b-PS$_{14.5}$ also had a hexagonal morphology (d=7.27 nm), since a set of sharp peaks with a position ratio of 1:√3:√4:√5 were observed in the SAXS pattern (FIG. 5). This indicates that PPOH-b-PS block copolymers should have a $\chi_{eff}$ being at least as high as 0.37.

Similarly, the PPOH-b-PtBS samples were thermally annealed at 179° C. (due to the Tg of PtBS). Interestingly, PPOH$_{11.7}$-b-PtBS$_{15.2}$, having N=44.6 and f$_{OH}$=19.1%, displayed a set of peaks with a position ratio of 1:√2:√3:√4:√5 (FIG. 5). This indicates a body centered cubic packing of spherical morphology with d=7.11 nm. This is among the smallest d-spacing reported on spherical morphologies. At such a temperature, order-disorder transition was detected on PPOH$_{8.6}$-b-PtBS$_{13.8}$ (N=39.2, f$_{OH}$=16.4%), since a coexistence of a broad peak and a sharp first order peak was observed (Supporting Information). The smallest d in this work is 6.53 nm, observed on PPOH$_{11.7}$-b-PtBS$_{11.3}$ (N=35.3, f$_{OH}$=24.1%, FIG. 5). It displayed a series of sharp peaks at a position ratio of 1:√3:√5 (the peak at √4q* is missing because being cancelled by the form factor), and thus can be determined to be cylindrical morphology. It is estimated that the cylinder diameter is ~4.1 nm. This is comparable with the smallest d-spacing (6.5 nm) and feature size (~4 nm) achieved experimentally so far on cylindrical morphologies.

In conclusion, this work demonstrated that LiAlH$_4$ can be used to reduce block copolymer of PMMA or PMA in a controlled manner. The change in chemical structure endows the new BCPs much enhanced $\chi_{eff}$ interaction parameters, which allows them to form well-ordered morphologies with a very short chain length, i.e. N=28.5 in this work. The smallest spacing achieved in this work is 7.18 nm for lamellae, 6.53 nm for hexagonally packed cylinders, and 7.11 nm for body centered cubic morphologies.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein.

It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A block copolymer, wherein at least one of the polymer blocks comprises repeating units of the following formula:

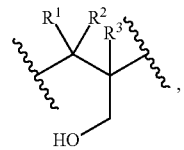

wherein:
R$^1$, R$^2$, and R$^3$ are independently hydrogen, halogen, optionally substituted alkyl, optionally substituted carbocyclyl, optionally substituted heterocyclyl, optionally substituted aryl, or optionally substituted heteroaryl; and wherein the block copolymer comprises a second polymer block, wherein the second polymer block comprises repeating units of the following formula:

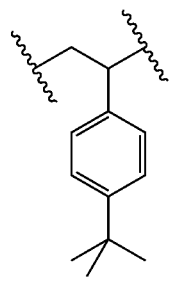

2. The block copolymer of claim 1, wherein the block copolymer is of the following formula:

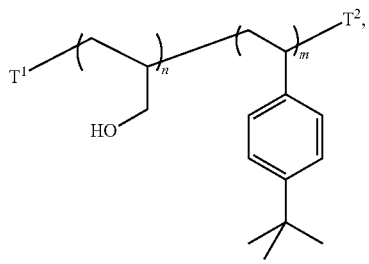

wherein:
T¹ and T² are independently terminal groups selected from the group consisting of hydrogen, halogen, optionally substituted alkyl, optionally substituted alkenyl, optionally substituted alkynyl, optionally substituted heteroalkyl, optionally substituted carbocyclyl, optionally substituted heterocyclyl, optionally substituted aryl, optionally substituted heteroaryl, and optionally substituted acyl; and
n and m are independently integers from 2 to 2000, inclusive.

3. The block copolymer of claim 1, wherein each of $R^1$ and $R^2$ is hydrogen.

4. The block copolymer of claim 1, wherein $R^3$ is hydrogen or optionally substituted $C_{1-6}$ alkyl.

5. The block copolymer of claim 2, wherein n is from 2-200, inclusive.

6. The block copolymer of claim 2, wherein m is from 2-200, inclusive.

7. The block copolymer of claim 1, wherein the block copolymer has a lamellae, hexagonal cylinder, or body centered cubic morphology.

8. The block copolymer of claim 1, wherein the block copolymer has a d-spacing value from 1-50 nm.

9. The block copolymer of claim 1, wherein at least one of the polymer blocks comprises repeating units of the following formula:

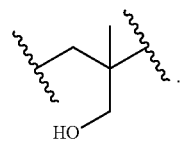

10. The block copolymer of claim 1, wherein at least one of the polymer blocks comprises repeating units of the following formula:

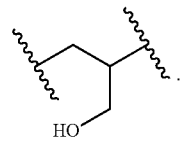

11. The block copolymer of claim 1, wherein the block copolymer is PPOH-b-PtBS.

12. The block copolymer of claim 1, wherein the block copolymer has a d-spacing value of 10 nm or less.

13. The block copolymer of claim 1, wherein the block copolymer is a diblock copolymer.

14. The block copolymer of claim 4, wherein $R^3$ is hydrogen or unsubstituted $C_{1-3}$ alkyl.

15. The block copolymer of claim 3, wherein $R^3$ is hydrogen or unsubstituted $C_{1-3}$ alkyl.

16. A functional material comprising the block copolymer of claim 1.

17. A method of using the block copolymer of claim 1 in a biomedical application.

18. A drug delivery system comprising the block copolymer of claim 1.

19. A composition comprising the block copolymer of claim 1 and one or more carriers.

\* \* \* \* \*